(12) United States Patent
Cottrell et al.

(10) Patent No.: US 8,688,405 B2
(45) Date of Patent: Apr. 1, 2014

(54) REMOTE MONITORING SYSTEMS AND METHODS

(75) Inventors: Michael Edward Cottrell, Aberdeen (GB); Chester Bing Dang, Calgary (CA); Rong Pieter Gul, Amsterdam (NL); Wilhelmus Antonius Hardeveld, The Hague (NL); Brett Richard Alexander Harnish, Calgary (CA); Kenneth John Innes, Aberdeen (GB); James Po Kong, Katy, TX (US); Mark Theodoor Van Latum, Port Harcourt (NG); Kwi-Cheng Lee, Rijswijk (NL); Charles Anthony Lickteig, Katy, TX (US); Robert Frank Parchewsky, The Hague (NL); Matthew Charles Polley, Calgary (CA); Wilhelmus Ravesloot, Rotterdam Pernis (NL); Steven Michael Schultheis, Kuala Lumpur (MY); Daniel Dazhang Ying, Kuala Lumpur (MY); George Mark Zolkiewski, Altrincham (GB)

(73) Assignee: Shell Oil Company, Houston, TX (US)

( * ) Notice: Subject to any disclaimer, the term of this patent is extended or adjusted under 35 U.S.C. 154(b) by 799 days.

(21) Appl. No.: 12/664,090

(22) PCT Filed: Jun. 16, 2008

(86) PCT No.: PCT/US2008/067132
§ 371 (c)(1),
(2), (4) Date: Nov. 23, 2010

(87) PCT Pub. No.: WO2008/157503
PCT Pub. Date: Dec. 24, 2008

(65) Prior Publication Data
US 2012/0016607 A1    Jan. 19, 2012

Related U.S. Application Data

(60) Provisional application No. 60/944,286, filed on Jun. 15, 2007.

(51) Int. Cl.
| | | |
|---|---|---|
| *B23Q 17/00* | (2006.01) | |
| *G05B 15/02* | (2006.01) | |
| *G06F 11/30* | (2006.01) | |
| *G06F 17/40* | (2006.01) | |
| *G06F 19/00* | (2011.01) | |

(52) U.S. Cl.
USPC ......... 702/188; 73/865.8; 73/865.9; 340/500; 340/540; 340/679; 340/870.01; 340/870.07; 340/870.16; 700/9; 700/32; 702/34; 702/182; 702/186; 702/187

(58) Field of Classification Search
USPC .......... 73/112.01, 112.03, 113.01, 432.1, 73/865.8, 865.9; 340/500, 540, 679, 680, 340/870.01, 870.07, 870.16; 700/1, 9, 28, 700/32, 33, 90, 95, 108; 702/1, 33, 34, 127, 702/182, 183, 186, 187, 188, 189; 708/100, 708/200
IPC ........... B23Q 15/00,17/00, 17/007, 2017/00, B23Q 2717/00; G01D 21/00; G05B 11/00, G05B 11/01, 11/012, 13/00, 13/02, 15/00, G05B 15/02, 99/00; G06F 11/00, 11/30, G06F 11/32, 17/00, 17/40, 19/00
See application file for complete search history.

(56) References Cited

U.S. PATENT DOCUMENTS

| | | | | | |
|---|---|---|---|---|---|
| 2,172,918 | A | * | 9/1939 | Watts | 340/870.26 |
| 2,191,997 | A | * | 2/1940 | Side | 318/616 |
| 2,238,914 | A | * | 4/1941 | Pearson | 307/87 |
| 2,699,328 | A | * | 1/1955 | Alspaugh et al. | 299/1.4 |
| 2,864,943 | A | * | 12/1958 | Schultz | 342/50 |
| 2,883,255 | A | * | 4/1959 | Anderson | 346/34 |
| 2,901,728 | A | * | 8/1959 | Breese | 340/3.23 |
| 2,913,703 | A | * | 11/1959 | Von Kunits | 340/870.13 |
| 2,922,142 | A | * | 1/1960 | Lappin | 340/12.1 |
| 2,922,475 | A | * | 1/1960 | Alexander | 162/252 |
| 2,939,054 | A | * | 5/1960 | Caruso et al. | 361/188 |
| 2,940,069 | A | * | 6/1960 | Schirmer | 340/870.07 |
| 3,046,525 | A | * | 7/1962 | Deming et al. | 340/3.4 |

| | | | | |
|---|---|---|---|---|
| 3,110,013 A * | 11/1963 | Breese | 340/3.44 |
| 3,116,753 A * | 1/1964 | Howe | 137/487.5 |
| 3,219,107 A * | 11/1965 | Brown, Jr. et al. | 166/250.15 |
| 3,268,867 A * | 8/1966 | Pickett et al. | 340/870.09 |
| 3,321,613 A * | 5/1967 | Searle | 702/182 |
| 3,368,757 A * | 2/1968 | Coulombe | 236/51 |
| 3,397,386 A * | 8/1968 | Bishop et al. | 340/870.07 |
| 3,441,053 A * | 4/1969 | Robinson | 137/595 |
| 3,555,516 A * | 1/1971 | Proctor | 714/46 |
| 3,566,355 A * | 2/1971 | Smith | 340/3.4 |
| 4,434,489 A * | 2/1984 | Blyth | 714/46 |
| 4,559,610 A | 12/1985 | Sparks et al. | 364/803 |
| 4,561,402 A | 12/1985 | Nakano et al. | 123/489 |
| 4,568,909 A * | 2/1986 | Whynacht | 187/393 |
| 4,573,115 A * | 2/1986 | Halgrimson | 700/9 |
| 4,622,538 A * | 11/1986 | Whynacht et al. | 340/506 |
| 4,831,873 A * | 5/1989 | Charbonneau et al. | 73/168 |
| 4,891,975 A * | 1/1990 | Charbonneau et al. | 73/168 |
| 5,000,040 A * | 3/1991 | Charbonneau et al. | 73/168 |
| 5,437,254 A | 8/1995 | Korenaga et al. | 123/416 |
| 5,461,311 A | 10/1995 | Nakazato et al. | 324/207.24 |
| 5,845,230 A * | 12/1998 | Lamberson | 702/56 |
| 5,892,758 A * | 4/1999 | Argyroudis | 370/335 |
| 6,208,266 B1 * | 3/2001 | Lyons et al. | 340/870.02 |
| 6,292,757 B1 | 9/2001 | Flanagan et al. | 702/182 |
| 6,437,692 B1 * | 8/2002 | Petite et al. | 340/540 |
| 6,453,265 B1 | 9/2002 | Dekhil et al. | 702/181 |
| 6,489,884 B1 * | 12/2002 | Lamberson et al. | 340/7.2 |
| 6,587,754 B2 * | 7/2003 | Hung et al. | 700/286 |
| 6,646,564 B1 | 11/2003 | Azieres et al. | 340/679 |
| 6,748,341 B2 | 6/2004 | Crowder, Jr. | 702/181 |
| 7,044,373 B1 | 5/2006 | Garber et al. | 235/385 |
| 7,053,767 B2 * | 5/2006 | Petite et al. | 340/531 |
| 7,071,833 B2 * | 7/2006 | Nagano et al. | 340/635 |
| 7,103,511 B2 * | 9/2006 | Petite | 702/188 |
| 7,123,151 B2 | 10/2006 | Garber et al. | 340/572.4 |
| 7,468,661 B2 * | 12/2008 | Petite et al. | 340/540 |
| 7,676,285 B2 * | 3/2010 | Hoyte et al. | 700/52 |
| 7,978,059 B2 * | 7/2011 | Petite et al. | 340/531 |
| 8,013,732 B2 * | 9/2011 | Petite et al. | 340/539.1 |
| 8,509,935 B2 * | 8/2013 | Hoyte et al. | 700/108 |
| 2001/0053940 A1 | 12/2001 | Horn et al. | 700/32 |
| 2002/0013908 A1 * | 1/2002 | Nishihata et al. | 713/201 |
| 2002/0019725 A1 * | 2/2002 | Petite | 702/188 |
| 2002/0125998 A1 * | 9/2002 | Petite et al. | 340/286.01 |
| 2002/0133270 A1 * | 9/2002 | Hung et al. | 700/286 |
| 2002/0198978 A1 * | 12/2002 | Watkins | 709/223 |
| 2004/0153437 A1 | 8/2004 | Buchan | 707/1 |
| 2005/0007249 A1 | 1/2005 | Eryurek et al. | 340/511 |
| 2005/0007826 A1 | 1/2005 | Boggs et al. | 365/189.01 |
| 2005/0049832 A1 | 3/2005 | Gorinevsky | 702/182 |
| 2005/0108577 A1 * | 5/2005 | Nishihata et al. | 713/201 |
| 2005/0159922 A1 | 7/2005 | Hsiung et al. | 702/182 |
| 2005/0205037 A1 | 9/2005 | Lewis et al. | 123/179.16 |
| 2005/0240289 A1 * | 10/2005 | Hoyte et al. | 700/49 |
| 2005/0270165 A1 * | 12/2005 | Nagano et al. | 340/653 |
| 2006/0181406 A1 * | 8/2006 | Petite et al. | 340/521 |
| 2008/0016353 A1 | 1/2008 | Carro | 713/171 |
| 2008/0129507 A1 | 6/2008 | Doan et al. | 340/572.1 |
| 2009/0096605 A1 * | 4/2009 | Petite et al. | 340/539.22 |
| 2009/0243840 A1 * | 10/2009 | Petite et al. | 340/539.1 |
| 2010/0114810 A1 * | 5/2010 | Hoyte et al. | 706/47 |
| 2013/0214937 A1 * | 8/2013 | Petite et al. | 340/870.03 |

FOREIGN PATENT DOCUMENTS

| | | | |
|---|---|---|---|
| EP | 0283610 A1 * | 9/1988 | |
| EP | 0687977 A2 * | 12/1995 | |
| EP | 1221683 A1 * | 7/2002 | |
| GB | 2349020 A * | 10/2000 | |
| WO | WO 87/04275 A1 * | 7/1987 | |
| WO | WO2005108744 | 11/2005 | F01B 31/12 |

* cited by examiner

*Primary Examiner* — Edward Cosimano

(57) ABSTRACT

A system for monitoring an industrial process, comprising one or more sensors connected to one or more operating components of the industrial process; a remote monitoring station, comprising a computer and a database; and a connection between the one or more sensors and the remote monitoring station, wherein the remote monitoring station is at least about 100-2500 miles away from the industrial process, for example 500-1000 miles.

9 Claims, 46 Drawing Sheets

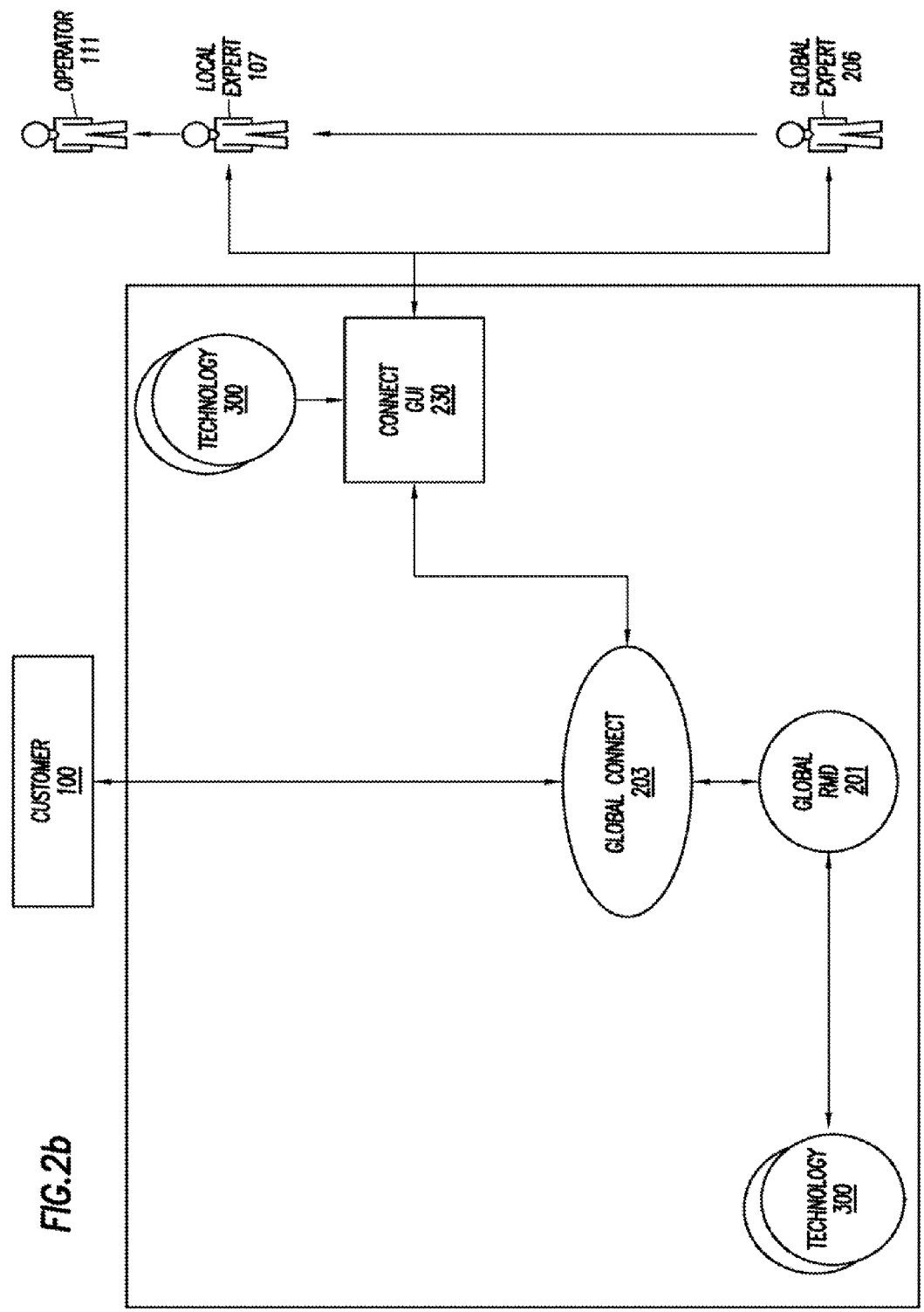

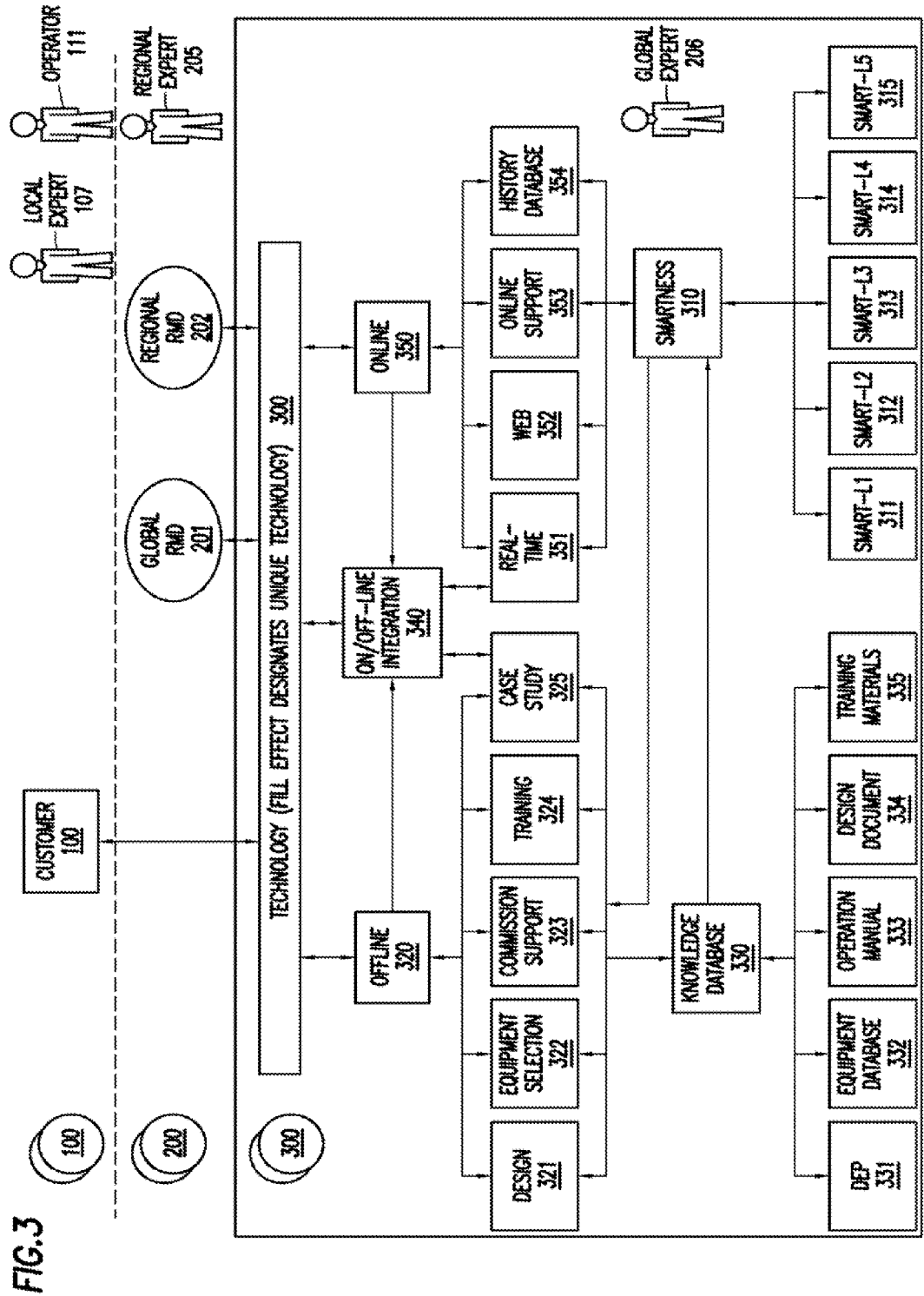

EP>EPA>Malampaya>Dashboard>

All Assets Summary — 1065
Platform SWP — 1066
Gas Plant OGP — 1067
Data Threshold Train/Body TagSource Overview — 1068

EP>EPA>Malampaya>Dashboard>                                              Home– Help All Assets×
Summary

OGP Run Status Report

| Platform SWP | Site | Train | | | | | | | |
|---|---|---|---|---|---|---|---|---|---|
| Gas Plant OGP | OGP | | Monitoring OGP with 8 trains for a total of 16 equipment bodies. | | | | | | |
| | | | Service | Class # | Train # | Green % | Yellow % | Run Status | Train Conf Lvl % | Class Status |
| | | G-924A | G-924A Power Generation | 1 | 1 | 100 | 100 | ◉◉◉ | 100 | ◉◉◉ |
| | | G-924B | G-924B Power Generation | 1 | 1 | 100 | 100 | ◉◉◉ | 100 | ◉◉◉ |
| | | K-862A | K-862A SRU Recycle Blower | 2 | 2 | 100 | | ◉◉◉ | | |
| | | K-862B | K-862B SRU Recycle Blower | 2 | 2 | 100 | | ◉◉◉ | | |
| | | P-102A | P-102A Train 1 Lean Amine Feed Pumping | 3 | 3 | 100 | 100 | ◉◉◉ | | |
| | | P-102B | P-102B Train 1 Lean Amine Feed Pumping | 3 | 3 | 100 | | ◉◉◉ | | |
| Data | | P-202A | P-202A Train 2 Lean Amine Feed Pumping | 4 | 4 | 100 | 100 | ◉◉◉ | | |
| Threshold Train/Body TagSource Overview | | P-202B | P-202B Train 2 Lean Amine Feed Pumping | 4 | 4 | 100 | | 50 ◉◉◉ | | |

1077 — Site
1076 — Train

*FIG. 14f*

SWP Run Status Report

Monitoring SWP with 28 trains for a total of 56 equipment bodies.

| Site | Train | Service | Class # | Train % | Green % | Yellow % | Run Status | Train Conf Lvl % | Class Status |
|---|---|---|---|---|---|---|---|---|---|
| SWP | A-231A | A-231A Air Compression | 1 | 34 | 65 | | ● | 34 | |
| | A-231B | A-231B Air Compression | 1 | 34 | | | ● | 34 | ● |
| | A-231C | A-231C Air Compression | 1 | 34 | | | ● | 34 | |
| | G-171A | G-171A Main Power Generation | 2 | 34 | 65 | | ● | 34 | |
| | G-171B | G-171B Main Power Generation | 2 | 34 | | | ● | 34 | ● |
| | G-171C | G-171C Main Power Generation | 2 | 34 | | | ● | 34 | |
| | K-122A | K-122A Flash Gas Compression | 3 | 50 | 100 | 100 | ● | 50 | |
| | K-122B | K-122B Flash Gas Compression | 3 | 50 | | | ● | 50 | ● |
| | K-227A | K-227A Flash Gas Compression | 3 | 50 | | | ● | 50 | |
| | K-127B | K-127B Flash Gas Compression | 3 | 50 | | | ● | 50 | |
| | K-153A | K-153A Flash Gas Compression | 4 | 100 | 100 | | ● | 100 | ● |
| | K-153B | K-153B Flash Gas Compression | 4 | 100 | | | ● | 100 | |
| | P-222A | P-222A Heating Medium Circulation Pumping | 5 | 100 | 100 | | ● | 100 | ● |
| | P-222B | P-222B Heating Medium Circulation Pumping | 5 | 100 | | | ● | 100 | |
| | P-307A | P-307A CCWS Circulation Pumping | 6 | 100 | 100 | | ● | 100 | ● |
| | P-307B | P-307B CCWS Circulation Pumping | 6 | 100 | | | ● | 100 | |
| | P-348A | P-348A LP Flare Drum Pumping | 7 | 100 | 100 | | ● | 100 | ● |
| | P-348B | P-348B LP Flare Drum Pumping | 7 | 100 | | | ● | 100 | |
| | P-373A | P-373A Methanol Subsea Injection Pumping | 8 | 50 | | | ● | 50 | |
| | P-373B | P-373B Methanol Subsea Injection Pumping | 8 | 50 | | | ● | 50 | |
| | P-373C | P-373C Methanol Subsea Injection Pumping | 8 | 50 | | | ● | 50 | |
| | P-373D | P-373D Methanol Subsea Injection Pumping | 8 | 50 | | | ● | 50 | |
| | P-375A | P-375A Methanol Process Injection Pumping | 9 | 100 | 100 | | ● | 100 | ● |
| | P-375B | P-375B Methanol Process Injection Pumping | 9 | 100 | | | ● | 100 | |
| | P-701A | P-701A Export Condensate Loading | 10 | 100 | 100 | | ● | 100 | ● |
| | P-701B | P-701B Export Condensate Loading | 10 | 100 | | | ● | 100 | |
| | P-303A | P-303A Sea Water Lifting Pump | 11 | 100 | 100 | | ● | 100 | ● |
| | P-303B | P-303B Sea Water Lifting Pump | 11 | 100 | | | ● | 100 | |

*FIG. 14g*

SWP Exception Report

Monitoring SWP with 28 trains for a total of 56 equipment bodies.

1082 — Complete: Train, Body, Tag    Exception: Train, Body, Tag

| Train | Service | Level 1 RunStatus | 1 day %Util | 30 days %Util | 90 days %Util |
|---|---|---|---|---|---|
| A-231B | A-231B Air Compression | ◉◉◈ | 00.0 | 00.0 | 00.0 |
| G-171B | G-171B Main Power Generation | ◉◉◈ | 00.0 | 00.0 | 00.0 |
| K-153B | K-153B Export Gas Compression | ◉◉◈ | 00.0 | 00.0 | 00.0 |
| P-373A | P-373A Methanol Subsea Injection Pumping | ◉◉◈ | 00.0 | 00.0 | 00.0 |
| P-373C | P-373C Methanol Subsea Injection Pumping | ◉◉◈ | 00.0 | 00.0 | 00.0 |
| P-701B | P-701B Export Condensate Loading | ◉◉◈ | 00.0 | 00.0 | 00.0 |
| P-303A | P-303A Sea Water Lifting Pump | ◉◉◈ | 00.0 | 00.0 | 00.0 |
| P-303B | P-303B Sea Water Lifting Pump | ◉◉◈ | 00.0 | 00.0 | 00.0 |

FIG.14h

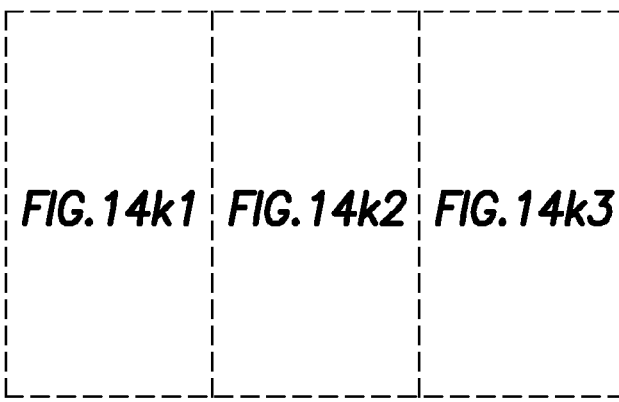

FIG.14k

SWP Complete Report

Monitoring SWP with 28 trains for a total of 56 equipment bodies.

Complete: Train, Body, Tag        Exception: Train, Body, Tag

Smartness:

| Train | Service | Level - 1 RunStatus | 1 day %Util | 30 days %Util | 90 days %Util |
|---|---|---|---|---|---|
| A-231A | A-231A Air Compression | ⊘⊙○ | 00.0 | 00.0 | 00.0 |
| A-231B | A-231B Air Compression | ○⊙⊘ | 00.0 | 00.0 | 00.0 |
| A-231C | A-231C Air Compression | ⊘⊙○ | 00.0 | 00.0 | 00.0 |
| G-171A | G-171A Main Power Generation | ⊘⊙○ | 00.0 | 00.0 | 00.0 |
| G-171B | G-171B Main Power Generation | ○⊙⊘ | 00.0 | 00.0 | 00.0 |
| G-171C | G-171C Main Power Generation | ⊘⊙○ | 00.0 | 00.0 | 00.0 |
| K-122A | K-122A Flash Gas Compression | ⊘⊙○ | 00.0 | 00.0 | 00.0 |
| K-122B | K-122B Flash Gas Compression | ⊘⊙○ | 00.0 | 00.0 | 00.0 |
| K-127A | K-127A Flash Gas Compression | ⊘⊙○ | 00.0 | 00.0 | 00.0 |
| K-127B | K-127B Flash Gas Compression | ⊘⊙○ | 00.0 | 00.0 | 00.0 |
| K-153A | K-153A Export Gas Compression | ⊘⊙○ | 00.0 | 00.0 | 00.0 |
| K-153B | K-153B Export Gas Compression | ○⊙⊘ | 00.0 | 00.0 | 00.0 |
| P-222A | P-222A Heating Medium Circulation Pumping | ⊘⊙○ | 00.0 | 00.0 | 00.0 |
| P-222B | P-222B Heating Medium Circulation Pumping | ⊘⊙○ | 00.0 | 00.0 | 00.0 |
| P-307A | P-307A CCWS Circulation Pumping | ⊘⊙○ | 00.0 | 00.0 | 00.0 |
| P-307B | P-307B CCWS Circulation Pumping | ⊘⊙○ | 00.0 | 00.0 | 00.0 |
| P-348A | P-348A LP Flare Drum Pumping | ⊘⊙○ | 00.0 | 00.0 | 00.0 |
| P-348B | P-348B LP Flare Drum Pumping | ⊘⊙○ | 00.0 | 00.0 | 00.0 |
| P-373A | P-373A Methanol Subsea Injection Pumping | ○⊙⊘ | 00.0 | 00.0 | 00.0 |
| P-373B | P-373B Methanol Subsea Injection Pumping | ⊘⊙○ | 00.0 | 00.0 | 00.0 |
| P-373C | P-373C Methanol Subsea Injection Pumping | ○⊙⊘ | 00.0 | 00.0 | 00.0 |
| P-373D | P-373D Methanol Subsea Injection Pumping | ⊘⊙○ | 00.0 | 00.0 | 00.0 |
| P-375A | P-375A Methanol Process Injection Pumping | ⊘⊙○ | 00.0 | 00.0 | 00.0 |
| P-375B | P-375B Methanol Process Injection Pumping | ⊘⊙○ | 00.0 | 00.0 | 00.0 |
| P-701A | P-701A Export Condensate Loading | ⊘⊙○ | 00.0 | 00.0 | 00.0 |
| P-701B | P-701B Export Condensate Loading | ○⊙⊘ | 00.0 | 00.0 | 00.0 |
| P-303A | P-303A Sea Water Lifting Pump | ○⊙⊘ | 00.0 | 00.0 | 00.0 |
| P-303B | P-303B Sea Water Lifting Pump | ○⊙⊘ | 00.0 | 00.0 | 00.0 |

FIG.14i

SWP Complete Report

Monitoring SWP with 28 trains for a total of 56 equipment bodies.

Complete: Train, Body, Tag      Exception: Train, Body, Tag

| Train | Service | Level 1 RunStatus | 1 day %Util | 30 days %Util | 90 days %Util | Body | Equipment Type | Conf Lvl | RunStatus |
|---|---|---|---|---|---|---|---|---|---|
| A-231A | A-231A Air Compression | ⊘◉◉ | 00.0 | 00.0 | 00.0 | A-231A | Centrifugul Compressor | 100 | ⊘◉◉ |
|  |  |  |  |  |  | DA-231A | Motor |  |  |
| A-231B | A-231B Air Compression | ◉◉⊘ | 00.0 | 00.0 | 00.0 | A-231B | Centrifugul Compressor | 0 | ◉◉⊘ |
|  |  |  |  |  |  | DA-231B | Motor |  |  |
| A-231C | A-231C Air Compression | ⊘◉◉ | 00.0 | 00.0 | 00.0 | A-231C | Centrifugul Compressor | 100 | ⊘◉◉ |
|  |  |  |  |  |  | DA-231C | Motor |  |  |
| G-171A | G-171A Main Power Generation | ⊘◉◉ | 00.0 | 00.0 | 00.0 | DG-171A | Gas Turbine | 90 | ◉◉◉ |
|  |  |  |  |  |  | G-171A | Generator | 195 | ⊘◉◉ |
| G-171B | G-171B Main Power Generation | ◉◉⊘ | 00.0 | 00.0 | 00.0 | DG-171B | Gas Turbine | 0 | ◉◉⊘ |
|  |  |  |  |  |  | G-171B | Generator | 0 | ◉◉⊘ |
| G-171C | G-171C Main Power Generation | ⊘◉◉ | 00.0 | 00.0 | 00.0 | DG-171C | Gas Turbine | 45 | ◉◉◉ |
|  |  |  |  |  |  | G-171C | Generator | 195 | ⊘◉◉ |
| K-122A | K-122A Flash Gas Compression | ⊘◉◉ | 00.0 | 00.0 | 00.0 | DK-122A | Motor |  |  |
|  |  |  |  |  |  | K-122A | Reciprocating Compressor | 250 | ⊘◉◉ |
| K-122B | K-122B Flash Gas Compression | ⊘◉◉ | 00.0 | 00.0 | 00.0 | DK-122B | Motor |  |  |
|  |  |  |  |  |  | K-122B | Reciprocating Compressor | 250 | ⊘◉◉ |
| K-127A | K-127A Flash Gas Compression | ⊘◉◉ | 00.0 | 00.0 | 00.0 | DK-127A | Motor |  |  |
|  |  |  |  |  |  | K-127A | Reciprocating Compressor | 250 | ⊘◉◉ |
| K-127B | K-127B Flash Gas Compression | ⊘◉◉ | 00.0 | 00.0 | 00.0 | DK-127B | Motor |  |  |
|  |  |  |  |  |  | K-127B | Reciprocating Compressor | 250 | ⊘◉◉ |
| K-153A | K-153A Export Gas Compression | ⊘◉◉ | 00.0 | 00.0 | 00.0 | DK-153A | Gas Turbine |  |  |
|  |  |  |  |  |  | K-153A | Centrifugul Compressor | 300 | ⊘◉◉ |
| K-153B | K-153B Export Gas Compression | ◉◉⊘ | 00.0 | 00.0 | 00.0 | DK-153B | Gas Turbine |  |  |
|  |  |  |  |  |  | K-153B | Centrifugul Compressor | 0 | ◉◉⊘ |
| P-222A | P-222A Heating Medium Circulation Pumping | ⊘◉◉ | 00.0 | 00.0 | 00.0 | DP-222A | Motor |  |  |

EP>EPA>Malampaya>Dashboard>

All Assets x
Summary

Platform
SWP

Gas Plant
OGP

Data
Threshold
Train/Body
TagSource
Overview

| Train | Service | Smartness Level -1 RunStatus | 1 day %Util |
|---|---|---|---|
| A-231A | A-231A Air Compression | ⊘⊙⊙ | 00.0 |
| A-231B | A-231B Air Compression | ⊙⊙⊘ | 00.0 |
| A-231C | A-231C Air Compression | ⊘⊙⊙ | 00.0 |
| G-171A | G-171A Main Power Generation | ⊘⊙⊙ | 00.0 |
| G-171B | G-171B Main Power Generation | ⊙⊙⊘ | 00.0 |
| G-171C | G-171C Main Power Generation | ⊘⊙⊙ | 00.0 |
| K-122A | K-122A Flash Gas Compression | ⊘⊙⊙ | 00.0 |
| K-122B | K-122B Flash Gas Compression | ⊘⊙⊙ | 00.0 |
| K-127A | K-127A Flash Gas Compression | ⊘⊙⊙ | 00.0 |
| K-127B | K-127B Flash Gas Compression | ⊘⊙⊙ | 00.0 |
| K-153A | K-153A Export Gas Compression | ⊘⊙⊙ | 00.0 |
| K-153B | K-153B Export Gas Compression | ⊙⊙⊙ | 00.0 |

FIG.14k2

SWP Complete Report

Monitoring SWP with 28 trains for a total of 56 equipment
Complete: <u>Train, Body, Tag</u>   Exception: <u>Train, Body, Tag</u>

| 30 days %Util | 90 days %Util | x Body | x Equipment Type | x Conf Lvl | x RunStatus | drvr rpm 90% | drvr amp 90% | drvr pwr 90% | drvr p1 45% |
|---|---|---|---|---|---|---|---|---|---|
| 00.0 | 00.0 | A-231A | Centrifugul Compressor | 100 | ⊘☉☉ | | | | |
| | | DA-231A | Motor | | | | | | |
| 00.0 | 00.0 | A-231B | Centrifugul Compressor | 0 | ☉☉⊘ | | | | |
| | | DA-231B | Motor | | | | | | |
| 00.0 | 00.0 | A-231C | Centrifugul Compressor | 100 | ⊘☉☉ | | | | |
| | | DA-231C | Motor | | | | | | |
| 00.0 | 00.0 | DG-171A | Gas Turbine | 90 | ☉☉☉ | 00.0 | | | |
| | | G-171A | Generator | 195 | ⊘☉☉ | | | | |
| 00.0 | 00.0 | DG-171B | Gas Turbine | 0 | ☉☉⊘ | 00.0 | | | |
| | | G-171B | Generator | 0 | ☉☉⊘ | | | | |
| 00.0 | 00.0 | DG-171C | Gas Turbine | 45 | ☉☉⊘ | 00.0 | | | |
| | | G-171C | Generator | 195 | ⊘☉☉ | | | | |
| 00.0 | 00.0 | DK-122A | Motor | | | | | | |
| | | K-122A | Reciprocating Compressor | 250 | ⊘☉☉ | | | | |
| 00.0 | 00.0 | DK-122B | Motor | | | | | | |
| | | K-122B | Reciprocating Compressor | 250 | ⊘☉☉ | | | | |
| 00.0 | 00.0 | DK-127A | Motor | | | | | | |
| | | K-127A | Reciprocating Compressor | 250 | ⊘☉☉ | | | | |
| 00.0 | 00.0 | DK-127B | Motor | | | | | | |
| | | K-127B | Reciprocating Compressor | 250 | ⊘☉☉ | | | | |
| 00.0 | 00.0 | DK-153A | Gas Turbine | | | | | | |
| | | K-153A | Centrifugul Compressor | 300 | ⊘☉☉ | | | | |
| 00.0 | 00.0 | DK-153B | Gas Turbine | | | | | | |

FIG.14k3 bodies.

| | dryr p2 45% | drvr r3 45% | drvr r3 45% | drvn rpm 100% | drvn smp 100% | drvn pwr 100% | drvn flow 100% | drvn p1 90% | dryr p2 50% | dryr t1 50% | dryn t2 50% | Comments |
|---|---|---|---|---|---|---|---|---|---|---|---|---|
| | | | | | | | | | | | 73.21 | |
| | | | | | | | | | | | 31.55 | |
| | | | | | | | | | | | 75.27 | |
| | 139.42 | | 443.82 | | | | | | | | | |
| | | | | | 60.03 | 2751.6 | | | | | | |
| | | 0.1 | | 41.69 | | | | | | | | |
| | | | | | | 00.0 | 00.0 | | | | | |
| | | | | | 488.65 | | | | | | | |
| | | | | | 60.03 | 2756.2 | | | | | | |
| | | | | | | 13262 | 8.17 | bad data | | 30.74 | 114.6 | |
| | | | | | | 13262 | 8.17 | bad data | | 39.74 | 114.6 | |
| | | | | | | 45931 | 30.79 | bad data | | 21.72 | 99.53 | |
| | | | | | | 45931 | 30.79 | bad data | | 21.72 | 99.53 | |
| | | | | | | | bad data | 464142 | 75.56 | 190.92 | 34.05 | 08.40 |

|  FIG.14m1 | FIG.14m2 |
|---|---|
| FIG.14m3 | FIG.14m4 |

FIG.14m

| FIG.14n1 | FIG.14n2 |
|---|---|
| FIG.14n3 | FIG.14n4 |

FIG.14n

| FIG.14l1 | FIG.14l2 |
|---|---|
| FIG.14l3 | FIG.14l4 |

FIG.14l

|EP>EPA>Malampaya>Dashboard|

All Assets x

Summary

Platform
SWP

Gas Plant
OGP

Data
Threshold
Train/Body
TagSource
Overview

| Point ID | Tag Name |
|---|---|
| P1 | 1FI153_01 |
| P2 | 1FI153_51 |
| P3 | 1FI307_06 |
| P4 | 1FIC225_07 |
| P5 | 1FIC225_07 |
| P6 | 1FIC373_08 |
| P7 | 1FIC373_08 |
| P8 | 1FIC373_08/ |
| P9 | 1FIC373_06 |
| P10 | 1FIC701_04 |
| P12 | 1FIC701_04 |

FIG.14I1

Scan Data Threshold Test

Refreshed on 2008-04-22 06:08 PM using current data.

of data points scanned: 106.

| Description | Status | Low | Threshold | High | Scan Data | Eng. Unit | User Conf |
|---|---|---|---|---|---|---|---|
| K-153 A Compressor Inlet Flow Rate | | 00.0 | 50000 | 500000 | 461142 | KG/H | |
| K-153 B Compressor Inlet Flow Rate | | 00.0 | 100000 | 500000 | 61516 | KG/H | |
| P-307 A/B Pump flow | | 00.0 | 1500 | 2500 | 232.2 | M3/H | |
| P-222 A Pump flow | | 00.0 | 65 | 650 | 360.7 | M3/H | |
| P-222 B Pump flow | | 00.0 | 65 | 650 | 179.17 | M3/H | |
| P-373 A Outlet flow | | 00.0 | 1 | 2.68 | 00.0 | M3/H | |
| P-373 B Outlet flow | | 00.0 | 1 | 2.55 | 2.27 | M3/H | |
| P-373 C Outlet flow | | 00.0 | 1 | 2.56 | 00.0 | M3/H | |
| P-373 D Outlet flow | | 00.0 | 1 | 2.66 | 2.13 | M3/H | |
| P-701 A Pump flow | | 00.0 | 140 | 2000 | 249.29 | M3/H | 100 |
| P-701 B Pump flow | | 00.0 | 1000 | 2000 | 00.0 | M3/H | 100 |

*FIG. 14/2*

| | |
|---|---|
| P12 | 1FQI123_02 |
| P13 | 1FQI128_02 |
| P14 | 1GEN_A_GEN_SUMM |
| P15 | 1GEN_A_GEN_SUMM |
| P16 | 1GEN_A_OPER_SUMM |
| P17 | 1GEN_A_OPER_SUMM |
| P18 | 1GEN_A_OPER_SUMM |
| P19 | 1GEN_B_GEN_SUMM |
| P20 | 1GEN_B_GEN_SUMM/ |
| P21 | 1GEN_B_OPER_SUMM/ |
| P22 | 1GEN_B_OPER_SUMM |
| P23 | 1GEN_B_OPER_SUMM |
| P24 | 1GEN_C_GEN_SUMM/ |
| P25 | 1GEN_C_GEN_SUMM |
| P26 | 1GEN_C_OPER_SUMM |
| P27 | 1GEN_C_OPER_SUMM |
| P28 | 1GEN_C_OPER_SUMM |

FIG. 14/3

| | | | | | |
|---|---|---|---|---|---|
| K-122 A/B Dishcharge flow | 00.0 | 2000 | 20000 | 13262 | SM3/H |
| K-127 A/B Dishcharge flow | 00.0 | 5500 | 55000 | 45931 | SM3/H |
| G-171 A Generator speed | 00.0 | 55 | 60 | 60.03:H | Hz 100 |
| G-171 A Generator power | 00.0 | 5 | 3000 | 2751.6 | KW 95 |
| G-171 A GG Compress Inlet Temperature | 00.0 | 40 | 100 | 89.7 | DEGC |
| G-171 A PT N3 Speed A | 00.0 | 65 | 120 | 00.0 | PCT |
| G-171 A GG Compressor Outlet Pressure | 00.0 | 100 | 300 | 139.42 | BAR |
| G-171 B Generator speed | 00.0 | 55 | 60 | 00.0 | Hz 100 |
| G-171 B Generator power | 00.0 | 5 | 3000 | 00.0 | KW 95 |
| G-171 B GG Compress Inlet Temperature | 00.0 | 40 | 100 | 97.7 | DEGC |
| G-171 B PT N3 Speed A | 00.0 | 65 | 120 | 00.0 | PCT |
| G-171 B GG Compressor Outlet Pressure | 00.0 | 100 | 300 | 0.1 | BAR |
| G-171 C Generator speed | 00.0 | 55 | 60 | 60.03:H | Hz 100 |
| G-171 C Generator power | 00.0 | 5 | 3000 | 2758.2 | KW 95 |
| G-171 C GG Compress Inlet Temperature | 00.0 | 40 | 100 | 87 | DEGC |
| G-171 C PT N3 Speed A | 00.0 | 65 | 120 | 00.0 | PCT |
| G-171 C GG Compressor Outlet Pressure | 00.0 | 100 | 300 | 137.5 | BAR |

FIG. 14/4

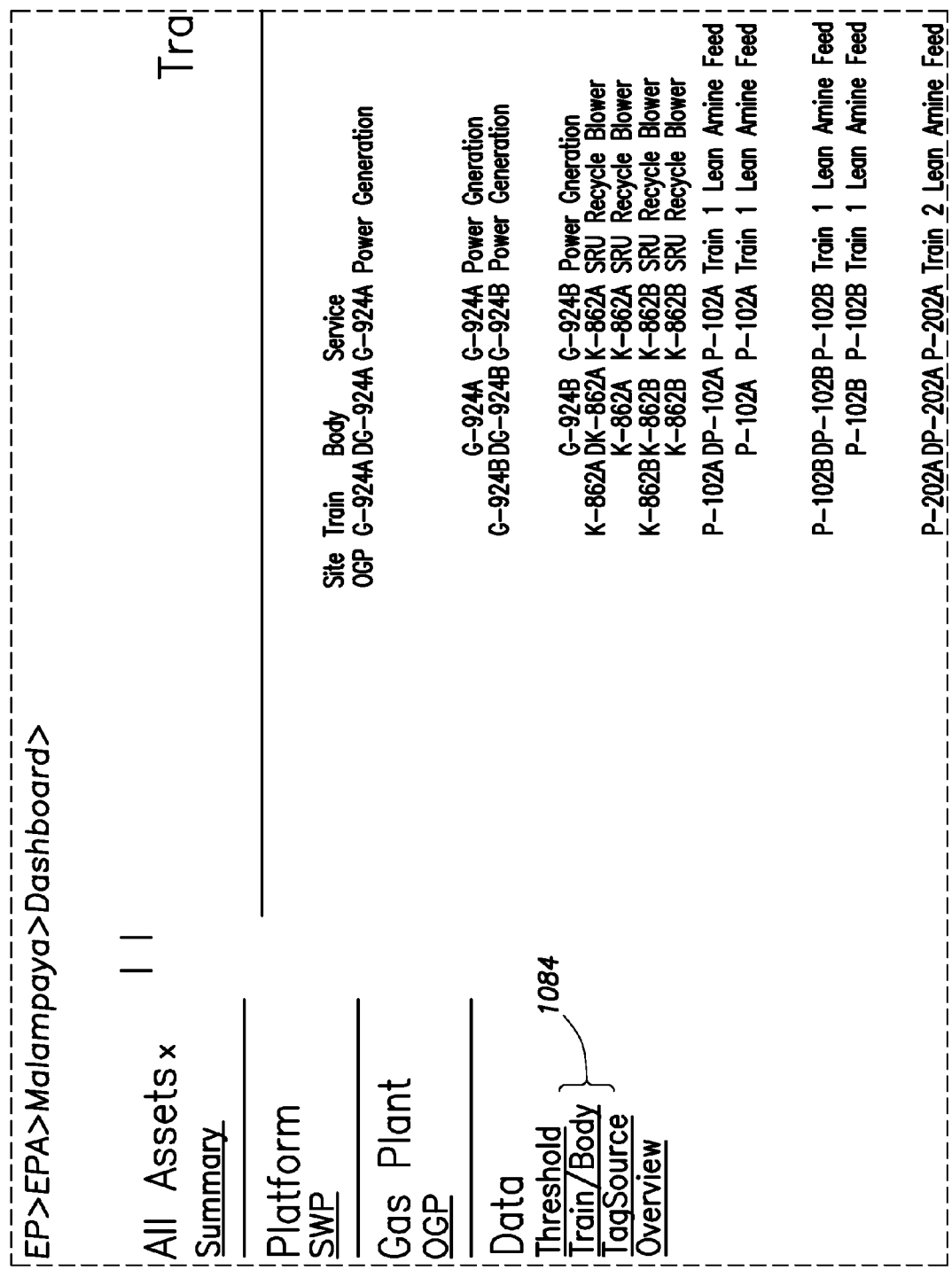
FIG.14m1 ins & Bodies & Tags Mapping

Monitoring all 2 sites 36 trains for a total of 72 equipment bodies.

| Equipment | Type | Tagname | Value | Qual | EngUnit |
|---|---|---|---|---|---|
| Gas Turbine | drvr pwr | 6EI924-51 | 805 | good | KW |
| | drvr t3 | 6TI924-17 | 32.26 | good | DEGC |
| | trvr t4 | 6TI953-12 | 431.11 | good | DEGC |
| Generator | drvn pwr | 6EI924-51 | 805 | good | KW |
| Gas Turbine | drvr pwr | 6EI924-51 | 00.0 | good | KW |
| | drvr t3 | 6TI924-1 | 32.11 | good | DWGC |
| Generator | drvn pwr | 6EI924-51 | 00.0 | good | KW |
| Motor | drvr rpm | 6SX862-05 | -439.69 | good | RPM |
| Blower | drvn p1 | 6PI652-14 | 0.39 | good | BAR |
| Motor | drvr tpm | 6SX862-04 | -430.23 | good | RPM |
| Blower | drvn p1 | 6PI652-14 | 00.0 | good | BAR |
| Pumping Motor | | | | | |
| Pumping Pump | drvn flow | 6FIC102-01 | 9.32 | good | M3/H |
| | drvn p1 | 6PI155-03A | 0.01 | good | BAR |
| Pumping Motor | | | | | |
| Pumping Centrifugul Pump | drvn flow | 6FIC102-01 | 4.04 | good | M3/H |
| | drvn p1 | 6PI155-03 | 0.35 | good | BAR |
| Pumping Motor | | | | | |

DP-202A P-202A Train 2 Lean Amine Feed
DP-202B P-202B Train 2 Lean Amine Feed
P-202B P-202B Train 2 Lean Amine Feed
SWP A-231A A-231A Air Compression
DA-231A A-231A Air Compression
A-231B A-231B Air Compression
DA-231B A-231B Air Compression
A-231C A-231C Air Compression
DA-231C A-231C Air Compression
G-171A DG-171A G-171A Main Power Generation
G-171A G-171A Main Power Generation
G-171B DG-171B G-171B Main Power Generation
G-171B G-171B Main Power Generation
G-171C DG-171C G-171C Main Power Generation
G-171C G-171C Main Power Generation
K-122A DK-122A K-122A Flash Gas Compression

FIG.14m4

| | | | |
|---|---|---|---|
| Pumping Centrifugal Pump | drvn flow 6FIC202-0 | 00.0 good M3/H | |
| | drvn p1 6PI255-03 | 0.2 good BAR | |
| Pumping Motor | | | |
| Pumping Centrifugal Pump | drvn flow 6FIC202-0 | 00.0 good M3/H | |
| | drvn p1 6PI255-03 | 0.41 good BAR | |
| Centrifugal Compressor Motor | drvn t2 1TI231_14 | 73.21 good DEGC | |
| Centrifugal Compressor Motor | drvn t2 1TI2131_ | 31.55 good DEGC | |
| Centrifugal Compressor Motor | drvn t2 1TI2131_14 | 75.27 good DEGC | |
| Gas Turbine | drvr rpm 1GEN_A_OPER_SUMM | 00.0 good PCT | |
| | drvr p2 1GEN_A_OPER_SUMM | 139.42 good BAR | |
| | drvr t4 1TI171_22A/VALUE_S | 443.82 good DEGC | |
| Generator | drvn rpm 1GEN_A_GEN_SUMM | 60.03 good Hz | |
| | drvn pwr 1GEN_A_GEN_SUMM | 2751.5 good KW | |
| Gas Turbine | drvr rpm 1GEN_B_OPER_SUM | 00.0 good PCT | |
| | drvr p2 1GEN_B_OPER_SUM | 0.1 good BAR | |
| | drvr t4 1TI171_22A/VALUE_S | 41.69 good DEGC | |
| Generator | drvn pwr 1GEN_B_GEN_SUMM1ALT | 00.0 good Hz | |
| | drvn pwr 1GEN_B_GEN_SUMM1PWG | 00.0 good KW | |
| Gas Turbine | drvr rpm 1GEN_C_OPER_SUMM1NPT | 00.0 good PCT | |
| | drvr t4 1TI171_G2A/VALUE_SENSOR | 456.65 good DEGC | |
| Generator | drvn rpm 1GEN_C_GEN_SUMM1ALTF | 60.03 good Hz | |
| | drvn pwr 1GEN_C_GEN_SUMM1PWR17 | 2758.2 good KW | |
| Motor | | | |

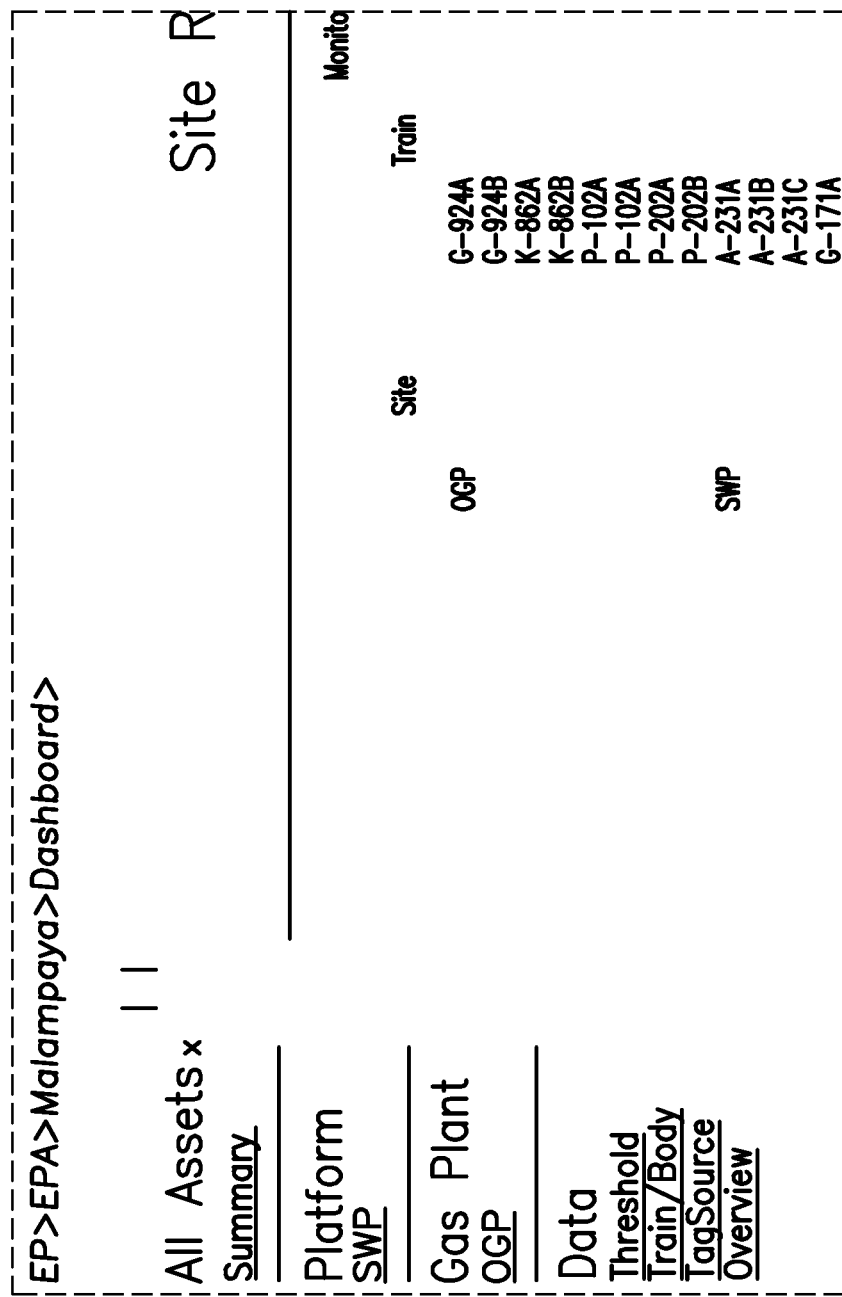
FIG.14n1

Run Status Complete Report

Covering all 2 sites 36 trains for a total of 72 equipment bodies.

| Service | Class # | Train % | Green % | Yellow % | Run Status | Train Conf Lvl % | Class Status |
|---|---|---|---|---|---|---|---|
| G-924A Power Generation | 1 | 100 | 100 | 100 | ●●● | 100 | ●●● |
| G-924B Power Generation | 1 | 100 | 100 | | ●●● | | |
| K-862A SRU Recycle Blower | 2 | 100 | 100 | | ●●● | 100 | |
| K-862B SRU Recycle Blower | 2 | 100 | 100 | | ●●● | | |
| P-102A Train 1 Lean Amine Feed Pumping | 3 | 100 | 100 | 100 | ●●● | | |
| P-102B Train 1 Lean Amine Feed Pumping | 3 | 100 | 100 | | ●●● | | |
| P-202A Train 2 Lean Amine Feed Pumping | 4 | 100 | 100 | | ●●● | | |
| P-202B Train 2 Lean Amine Feed Pumping | 4 | 100 | 100 | 50 | ●●● | | |
| A-231A Air Compression | 1 | 34 | 65 | | ●●● | 34 | |
| A-231B Air Compression | 1 | 34 | | | ●●● | | |
| A-231C Air Compression | 1 | 34 | | | ●●● | 34 | ●●● |
| G-171A Main Power Generation | 2 | 34 | 65 | | ●●● | 34 | |

FIG. 14n2

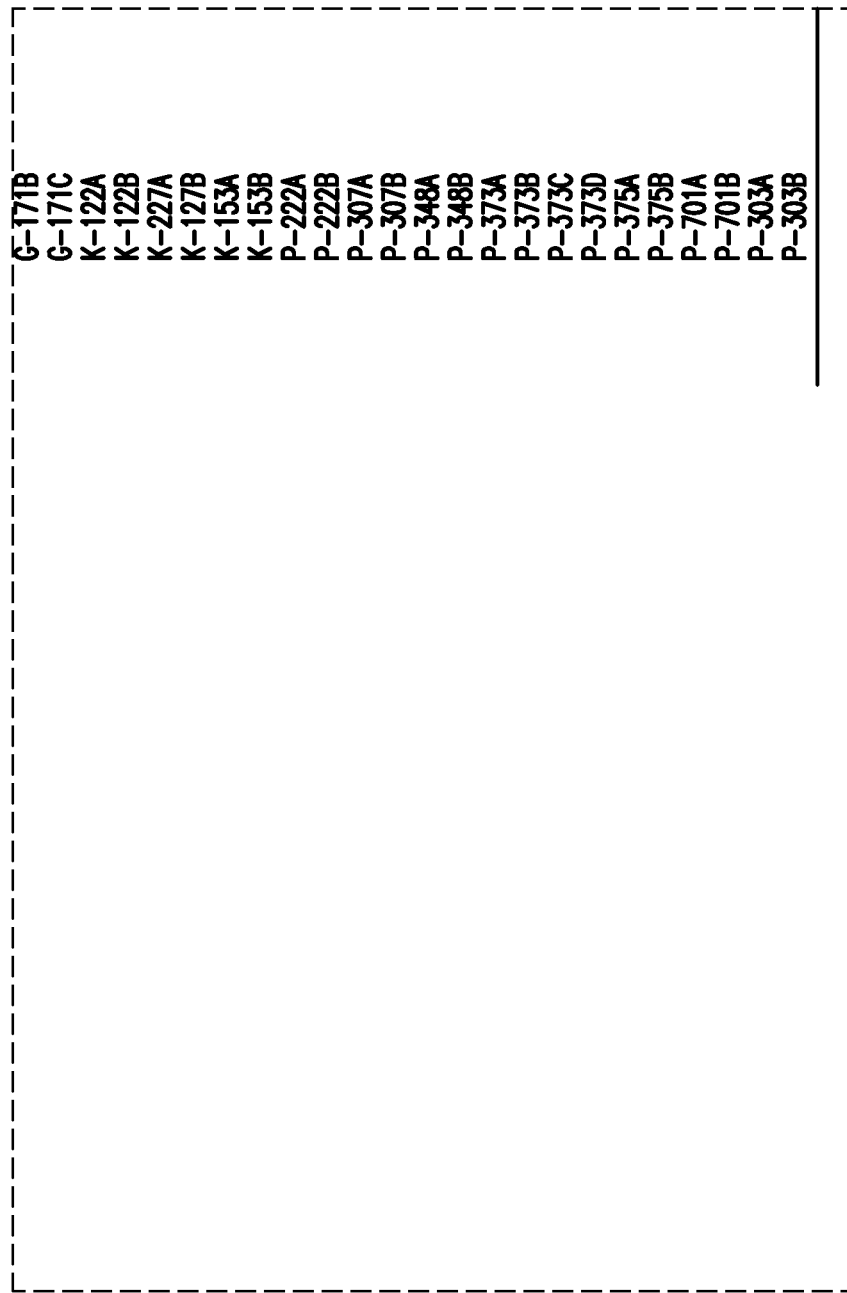
FIG.14n3

| Tag | Description | | | |
|---|---|---|---|---|
| G-171B | Main Power Generation | 2 | 34 | |
| G-171C | Main Power Generation | 2 | 34 | |
| K-122A | Flash Gas Compression | 3 | 50 | |
| K-122B | Flash Gas Compression | 3 | 50 | |
| K-227A | Flash Gas Compression | 3 | 50 | |
| K-127B | Flash Gas Compression | 3 | 50 | |
| K-153A | Flash Gas Compression | 4 | 100 | |
| K-153B | Flash Gas Compression | 4 | 100 | |
| P-222A | Heating Medium Circulation Pumping | 5 | 100 | 100 |
| P-222B | Heating Medium Circulation Pumping | 5 | 100 | |
| P-307A | CCWS Circulation Pumping | 6 | 100 | 100 |
| P-307B | CCWS Circulation Pumping | 6 | 100 | |
| P-348A | LP Flare Drum Pumping | 7 | 100 | 100 |
| P-348B | LP Flare Drum Pumping | 7 | 100 | |
| P-373A | Methanol Subsea Injection Pumping | 8 | 50 | |
| P-373B | Methanol Subsea Injection Pumping | 8 | 50 | |
| P-373C | Methanol Subsea Injection Pumping | 8 | 50 | |
| P-373D | Methanol Subsea Injection Pumping | 8 | 50 | |
| P-375A | Methanol Process Injection Pumping | 9 | 100 | 100 |
| P-375B | Methanol Process Injection Pumping | 9 | 100 | |
| P-701A | Export Condensate Loading | 10 | 100 | |
| P-701B | Export Condensate Loading | 10 | 100 | |
| P-303A | Sea Water Lifting Pump | 11 | 100 | |
| P-303B | Sea Water Lifting Pump | 11 | 100 | |

FIG.14n4

REMOTE MONITORING SYSTEMS AND METHODS

CROSS-REFERENCE TO RELATED APPLICATIONS

This application claims priority, pursuant to 35 U.S.C. §119(e), of U.S. Provisional Application Ser. No. 60/944,286 entitled "REMOTE MONITORING SYSTEMS AND METHODS," filed on Jun. 15, 2007 in the name of James Kong and is hereby incorporated by reference."

BACKGROUND

United States Patent Application Publication Number 20040153437 discloses an apparatus, system and method for facilitating decision-making in connection with management of enterprise assets. A real time expert decision support module is interfaced with an access portal including a navigation table for asset management, and with an historical parameter database associated with a distributed control system of plant end sensors and actuated control elements of a production process. The access portal and navigation table provide access to tools in the support module that facilitate real time decision making information delivery to the functional teams that support an asset, line of sight management performance models of team performance, practical performance analysis tools that extract information in real time from the process control system and other sources of asset data for translation into actionable information, and a real time interactive schematic environment. United States Patent Application Publication Number 20040153437 is herein incorporated by reference in its entirety.

SUMMARY OF THE DISCLOSURE

One aspect of the invention provides a system for monitoring an industrial process, comprising one or more sensors connected to one or more operating components of the industrial process; a remote monitoring station, comprising a computer and a database; and a connection between the one or more sensors and the remote monitoring station, wherein the remote monitoring station is at least about 100-2500 miles away from the industrial process, for example 500-1000 miles.

Another aspect of the invention provides a method for monitoring an industrial process, comprising connecting one or more sensors to one or more operating components of the industrial process; connecting the one or more sensors and a remote monitoring station; monitoring one or more operating parameters of the one or more operating components, such as pressures, temperatures, flow in, flow out, and energy consumed; comparing the one or more operating parameters with a database of known operating parameters at remote monitoring station, the known operating parameters for same or similar operating components; and adjusting operating conditions of the operating components when the one or more operating parameters exceed established parameters.

BRIEF DESCRIPTION OF DRAWINGS

FIG. 2b is a schematic representation of data flow of a remote monitoring service according to embodiments of the present disclosure.

FIG. 3 is a schematic representation of a remote monitoring service in operation according to embodiments of the present disclosure.

FIGS. 14a, 14b, 14c, 14d, 14e, 14f, 14g, 14h, 14i, 14j, 14k, 14k1, 14k2, 14k3, 14l, 14/1, 14/2, 14/3, 14/4, 14m, 14m1, 14m2, 14m3, 14m4, 14n, 14n1, 14n2, 14n3 and 14n4 are user interface screen shots according to embodiments of the present disclosure, FIG. 14k illustrates how the partial screen shots illustrated in FIGS. 14k1, 14k2, and 14k3 fit together to form a user interface screen shot according to embodiments of the present disclosure.

FIG. 14l illustrates how the partial screen shots illustrated in FIGS. 14/1, 14/2, 14/3, and 14/4 fit together to form a user interface screen shot according to embodiments of the present disclosure.

FIG. 14m illustrates how the partial screen shots illustrated in FIGS. 14m1, 14m2, 14m3, and 14m4 fit together to form a user interface screen shot according to embodiments of the present disclosure.

FIG. 14n illustrates how the partial screen shots illustrated in FIGS. 14n1, 14n2, 14n3, and 14n4 fit together to form a user interface screen shot according to embodiments of the present disclosure.

DETAILED DESCRIPTION

Figure 1A:
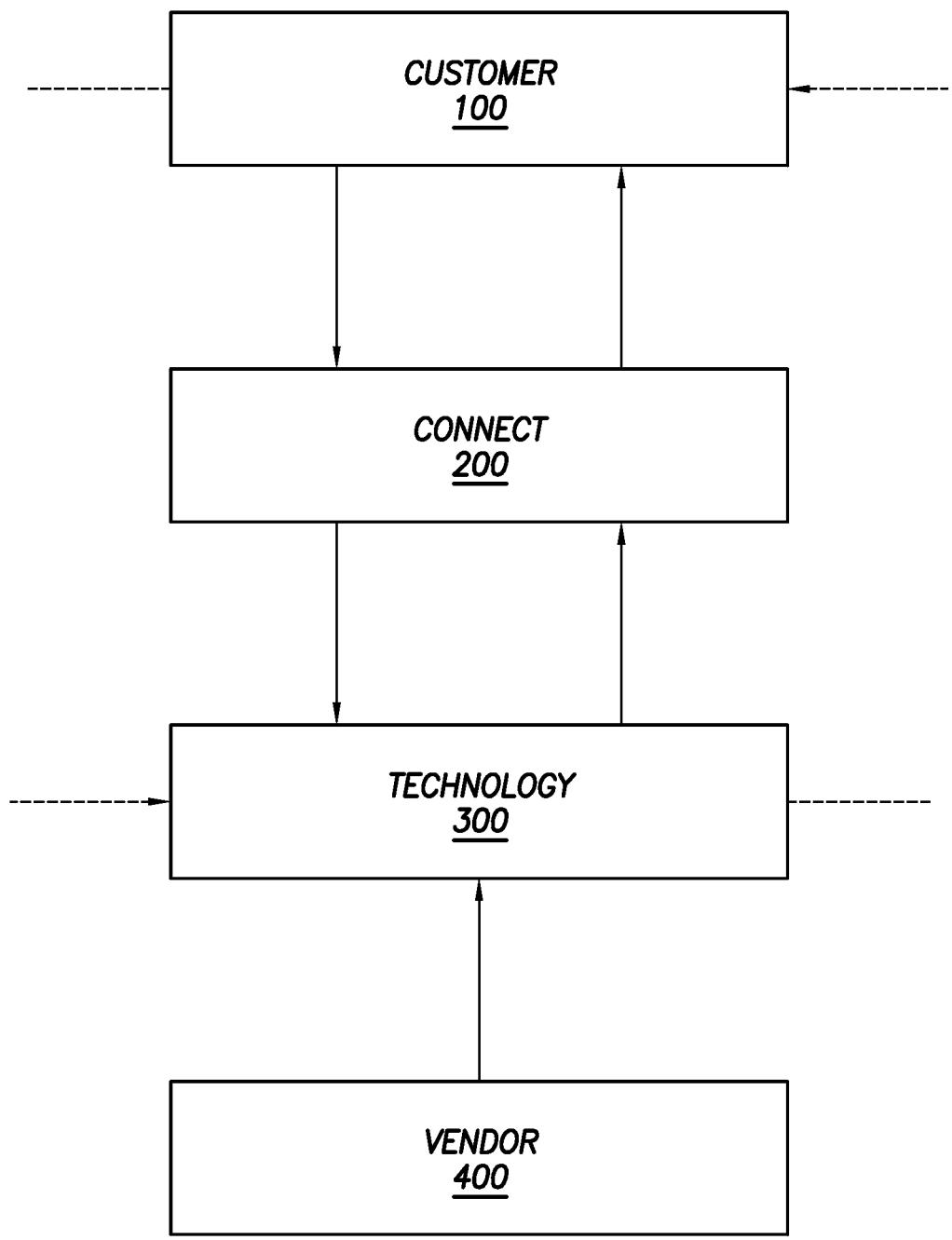
FIG. 1a is a schematic representation of a remote monitoring service according to embodiments of the present disclosure.

Specific embodiments of the disclosure will now be described in detail with reference to the accompanying figures. Like elements in the various figures are denoted by like reference numerals for consistency.

In one aspect, embodiments disclosed herein relate to systems and methods for monitoring industrial processes. More specifically, embodiments disclosed herein relate to systems and methods for the remote monitoring of industrial processes through the monitoring of specific system components. More specifically still, embodiments disclosed herein relate to systems and methods for the remote monitoring of industrial processes including the monitoring of operating parameters, analysis of the process, and recommended adjustments to components of the process.

Generally, embodiments of the present disclosure allow for an industrial process to be accessed by a remote monitoring service, such that the remote monitoring service may receive information about specific components at the process location. For example, in certain embodiments, a remote monitoring service may monitor components of an industrial process by receiving sensor data from components of the process. After receiving the sensor data, the remote monitoring service may proceed to analyze the data and determine whether the process is operating within acceptable conditions. If the process is not operating at a desired or required level of efficiency, the remote monitoring service may alert a process operator that a portion of the system is failing. For example, the remote monitoring service may alert an operator that a component of the system is not operating at a required level of functionality. The operator may then take corrective action, or in certain embodiments, may request additional information from the remote monitoring service, such as a suggested corrective action.

In addition to analyzing information from an industrial process, embodiments of the present disclosure may allow operators to receive real-time updates as to the status of the process. For example, in certain embodiments, the remote monitoring service may analyze information from an industrial process and send time interval based updates to the operator indicating the overall health of the process, or the health of individual components of the process. If the health of the process, or a component of the process falls out of an acceptable range, the remote monitoring service may inform the operator of the condition, and either suggest corrective action, or otherwise contact engineering experts such that the condition may be resolved.

Additionally, because the monitoring services may be remotely located, the industrial process and the remote monitoring services do not need to be located within a close geographical proximity. Thus, in certain embodiments, the remote monitoring station may be located thousands of miles from the industrial process. Because the remote monitoring services does not need to be in close proximity to the industrial process, multiple processes at multiple locations may be monitored by a centralized remote monitoring service.

According to embodiments of the present disclosure, customers may interact with remote monitoring services through a number of different connections, thereby allowing for real-time communication, monitoring, and analysis of customer processes by the remote monitoring service. Additionally, in certain aspects, vendors may interact with the remote monitoring service, so as to provide additional information to the remote monitoring service as industrial processes are monitored.

As used herein, customers refer to any individuals or entities that use the remote monitoring service to monitor, analyze, and provide solutions for industrial processes. Remote monitoring services interface with customers through varied connections, such as, for example, wired and wireless connections. In certain embodiments, remote monitoring services may interface with customers and/or vendors through satellite uplinks or the internet or other data connections, thereby allowing for the real-time transmission of data.

In certain embodiments, remote monitoring services provide technological solutions that allow industrial processes to be monitored, the results of the monitoring to be analyzed, and the results of the analysis to be sent to customers (or other entities that may request such information). The results of the analysis may include optimized process parameters, such that the operation of the industrial process meets required and/or desired level of efficiency. Furthermore, the results of the analysis may be used to generate predictive models, such that the remote monitoring service may provide information to a customer regarding, for example, routine maintenance, problems as they occur, and general process inefficiency. The generated models may also be stored in centralized databases such that multiple remote monitoring services may interface with each other and share the aggregate knowledge, thereby further increasing accuracy of the models and solutions.

Because remote monitoring services may be centralized and do not need to be located in close proximity to specific industrial processes, remote monitoring services may provide third-party functionality to multiple industrial processes for one or more customers. However, in certain embodiments, the remote monitoring services may also provide in-house analysis of industrial process, and as such, the systems and methods disclosed herein may be used in both in-house applications and third party applications on a contractual basis.

Those of ordinary skill in the art will appreciate that while the below described processes are specific to petroleum exploration and production, downstream refining, and gas and power production, embodiments disclosed herein may be applied to other processes, such as manufacturing, transportation, and testing facilities. Thus, the embodiments discussed below are illustrative to systems and methods of the remote monitoring of processes.

Figure 1B:
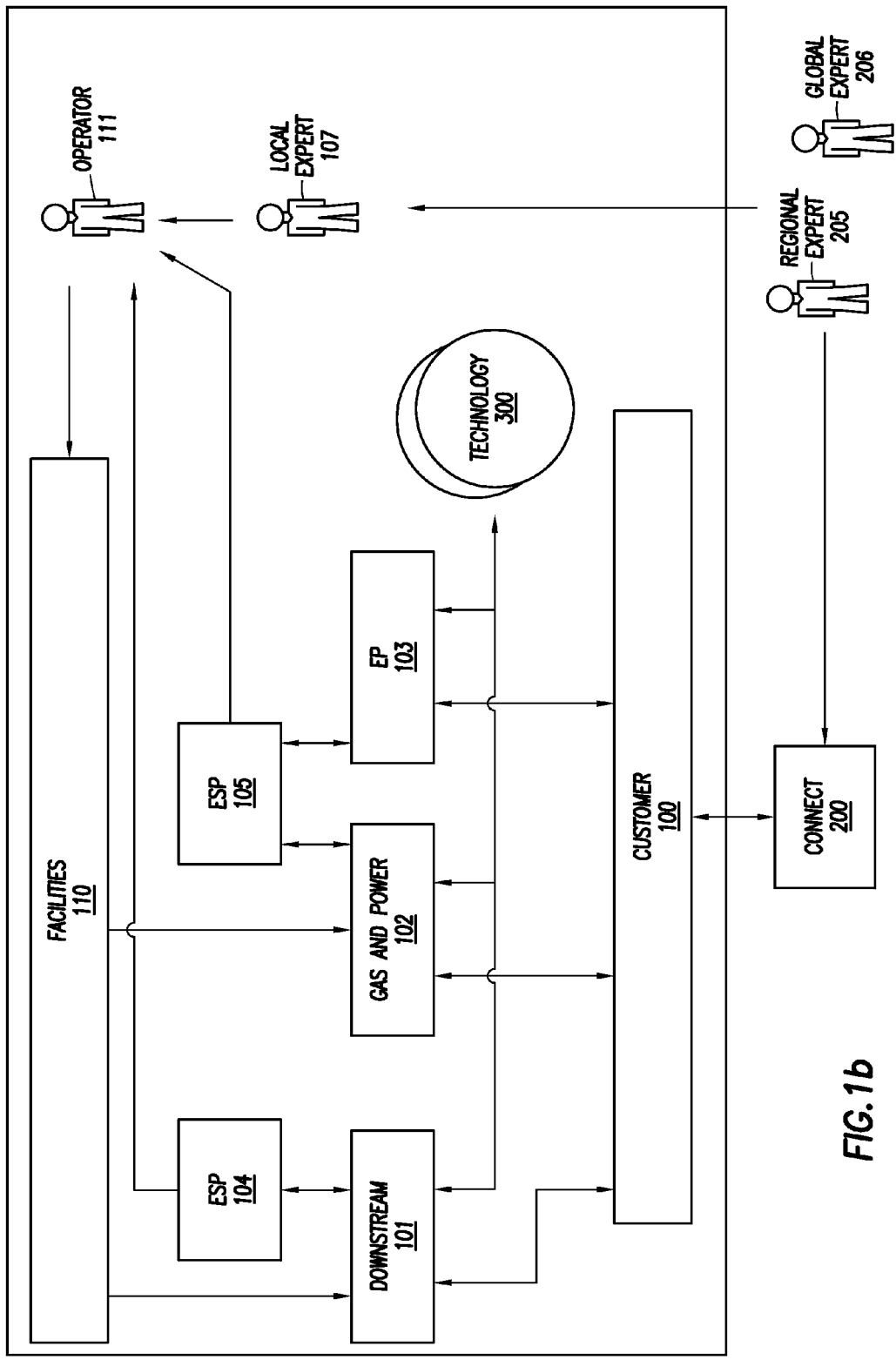
FIG. 1b is a schematic representation of a remote monitoring service in operation according to embodiments of the present disclosure.

FIGS. 1a & 1b:

Referring now to FIG. 1a, customer 100 may include any entity, which employs rotating and/or fixed assets to produce, manufacture, and/or distribute products produced, procured, or created by a company and/or a non-company entity. Connect 200 may include an integrated online monitoring technology center, which a company created to provide online support of existing rotating and fixed assets. Such connectivity provides a means to bring the global discipline experts to support remote company and/or non-company locations worldwide. Technology center 300 may include technology derived from the company's own efforts from years of research and development investment, including operating experience of various manufacturing processes that the company operated in the past and/or is currently operating to create value for the company. Vendor 400 may include a technology center provider for certain equipment such as, for example, gas turbines, and may have a clear technology center advantage over the company in certain aspects of their operation, such as in equipment modeling. The company may thus collaborate with vendor 400 to use vendor's models in conjunction with the company's own technology center and models to provide a more advanced technology to the company.

In operation, customer 100 sends process/equipment data from instrument sensors located on specific equipment located at a site operated and/or monitored by customer 100. Those of ordinary skill in the art will appreciate that the transfer of data from equipment to connect 200 may occur in real-time. Real-time, as used herein, may include data sent and received immediately and/or data sent and received in near real-time, in which some latency in the sending and receiving of the data may occur. The data may include, for example, flow rates, pressures, temperatures, densities, and viscosities of certain pieces of equipment and/or processes of an operation. For example, in one embodiment, the data may include a flow rate or temperature of a fluid flowing though a pump. The data may be collected as raw data from sensors on the pump, and then transmitted from customer 100 to connect 200 continuously, or in batch process, such as every 30 seconds, every minute or in desired time intervals. Connect 200 may then send data to technology center 300 in real-time, such that the data may be processed with company's technology center. After processing the raw data, data representative of health indexes and alert messages for abnormal situations may be generated. Connect 200 may then receive the generated data, such as performance and health indexes, as well as any alert messages from technology center 300, and return the results to customer 100.

In certain embodiments, wherein customer 100, for security and ownership reasons, demands technology center 300 to be implemented in customer's computer systems directly, remote support of customer 100 may be provided through connect 200 during normal operation. In such an embodiment, data may be sent directly from equipment to technology center 300 located at a customer's location, and connect 200 may be used to provide support and/or to receive and/or send data upon specific request of customer 100. An example of such a process flow is illustrated by the dashed line on FIG. 1*a*, wherein connect 200 is bypassed in the transmittance of data between customer 100 and technology center 300.

A company may also bring outputs from the vendors' models into the company's process computer systems, where such data may be integrated into a single display (e.g., a visual representation displayed on a screen) for the operators in the company's manufacturing facilities to view. The operators may then use the data provided by the vendor's models to adjust aspects of the customer's 100 operation. The process of transmitting a vendors' models may occur through use of a direct connection between technology center 300 and customer 100, as discussed above, or more generally though connect 200.

Referring now to FIG. 1*b*, customer 100 may include aspects of the operations from several of a company's operating divisions. For example, for a company involved in the production and refining of petroleum, operating divisions may include a downstream division 101, a gas and power division 102, and an exploration and production division 103. Downstream division 101 may include manufacturing facilities, which operate in downstream activities owned by either the company or a non-company entity. Those of ordinary skill in the art will appreciate that reference to downstream, as used herein, includes both aspects of refining and chemicals operating facilities.

In one embodiment, downstream division 101 may operate in real-time. Downstream operations 101 receive real-time process information from facility 110. If technology center 300 is implemented in a downstream computer system, the performance and health data for a number of pieces of equipment may be generated locally, and the results may be stored in a local data history. The local data history may include a database of prior collected data that is accessible by one or more of the technology center 300, the facility 110, and/or an operator at the downstream 101 locations. Downstream operations 101 may then validate the data against an operation monitor 104 to ensure the equipment is operated within acceptable limits. Examples of operation monitors 104 that may be used according to embodiments disclosed herein include such databases and logic tools discussed in co-pending International Patent Application No. PCT/US2008/067116, hereby incorporated by reference in its entirety.

Operation monitors 104 may allow for analyzing equipment using data obtained from the equipment. The data represents the operational conditions of the equipment. The operational conditions may define both conditions internal to the equipment, such as how well the equipment is operating, as well as conditions external to the equipment, such as the environment in which the equipment is operating. Detectors monitoring the equipment may be used to obtain unprocessed data values representing the operational conditions. Unprocessed data values from different detectors may be processed, such as by being mathematically combined, to create processed detector data values. The different detector data values, including processed and/or unprocessed detector data values, are encoded. The encoding is based on whether the value is in a predefined range of values. The ranges are defined based on acceptable limits for the equipment. For example, the range may include a high range, an above normal range, a normal range, a below normal range, and a low range. If a value is within the range, then one or more bits are set to indicate that the value is within the range. The bits are concatenated to generate a signature. Thus, the single signature represents the state of the equipment at a moment in time. Specifically, a single signature concisely represents which processed and/or unprocessed detector data values are within acceptable limits and which detector data values are outside of acceptable limits.

One or more signatures may be compared with stored patterns of signatures. A pattern associates the occurrence of one or more classified or known signatures with a definition of how the equipment is functioning. Specifically, when one or more generated signatures matches the classified signatures in a pattern, then the equipment is determined to be functioning as defined by the pattern. Thus, by comparing one or more generated signatures with known patterns of signatures, the operational and design databases may be used to evaluate the equipment and/or store data representing current and past conditions of equipment.

In this embodiment, operation monitor 104 is the company's system to encapsulate a technology center derived from the company's own efforts from research and development investment and operating experience of various manufacturing processes in a safe and efficient operation of the facilities. Operation monitor 104 is optimized for the analysis of downstream data. Operation monitor 104 operates in real-time, online, and/or in batch mode. In real-time mode, the system validates data from the data historian, either instrument measurements or calculations from downstream operations 101, and triggers an alert for abnormal conditions to operator 111. In online mode the system generates alert messages to operator 111, and monitors follow-up actions. In batch mode, the system generates reports that are incorporated into the overall production reports delivered to downstream 101 via facility 110.

Downstream 101 may then send the real-time data to connect 200. The performance data received from connect 200 may be checked against the data in operation monitor 104 to decide if action needs to be taken. Exemplary actions may include adjusting a parameter of the equipment, such as a pump rate, adjusting a parameter of a system, such as a power signal, or adjusting other aspects of systems and/or equipment that may be monitored according to the embodiments disclosed herein.

Gas and power operations 102 may include a manufacturing facility that operates in the gas and power business, either owned by the company or a non-company. Gas and power operations 102 may operate in real-time in one or more of the following manners. In one embodiment, gas and power operations 102 may receive real-time process information from Facility 110. If technology center 300 is implemented in gas and power's 102 computer system, the performance and health data for a number of pieces of equipment may be generated locally and the results stored in the local data history. Gas and power operations 102 validates the data against operational and design database in another operation monitor 105 to ensure the equipment is operated within acceptable limits. Gas and power operations 102 send the real-time data to connect 200 and receive performance and health information from connect 200. The performance data from connect 200 may be checked against operation monitor 105's computer system/database to decide if action needs to be taken.

Exploration and production operations 103 may include a manufacturing facility that operates in the upstream business, for example exploration and production, which includes both sub-surface exploration, and above surface production facilities, either company owned or non-company owned. Exploration and production operations 103 may operate in real-time, and may receive real-time process information from facility 110. If technology center 300 is implemented in exploration and production operations' 103 computer system, the performance and health data for a number of pieces of equipment may be generated locally, and the results stored in a local database. Exploration and production operations 103 then validate the data against an operation and design database in operation monitor 105 to ensure the equipment is operated within acceptable limits. Exploration and production operations 103 may then send the real-time data to connect 200, as well as receive performance and health information from connect 200. The performance data from connect 200 may be checked against operation monitor 105's computer system/database to decide if action needs to be taken.

Operation monitor 105 is the company's system to encapsulate the technology center derived from their own efforts from years of research and development investment and operating experience of various manufacturing processes in the safe and efficient operation of the facilities. Similar to operations monitor 104, operations monitor 105 is optimized for gas and power, as well as exploration and production operations. Operations monitor 105 may operate in real-time, online, and/or batch mode. In real-time mode the system validates data from the data historian, including either instrument measurements or calculations from gas and power operations 102 and/or exploration and production 103 operations. Operation monitor may then trigger an alert for abnormal conditions, thereby informing operator 111 of such a condition. In online mode the system generates alert messages to operator 111 and monitors follow-up actions. In batch mode operation monitor 104 generates reports that are to be incorporated into the overall production reports delivered to gas and power operations 102 and exploration and production operation 103 via facility 110.

Generally, facilities 110 includes infrastructure, hardware, processes, and equipment in the customer's 100 manufacturing facilities. The facilities 110 may be instrumented with state-of-the-art computer and electronic instruments to measure and transmit process data. Facility 110 may also operate in real-time, transmitting process data, such as temperature, pressure, flow, densities, viscosities, feed qualities and compositions, to the customer's 100 business entities. Other business data, such as feeds and products and market information may also be transmitted to customer 100 as required.

Operator 111 includes individuals and/or companies of a specific locality, typically allocated to the safe and efficient operation of the facility. Operators 111 are generally highly trained staff backed up by comprehensive technical resources at their disposal to solve day-to-day problems. These staff members are generalists who may handle common problems arising from normal facilities operation; however, for abnormal situations, the experts in the technical disciplines are typically contacted for assistance. The systems according to embodiments disclosed herein may provide time critical emergency shutdown situation responses, information for anticipating future problem(s), and data to assist planning and maintenance scheduling. Thus, the systems and methods disclosed herein may be used by operator 111 to improve the function and efficiency of specific operations.

Typically, operators 111 are responsible for running a facility and/or operation. Operator 111 may receive information from facility 110 via computers and network systems of customer 100, including the performance and health of the machinery. Operator 111 may also receive instructions from operation monitors 104 and 105 via computer and network systems from customer 100 when abnormal conditions in operations are anticipated, and when such abnormal conditions require attention. The system(s) in operation monitors 104 and 105 may detect or anticipate problems, using sophisticated modeling, statistical, and prediction techniques coupled with experience data. Operator 111 may take all the information and advice into account and apply appropriate corrective actions to facility 110. In certain embodiments, operator 111 may request technical assistance from local experts 107 and/or receive remedial action from local expert 107. Furthermore, local expert 107 may update the knowledge database, including the addition of new solutions, modified solutions, or to include additional data that may be used in solving future problems.

Local Expert 107 supports the operation both proactively from alert messages generated in operation monitors 104 and/or 105, or reactively upon requests directly from operator 111 for high-level technical support. In certain embodiments, local expert 107 may receive alert messages, which are generated automatically by the alarming and alert systems, as well as advice regarding corrective methods or actions. Local expert 107 may also contact either regional or global experts for even higher-level support if the problem is of a more difficult nature and beyond the ability of the local expert to resolve. When a solution is available, advice for action may then be forwarded to the operator 111 who may implement the action to correct the situation. Local expert 107 may then update the knowledge database with the solutions, as described above.

In operation, facility 110 transmits real-time signals from plant instruments, which may carry pressure, temperature, flow, viscosity, and/or density from analog/digital recorders, feeds and products composition, hot and cold properties from the online analyzers, to the customer 100, real-time process information systems, and data historian servers. The relevant real-time process data may be sent to technology center 300.

The resulting performance and health assessments, in the form of key performance indicators, may be returned to customer 100's data historian server for long-term archiving.

According to the embodiments disclosed above, there are at least two modes of operation for a system using the above-defined components. Mode-1 includes hosting technology center 300 in customer 100's own facility, and Mode-2 includes hosting technology center 300 from a remote monitoring and diagnostics center ("RMD"), including both Regional and Global centers. A detailed description of a system operating according to both Mode-1 and Mode-2 is found below; however, those of ordinary skill in the art will appreciate that in alternate embodiments, systems according to the present disclosure may operate according to design modifications of both Mode-1 and Mode-2. As such, the examples disclosed below are illustrative, not exhaustive, as to the scope of the present disclosure.

Mode-1: Local Technology Center Hosting

If local computer systems of customer 100 are capable of hosting the requisite applications, technology center 300 may be implemented directly in customer's 100 computer systems.

In such an embodiment, real-time process data may be sent to technology center 300. Performance and health data from technology center 300 in customer 100's computer systems and servers may then be transmitted to one or more of operation monitors 104 and/or 105 for health and safety checks. If abnormal conditions are detected, operation monitors 104 and/or 105 may send alert messages to operator 111.

Mode-2: Remote Hosting of Technology Center 300

If local computer systems of customer 100 are not capable, or if customer 300 is not willing to host the requisite applications, technology center 300 may be implemented in the computer systems in RMD centers or as a part of connect 200 application servers.

In this embodiment, real-time process data from customer 100 may be sent to technology center 300 via connect 200 to the remote hosting servers. Performance and health data from technology center 300 in the remote computer systems and servers are returned to customer 100's computer systems via connect 200. Customer 100's own applications may then transmit the data to operation monitors 104 and/or 105 for health and safety checks. If abnormal conditions are detected, operation monitors 104 and/or 105 may send alert messages to operator 111.

Those of ordinary skill in the art will appreciate that while the above disclosure is specific to an oil and gas refining operation, including divisions such as downstream processing, gas and power generation, and exploration and production, the embodiments disclosed herein may be used in numerous other applications. For example, in certain embodiments, the operation may include manufacturing operations, shipping operations, processing operations, or any other type of operation in which system monitoring of equipment may improve the function of the system.

Figure 2A:
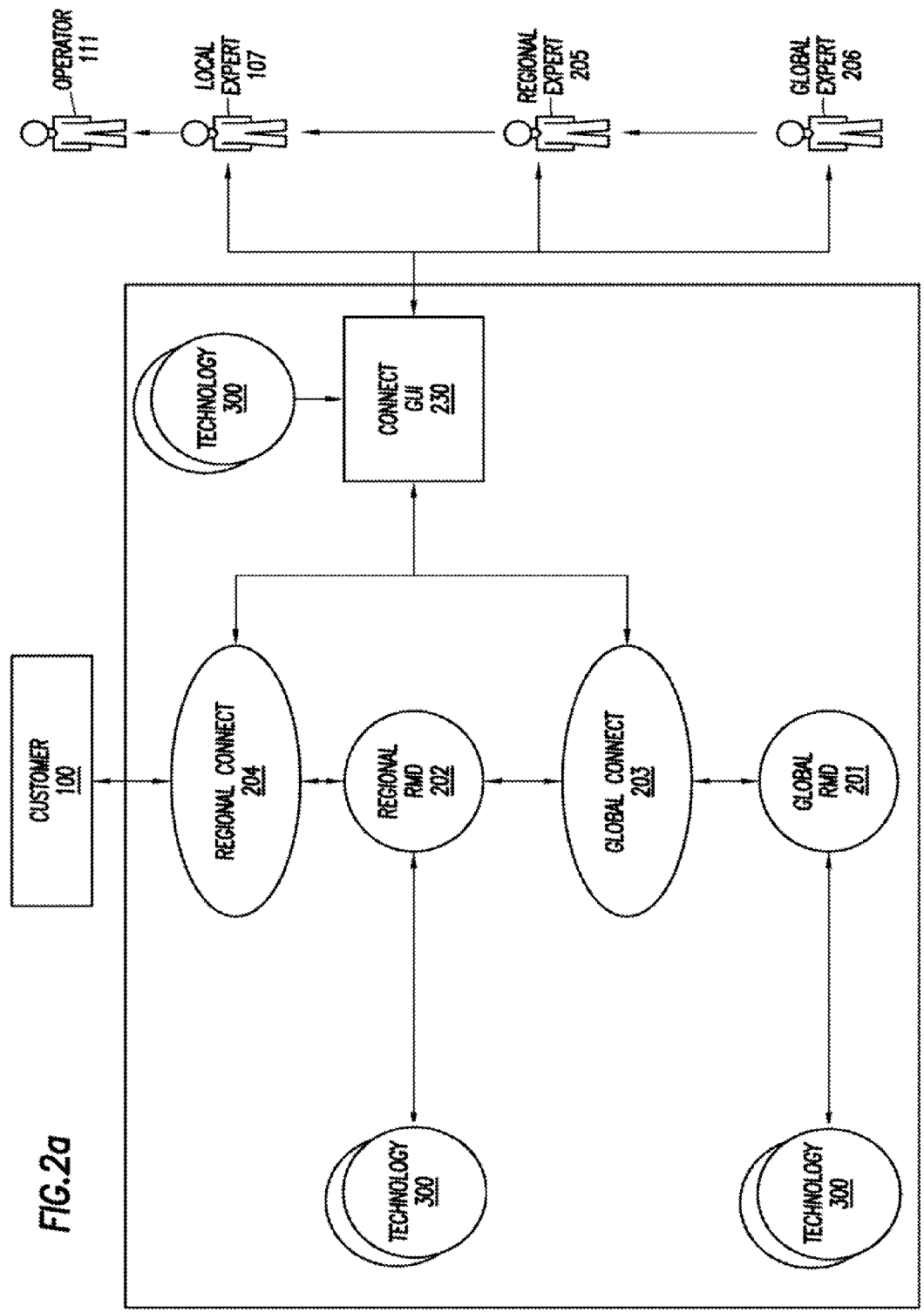
FIG. 2a is a schematic representation of data flow of a remote monitoring service according to embodiments of the present disclosure.

FIGS. 2a & 2b:

Referring now to FIG. 2a, connect 200 includes a connectivity layer for customer 100 and technology center 300. In this embodiment, a global RMD center 201 is built to support the remote monitoring and provide diagnostics capabilities of the company's global manufacturing business, as defined by customer 100. Global RMD centers may be located in any region of the world, for example the Americas, Asia, and Europe. The centers may thus be staffed during local business hours for the region in which it is located, which may provide 24 hour global support as one or more of the centers will be open at all times. As the customer's base expands and business grows, the three facilities may be staffed at additional hours, including 24 hour staffing.

Global RMD center 201 may operate during normal business hours of the region in which it is located. In this embodiment, the operation of global RMD center 201 includes remotely monitoring equipment and providing the diagnostic services in response to real-time events. The real-time process data may thus be transmitted from facility 110 (of FIG. 1b) via computer systems of customer 100 to regional RMD centers 202 via the access control layer, regional connect 204. Regional connect 204 forwards facility data to global RMD center 201's computer system over global connect on a continuous or batch bases. Technology center 300 is running inside global RMD centers 201 computer system to compute, for example, the performance and health of equipment and predict rate a of deterioration of performance overtime. The performance and health data from technology center 300 in global RMD center 201 will then be sent back to regional RMD center 202. The performance and health data from regional RMD center 202 may then be sent to customer 100 via regional connect 204 for local viewing and archiving using the customer's graphical user interface ("GUI").

Regional RMD center 202 includes a center built to support the remote monitoring and provide diagnostics capabilities of the company's global manufacturing business, as defined by customer 100. Regional RMD center 202 may operate during normal business hours within the company or location. Thus, regional RMD center 202 may remotely monitor equipment and provide diagnostic services in response to real-time events.

In operation, real-time process data may be transmitted from facility 110 via computer systems in customer 100 to regional RMD center 202 via regional connect 204. Regional connect 204 may or may not forward facility 110 data to global RMD center 201. Technology center 300 may run inside regional RMD center 202 to compute performance and health of equipment, as well as predict a rate of deterioration of performance over time for certain equipment. The performance and health data from technology center 300 in regional RMD center 202 may then be sent back to customer 100 via regional connect 204 for local viewing and archiving using customer's GUI.

Global connect 203 includes a network infrastructure built and controlled on a global basis. This layer of connectivity manages access control and protection from unauthorized access or malicious attacks from viruses. This layer also has access to global databases, which include the activities of customer 100. Global connect 203 may operate around-the-clock, control connectivity from unsecured public network via internet protocols, authenticate users, and grant connections to various computer business systems.

Regional connect 204 includes a network infrastructure built and controlled on a regional basis. This layer of connectivity manages access control and protection from unauthorized access or malicious attacks from viruses. This layer has access to a regional database, which covers one distinct company/location for each customer 100, separated according to, for example, geographical, political, or business boundaries. Regional connect 204 may operate around-the-clock, control connectivity from unsecured public network via internet protocols, authenticate users, and grant connections to various computer business systems.

Regional Expert 205 includes regional technical discipline experts typically assigned to provide remote support from either regional RMD center 202, or at alternate locations where they have access to regional connect 204, and as such, may provide online troubleshooting and diagnostics of facilities 110 for customer 100. Regional expert 205 may operate close to the company and region in which the facility is located, and are connected to the business entity via regional connect 204. Regional Expert 205 provides support on an exception basis to customer 100 and receives service requests from attendants in regional RMD centers 202 who have been alerted to a problem originating from customer 100. If a higher level of expertise is required to rectify the problem, regional expert 205 may authorize access to global expert 206 via global connect 203. Regional expert 205 may also communicate a solution to the problem to operator 111 for remedial action. Furthermore, regional expert 205 may document the solution and update the computer database at regional RMD center 202.

Global Expert 206 is the global technical discipline expert assigned to provide remote support from either the global RMD center 201, or at any location they have access to global connect 203 and regional connect 204 to provide online troubleshooting and diagnostics of facilities 110 for customer 100. Global expert 206 may operate in any region of the world, and are connected via global connect 203. Global expert 206 provides support on an exception basis to customer 100 indirectly, based on requests originating from regional expert 205. The service requests typically come from regional expert 205 who requires a higher level of support from global experts 206 to rectify a problem for Customer 100. Regional expert 205 authorizes access of global expert 206 via global connect 203 to regional RMD centers 202, where data and information relevant to the problem are stored. Global expert 206 may thus communicate a solution to a problem to regional expert 205 for remedial action(s). Global expert 206 may subsequently document the solution and update the computer database in global RMD center 201.

In operation, connect 200 (of FIGS. 1*a* and 1*b*) may have either regional or global RMD centers 201 and 202 made available to support customer 100. As such, technology center 300 may be implemented in the computer systems in regional RMD center 202. The input data from facility 110 may be sent to technology center 300 within the customer's computer systems. If regional RMD center 202 is established, real-time process data is sent to regional RMD center 202 via regional connect 204. The data may then be transferred to technology center 300 for processing. The resulting performance and health key performance indicators are returned to the customer's computer systems and servers. Subsequently the output data may be passed to operation monitors (104 and 105 of FIG. 1*b*) for health and safety checks. If abnormal conditions are detected, the operation monitors will send an alert message to operator 111.

Alternatively, both regional and global RMD centers 202 and 201 may be made available to support the customers. Technology center 300 may be implemented in the computer systems in regional RMD center 202. If global RMD center 201 is used to host technology center 300, real-time process data may be sent to global RMD center 201 via regional connect 204 and global connect 203. The data may then be transferred to technology center 300 for processing, and the resulting performance and health key performance indicators may be returned to customer 100. Subsequently the outputs may be passed to operation monitors (104 and 105 of FIG. 1*b*) for health and safety checks. If abnormal conditions are detected, operation monitors may send alert messages to operator 111.

Local operation support may be provided directly from operator 111. From alert messages generated by operation monitors, operator 111 may first attempt to solve the problem with the information provided by the computer systems and technology center documents on hand. However, for problems that require a higher level of support, local expert 107 or regional expert 205 may be contacted. Regional Operation Support comes from Regional Expert 205. Operator 111 may provide support requests, then regional expert 205 may access technology center 300 from either the customer 100 computer systems or from the regional RMD center 202 depending on where the application in technology center 300 is running. If the solution to the problem is found, operator 111 will be contacted with the solution. If the solution is new, and not yet documented, the solution will be added/updated in the regional RMD center's computer systems and/or the customer's computer systems. If additional high-level support is required from a global expert, regional expert 205 may contact global expert 206. Global operation support may thus be provided by global expert 206. Such global requests are initiated by regional expert 205, and after such a request, global expert 205 will access technology center 300 from one of the computer servers (e.g., customer computer systems, regional RMD centers 202, or global RMD centers 201), depending on where the application in technology center 300 is running. Access to regional RMD center's computer system occurs through regional connect 204 and to global RMD center 201 through global connect 203. If the solution to the problem is found, regional expert 205 will be contacted with a solution. If the solution is new and net yet documented the solution will be updated in the global RMD's center's computer systems, as explained above.

Referring now to FIG. 2*b*, connect 200 may provide the connectivity layer for customer 100 and technology center 300. Connect 200 may also house the regional (for some customers) and global remote monitoring and diagnostics centers to support the customers.

In operation, real-time process data may be transmitted from facility 110 via the customer's computer systems 100 to Global RMD center 201 via the access control layer, global connect 203. Technology center 300 is running inside global RMD center's computer system 201 to determine performance, health of equipment, and predict a rate of deterioration of performance overtime. The performance and health data from technology center 300 in global RMD center 201 will be sent back to customer 100 via global connect 203 for local viewing and archiving using the customer's GUI.

Global Experts 206, which may operate in any region of the world, are connected via global connect 203. Global expert 206 may provide support on an exception basis to customer 100 indirectly from requests originated from local expert 107. The service requests originate from local expert 107 who requires a higher level of support from global experts 206 to rectify problems at the customer's facility 110. Local expert 107 may request support via global connect 203 to global RMD centers computer system 201, where data and information relevant to the problem may be stored. Global expert 206 may then communicate a solution to the problem to local expert 107 for remedial action(s). Global expert 206 may then document the solution and update the computer database in global RMD center's computer system 201.

Connect 200 operates the support facility from the global RMD center and technology center 300 is implemented in the computer systems in global RMD center 201. If global RMD center 201 is used to host technology center 300, real-time process data are sent to global RMD center's computer system 201 via global connect 203. The data may then be transferred to technology center 300 for processing. The resulting performance and health key performance indicators may be returned to customer 100. Subsequently, the outputs are passed to operation monitors (104 and 105 of FIG. 1*b*) for health and safety checks. If abnormal conditions are detected operation monitors may send alert messages to operator 111. Local operation support comes from operator 111. From alert messages generated by operation monitors, operator 111 may attempt to solve the problem with the information provided by the computer systems and technology documents on hand. However, for those problems that require a higher level of support, global expert 206 may be contacted for advice. Global operation support comes from global expert 206. Support requests come from local expert 107. Global expert 205 may then access technology center 300 from one of the computer servers (e.g., customer computer systems or global RMD center computer systems), depending on where the application in Technology 300 is running. Access to global RMD center 201 occurs through global connect 203. If the solution to the problem is found, local expert 107 may be contacted with a solution. If the solution is new, the solution may be updated in the global RMD center computer system.

Figure 4A:
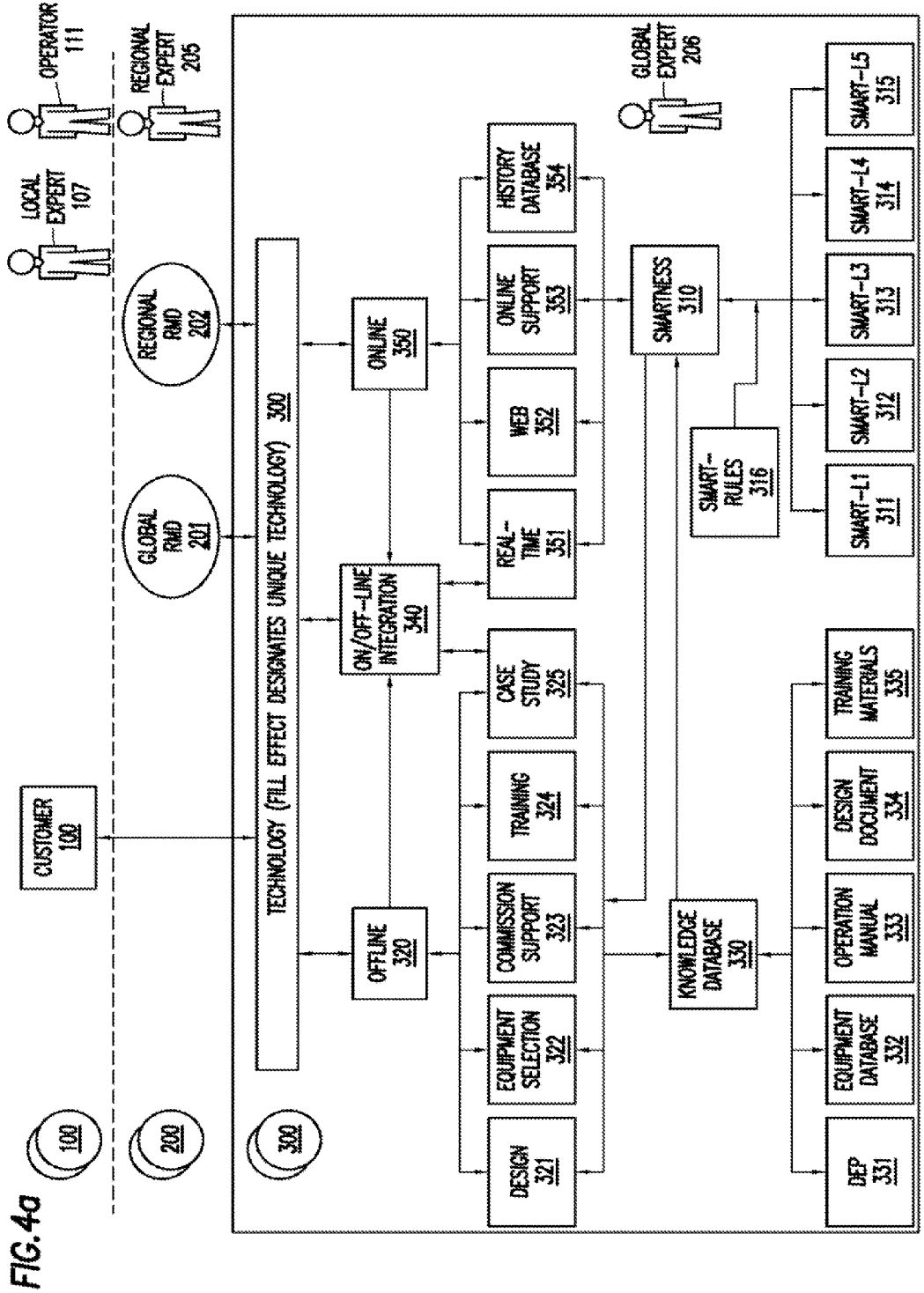
FIG. 4a is a schematic representation of a remote monitoring service in operation according to embodiments of the present disclosure.

FIGS. 3 & 4a

Referring now to FIGS. 3 and 4a, technology center 300 provides a conduit to channel the information from offline 320, on/off-line integration 340, and online 350 to regional RMD center 202, global RMD center 301, and/or customer 100. Technology center 300 has a number of modes of operation, including an offline 320, on/offline integration, and online 350. Each of the modes of operation will be discussed in detail below. Those skilled in the art will appreciate that in alternative embodiments, technology center 300 may include additional modes of operation, thereby allowing the system to function in varied states of on or offline.

In the Offline mode 320, technology center 300 operates by receiving signals from offline 320, originating from regional expert 205, global expert 206, and/or local expert 107, who operate in regional RMD centers 202, global RMD centers 201, and at customer locations 100, respectively. In this embodiment, there are no direct connections to online 350 except through on/offline Integration 340.

In the online mode, technology center 300 operates by exchanging data continuously between online 350 and customer 100. Data exchange also takes place between online 350, regional RMD center 202, and global RMD center 201 depending on where the technology center 300 applications are installed.

In the on/offline integrated mode, technology center 300 brings together Offline 320 and online 350 information and exchanges the information between online and offline applications in the protocols that are defined inside the integration layer in on/offline Integration 340.

A composite knowledge module 310 is the application of all of the company's information acquired from company's operating experience of the global manufacturing assets and the know-how from the research and development investments over the years. The knowledge models are designated as level 0, 1, 2, 3, 4, and 5 (L0, L1, L2, L3, L4, & L5), where L0 is the lowest level (know nothing) to increasing sophistication and complexity of technology embedded into different modules of knowledge as represented in L1 to L5. While L1 to L5 are related from the basic information requirement, L5 does not mean more technology than L1, and vice versa. The application of the level of knowledge to an asset depends on the infrastructure, availability of process data, and the fidelity of the instrumentations. The levels of knowledge, defined by the individual knowledge modules, may be set according to the requirements of a given operation and/or company protocol, however, those of ordinary skill in the art will appreciate that the levels may depend on variables such as experience, time investment, monetary investment, etc.

Composite knowledge module 310 may also include a collection of engineering principle models and suite of tools that plug-and-play into offline standalone engineering tools for design, commissioning, training, and case study, as well as for online monitoring and troubleshooting. The integration logic sends the output from one level of knowledge (e.g., L1) to the database of other levels (e.g., L2, L3, L4, and L5) as inputs to achieve a higher level of knowledge. The power of the unique division of levels of knowledge allows an extension of knowledge using the culmination and consolidation of different levels of knowledge to provide encompassing advice to the customer that previously would not be possible without integrated tool sets.

Composite knowledge module 310 also allows for the application of company information, acquired from operating experience of the global manufacturing assets and the know-how from research and development investments over the years. The levels of knowledge in the composite knowledge module may be defined as L1 (311) for equipment train availability and utilization, L2 (312) for equipment performance, L3 (313) for equipment basic health, L4 (314) for equipment advanced health, and L5 (315) for statistic models for global modeling, predictions, and benchmarking.

Composite knowledge module 310 may also refer to the aspects of L1, L2, L3, L4, and L5 models and rule sets for rotating equipment trains in standalone or online, depending on the nature of the execution. If execution of the model is initiated from an offline application it is running "in effect" offline, and if execution of the model is online controlled by a system scheduler it would be considered as in the online mode. Those of ordinary skill in the art will appreciate that the knowledge gained though composite knowledge module 310 may thereby allow for the nature of execution and run modes for equipment, trains, and/or system information to be modeled and/or used for system monitoring or optimization.

Offline mode 320 may run in, for example, a Microsoft® operating system based environment. In such a system, tools may be installed locally in the facilities where the experts are working in their respective operating environments. The equipment data for the offline work can come from regional RMD center 202 and/or global RMD center 201, as well as the process data from Customer 100. The offline tools may be used to support design 321, equipment selection 322, commission support 323, training 324, and case study 325.

Offline mode 320 may also operate in a standalone mode. Offline mode 320 has a suite of tools that derive from composite 310 and information database 330. The offline mode 320 tool kits may be used for equipment design, equipment selection, rotating equipment engineer training on how to troubleshoot with the tools, and perform case studies to assess the process for abnormal situation and what possible steps the remedial actions could be taken.

Information database 330 is the information of the company, which it has amassed for a period of time. Information database 330 may thus include collections of technology employed to run the business. The data may be in hard copy form, electronic form, published papers, trademarks, patents, etc. Information database 330 may also include a design engineering practice module 331, an equipment database 332, operating Manuals 333, design documents 334, and training materials 335.

On/offline integrated mode 340 is the integration technology of the offline and online operating environments. Technology center 300 brings together offline 320 and online 350 information, and allows for the exchange of information between online and offline applications. A system of data exchange protocols is established to allow configuration and design data passing to online application immediately as the defined concept is proven in design 321, and the model has been validated in case study 325. This technology allows rapid deployment from the design, construction, and commissioning of new applications.

Online 350 is the online part of the technology, which means the applications in this part are running continuously (or for discrete periods of time) within the domain. Online 350 receives data from and return results to customer 100 either directly or via regional RMD centers 202, and global RMD centers 201. Online 350 may also include functionality to connect to digital control systems and information process and control systems known in the specific industries of the application.

Online 350 receives process data from customer 100 and passes the data to real-time 351 for evaluation by engineering models. Online 350 may also receive laboratory data, typically in batch mode, from Customer 100. Online 350 may also receive data from Customer 100. However, economic data may not require as frequent updates as other aspects of the system.

In offline mode, offline 320 accesses technology center 300, the technology layer from which the tools and models reside, and are thus available to the global users. For example, to design equipment for new and revamp processes, to select equipment configurations for new and/or replacement units, to support commissioning of new and/or refurbished equipment, to train technical staff on using the suite of tools for local, regional, and/or global support, and/or to perform case studies to solve current operating problems with existing units.

In online mode, online 350 may run under the command of the scheduler from an application server on a fixed time interval, start a run, receive data from connect 200 in real-time, invoke the level of knowledge to monitor equipment online, compute key performance indicator values for equipment, return key performance indicator values to customer computer systems, wait for the subsequent time schedules, and repeat any of the above identified processes.

Furthermore, online 350 may, in another process, run under the command of the scheduler from an application server on a fixed time interval. During operation online 350, starts a run, receives data from connect 200 in real-time, invokes a level of knowledge to monitor equipment online, and procures current parameters to drive the model. If new parameters are detected, online 350 runs a self-check to ensure that the model and parameters are consistent, computes key performance indicator values for equipment, and returns key performance indicator values to customer computer systems. If an equipment problem is detected, and has to be studied and branched, then online 350 initiates a data and model dump, runs an application online using the data dump only, runs the same plug-and-play model in standalone mode and adjust the parameters to find ways to rectify the problem, find a solutions, and adjusts a model parameter if necessary. After model adjustment, online 350 may apply the new parameters to the same model from previous steps, and validate the solution of the simulation using the original model and data using new tuned parameters yielding the same desirable result. Additionally, online 350 may apply new "tuned" parameters to the online model, wait for a subsequent time schedule, and/or repeat any of the above identified processes.

In the offline mode, the process includes a user running a standalone program from connect 200, the standalone program activates composite knowledge module 310, composite knowledge module 310 activates the corresponding modules: L1 (311), L2 (312), L3 (313), L4 (315), and L5 (315) to service the user's request. Additionally, online input data may be gathered from connect 200, and output key performance indicator values may be returned to the user via the GUI. Connect 200 may also have the ability to detect that the request for online data is from an offline application, and returns data from datasets in the past.

In the online mode, the process includes a scheduler running an application program in the computer system in one of the installed servers. The installed servers could include one or more of the following: connect 200 application servers, regional RMD centers, global RMD centers, and customer computer application servers. The application program activates composite 310. Composite knowledge module 310 then activates one or more of the corresponding modules: L1 (311), L2 (312), L3 (313), L4 (315), and L5 (315) to service the user's request. Online input data may also be gathered from connect 200. Specification data, process constraints, and general constants may be retrieved from facility 110. The corresponding models may also be called to processes the input and specification data, as well as compute key performance indicator values. Output key performance indicator values and dynamic HTML web pages may also be returned to connect 200 and customer computers.

Figure 4B:
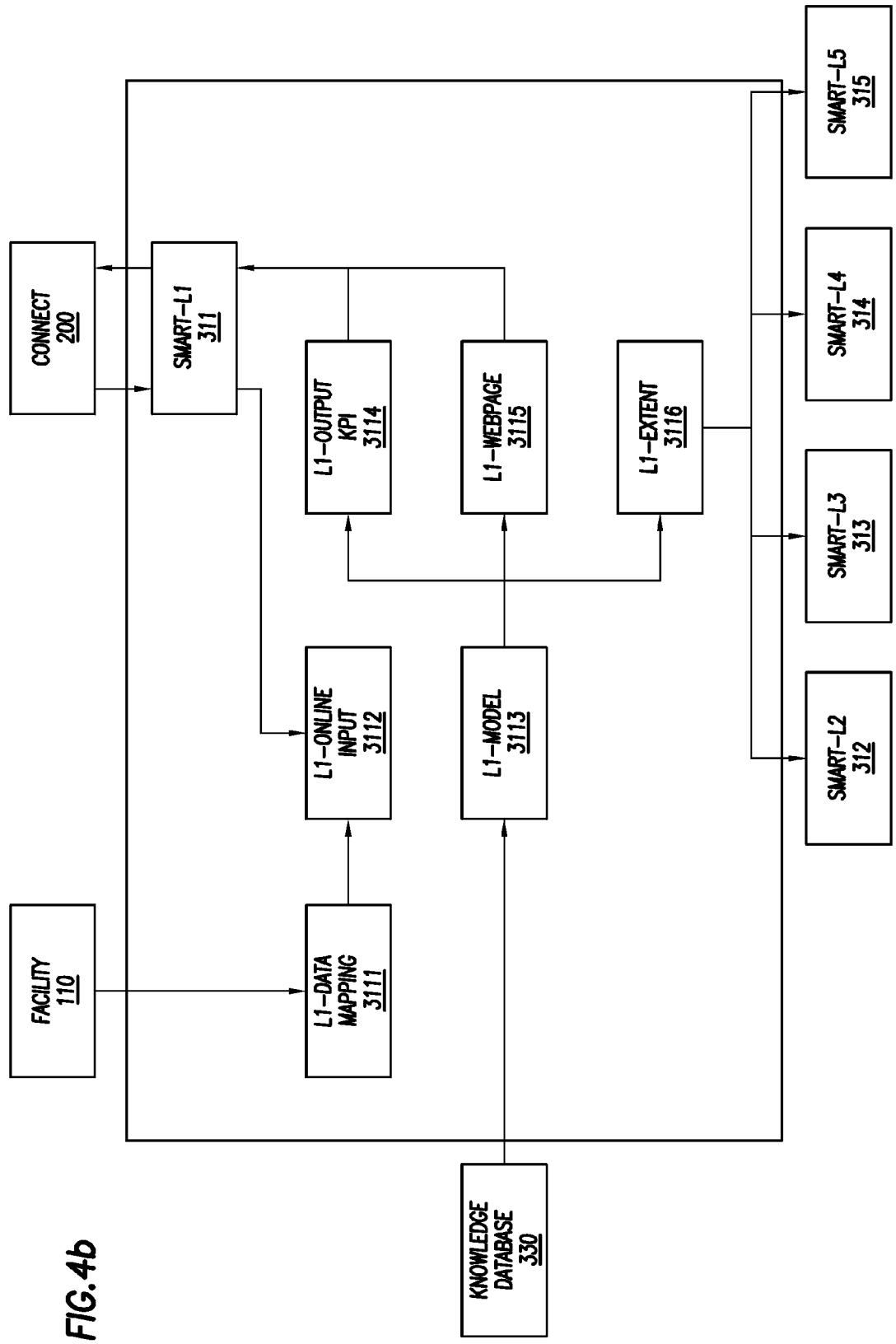
FIG. 4b is a schematic representation of an equipment train availability and utilization model according to embodiments of the present disclosure.

FIG. 4b:

Referring now to FIG. 4b, generally, L1 (311) provides operating experience on the availability of the rotating equipment in a "train" formation, which is a series of rotating equipment bodies that are connected together to uplift the products from sub-surface or transfer the products over surface transport facility to process units for separation of the feed into different products. L1-Data Mapping 3111 is a module that maps the input data in the equipment bodies to the train level. It also defines the mapping of output key performance indicators, as well as the availability and utilization output tags, which are returned to customer computer systems for long-term archiving and viewing. L1-Online Input 3112 merges the online and offline data that are required for L1-Model 3113 to process. Data validation is carried out in this step to ensure that there is enough information for the model and that the data quality is acceptable. L1-Model 3113 computes the availability and utilization of the equipment train using rules derived from operating experience of the equipment trains and sophisticated statistical and mathematical tools. Output from the confident level of the availability and utilization, both at the equipment bodies and the train level, are stored and forwarded to the output modules.

L1-Output Key Performance Indicators 3114 sends the performance indicator outputs via connect 200 to the customer's computer system for long-term archiving and viewing. L1-Webpages 3115 generate dynamic web pages using HTML standard implementation. The web pages are transferred to the web server via connect 200 for viewing by experts located at various worldwide company locations. In certain embodiments, a copy of the web pages is sent to the customer's web servers for local viewing. Additionally, in certain embodiments, a substantially complete set of web pages may be captured in real-time, such that the web pages may be transferred to a PC workstation and/or a standalone laptop for offline viewing and troubleshooting. L1-Extent 3116 is an integration module that sends the output from L1 to the database of L2, L3, L4, and L5 as inputs to the higher level of knowledge. This module has the knowledge of all the rest of the level, and updates the relevant and necessary information from L1 to their knowledge database.

Composite knowledge module 310 includes the deployment of the L1 model for rotating equipment trains in standalone or online, depending on the nature of the execution. If execution of the model is initiated from an offline application it is running "in effect" offline and if execution of the model is online, controlled by a system scheduler, it runs as in the online mode.

In the offline mode: the process starts, the user runs a standalone program from connect 200, the standalone program activates knowledge model 311, knowledge model 311 gathers the pre-defined equipment trains that have been defined in the equipment database, L1-Data Mapping 3111 retrieves specification data from facility 110, which has been captured during the commissioning of the L1 model for the equipment train, L1-Online Input 3112 gathers online process data from connect 200, L1-Model 3113 processes the input and specification data and computes the availability and utilization of key performance index ("KPI") values, L1-Output 3114 return the KPI values to the user via the GUI, and the process terminates.

In the online mode: the process starts, and the task scheduler runs an application program in the computer systems in one of the installed servers. The installed servers may include one or more of the following: connect 200 application servers, Regional RMD Centers, Global RMD Centers, and/or customer computer application servers. Next, the standalone program activates knowledge model 311, L1-Data Mapping 3111 gathers the pre-defined equipment trains that have been defined in the equipment database supplied by facility 110, L1-Online Input 3112 retrieves online data from connect 200, L1 model 3113 processes the input and specification data and computes the availability and utilization KPI values, and L1-Output KPI 3114 formats the output data and returns the data to connect 200 and customer 100. After the data is formatted, L1-Webpage 3114 creates web pages and sends the web pages to connect 200 and customer 100, L1-Extent 3116 updates knowledge model-L2 312, knowledge model-L3 313, knowledge model-L4 314, and knowledge model-L5 315 with the current computed L1 KPI values as the inputs to the next level of knowledge. After the update, the system may pause and wait for further instruction, wait a specified time increment, or repeat the process.

Figure 4C:
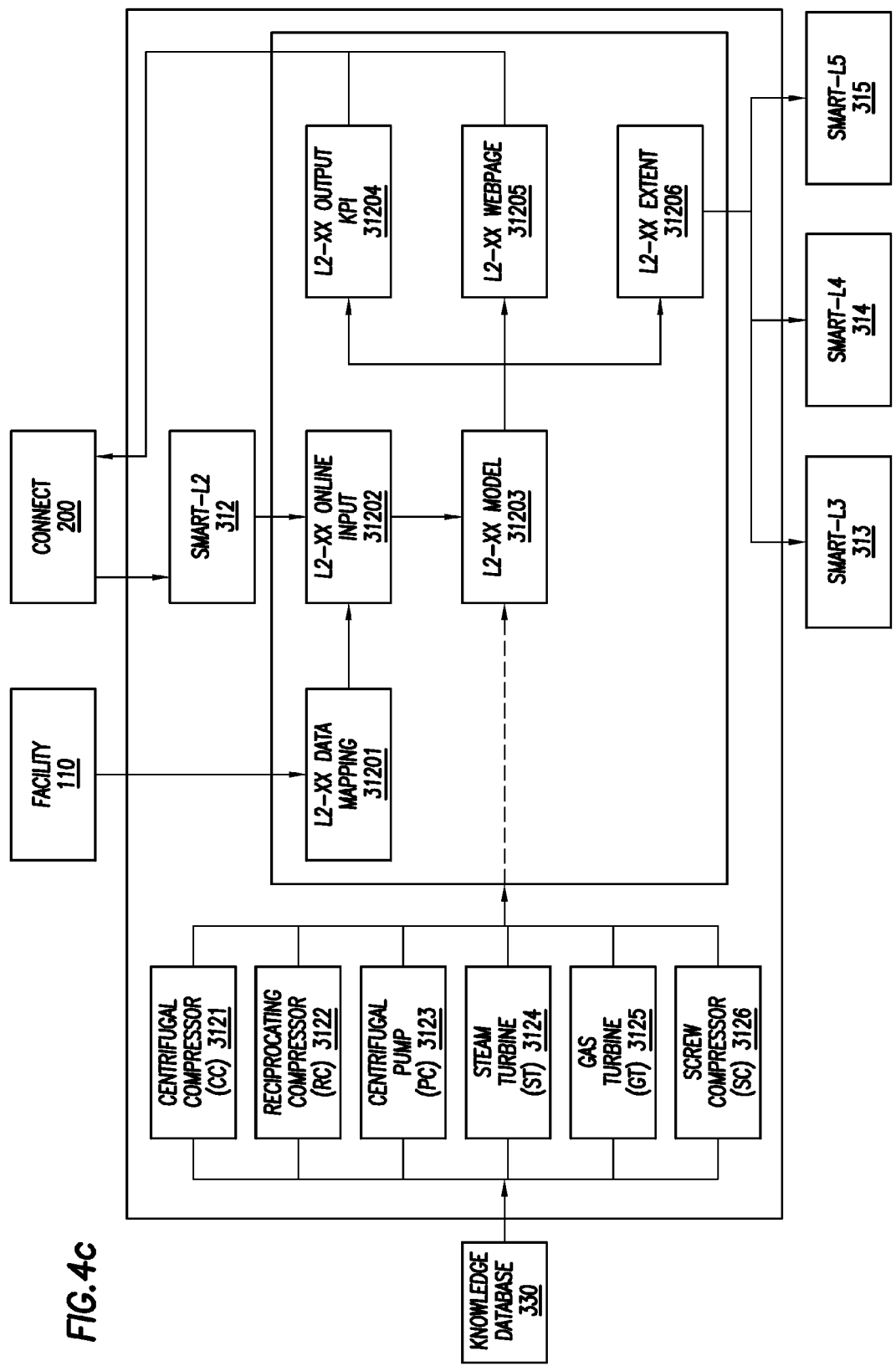
FIG. 4c is a schematic representation of an equipment performance model according to embodiments of the present disclosure.

FIG. 4c:

Referring now to FIG. 4c, knowledge model-L2 312 is configured to employ high fidelity engineering equipment models to predict the performance of the equipment. By knowing the manufacturing specifications of the equipment at the time when the equipment was installed, it is possible to track the deviation of the equipment over time from its' original condition. Thus, decreased efficiency or operability of the equipment as a result of use may be determined.

L2-XX Data Mapping 31201 provides a module that maps the input data in the equipment bodies to the train level. It also defines the mapping of the output KPI, as well as performance and related tags, which are returned to customer 100 for long-term archiving and viewing. L2-XX Online 31202 merges the online and offline data that is required for L2-Model 31203 to process. Data validation is carried out in this step to ensure that there is enough information for the model and that the data quality is sufficient. L2-XX-Model 31203 is the equipment model. The engineering principle model is derived from the engineering theory and methodologies in conjunction with the company information from years of research and development investment and operating experience to construct rotating equipment models that may accurately predict key parameters to track the performance of the equipment. L2-XX Output 31204 sends the KPI outputs via connect 200 to the customer 100 for long-term archiving and viewing.

L2-XX Webpage 31205 generates dynamic web pages using HTML standard implementation. The web pages are transferred to the web server in connect 200 for viewing by experts located in varied worldwide locations. A copy of the web pages is sent to customer 100 for local viewing. A set of web pages is also captured in real-time in such a way that they may be transferred to the PC workstation and standalone laptop for offline viewing and troubleshooting. L2-XX Extent 31206 provides an integration module that sends the output from L2 to the database of L3, L4, and L5 as inputs to the higher level of knowledge. This module has the knowledge of all the rest of the level and updates the relevant and necessary information from L2 to their knowledge database.

Those of ordinary skill in the art will appreciate that embodiments of the present disclosure may include varied models to account for individual components used in specific processes. Accordingly, the models discussed below are exemplary to the discussed embodiments, and should not be interpreted as being exhaustive. L2-CC Model 3121 includes the first principle engineering model for a centrifugal compressor that is capable of predicting key performance parameters of the equipment with the fidelity that is defined for level 2. L2-RC Model 3122 includes the first principle engineering model for a reciprocating compressor that is capable of predicting key performance parameters of the equipment with the fidelity that is defined for level 2. L2-PC Model 3123 is the first principle engineering model for a pump (e.g., a centrifugal pump) that is capable of predicting key performance parameters of the equipment with the fidelity that is defined for level. L2-ST Model 3124 is the first principle engineering model for a steam turbine that is capable of predicting key performance parameters of the equipment with the fidelity that is defined for level 2. L2-GT Model 3125 includes the first principle engineering model for a gas turbine that is capable of predicting key performance parameters of the equipment with the fidelity that is defined for level 2. L2-SC Model 3126 includes the first principle engineering model for a screw compressor that is capable of predicting key performance parameters of the equipment with the fidelity that is defined for level 2.

Knowledge model-L2 312 includes the deployment of the first principle engineering model on real process standalone or online depending on the nature of the execution. If execution of the model is initiated from an offline application, it is running "in effect" offline; however, if execution of the model is online controlled by a system scheduler, it is considered online. There is no difference between how the models process the inputs and how they create the outputs. The differences between online and offline are in how the outputs are propagated to customer 100 via connect 200, as will be described in detail below.

In the offline mode: the process starts, the user runs a standalone program from connect 200, the standalone program activates knowledge model 312 for a certain type of built-in equipment model, which is one of the following: L2-CC Model 3121, L2-RC Model 3122, L2-PC Model 3123, L2-ST Model 3124, L2-GT Model 3125, L2-SC Model 3126, the "XX" model is fed specification data from Facility 110 and online process data from Collect 200, the model processes the input and specification data and computes the performance KPI values, the output data are returned to the user via the GUI, and the process stops.

In the online mode, the process starts, and the task scheduler runs an application program in the computer systems in one of the installed servers. The installed servers may include one or more of the following: connect 200 application servers, Regional RMD Centers, Global RMD Centers, and/or customer computer application servers. The standalone program then activates knowledge model 312 for a certain type of built-in equipment model, for example, one of the CC, RC, PC, ST, GT, or SC models. One of the following "XX" models is then selected: L2-CC Model 3121, L2-RC Model 3122, L2-PC Model 3123, L2-ST Model 3124, L2-GT Model 3125, L2-SC Model 3126, the model is fed specification data from facility 110 and online process data from connect 200. Next, L2-XX Data 31201 gathers specification, process constraints, and constant data from facility 100, L2-XX Online 31202 gathers online process data from connect 200, and L2-XX Model 31203 takes in data from online and offline and computes the performance KPI values. L2-XX Output 31204 sends the output KPI data to connect 200 and the customer's computer, and L2-XX Webpage 31205 then creates dynamic web pages and sends the web pages to Connect 200 and the customer's computers. L2-XX Extent 31206 then updates the current L2 KPI for the "XX" model as the inputs to the next level of knowledge. The application then waits for the next start process, at which time the process is repeated.

Figure 4D:
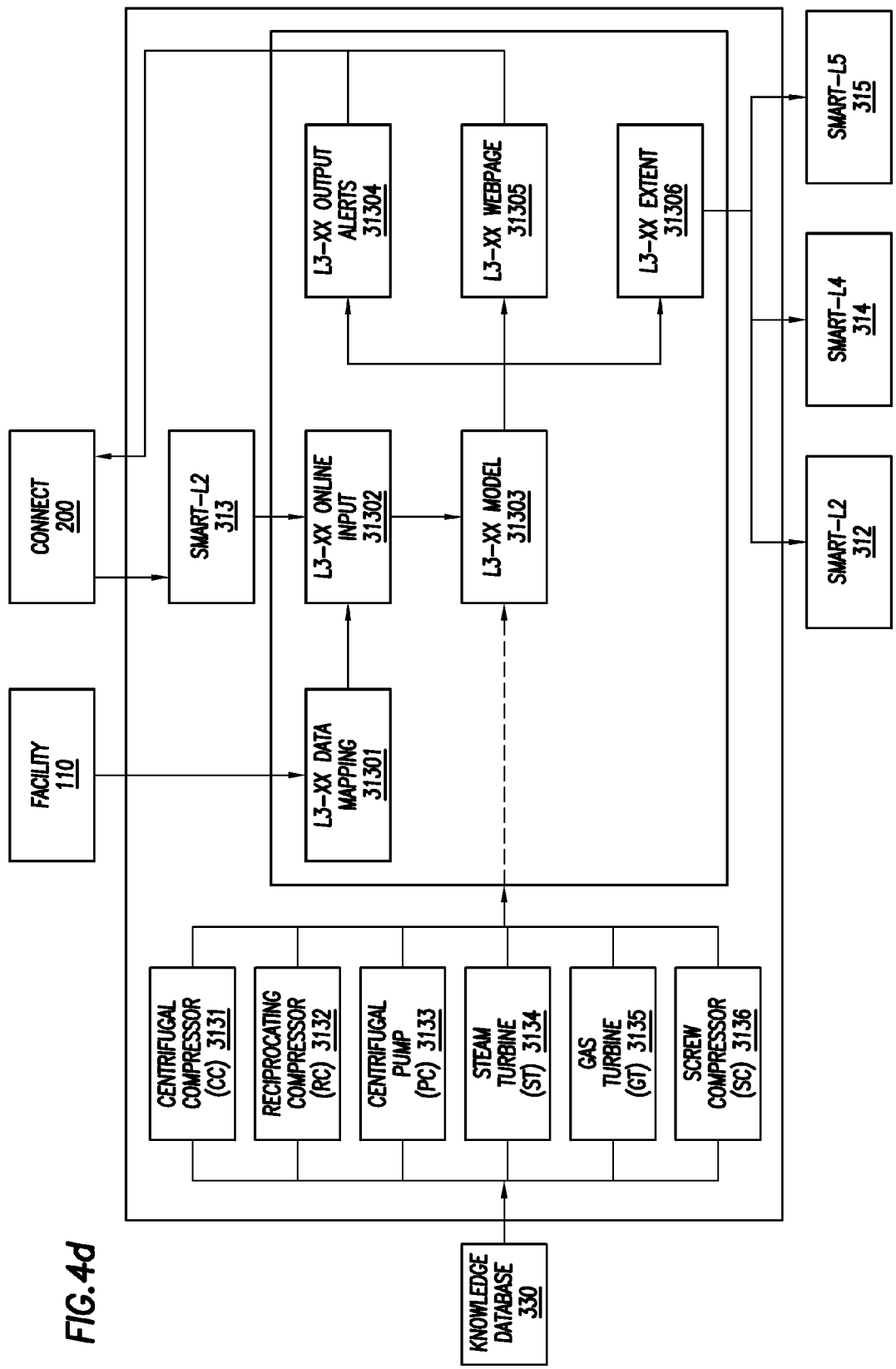
FIG. 4d is a schematic representation of an equipment basic health model according to embodiments of the present disclosure.

FIG. 4*d*:

Referring now to FIG. 4*d*, knowledge model-L3 313 is configured to employ rules from experience accumulated from operating of the similar equipment from the company's global manufacturing business and equipment models to predict the basic health of the equipment.

The rules to measure or assess the health of the equipment are based on collective past operating experiences from selected experts. Merging the basic health equipment assessment rules with the current operating condition tells us the health condition of the equipment. L3-XX Data Mapping 31301 defines specification, constraints, and constant data requirement and all the related tags that can be used to determine the health of the equipment. The data is retrieved from knowledge database 330 and/or from facility 110. L3-XX Online 31302 merges the online and offline data that is required for L3-Model 31303 to process. Data validation is carried out in this step to ensure that there is enough information for the model and the data quality are good.

L3-Model 31303 includes the equipment basic health assessment model. The model is derived from collective knowledge from experts in conjunction with company information from years of research and development investment and operating experience to construct rotating equipment models that can accurately assess the current state of health of the equipment. L3-XX Output 31304 sends the KPI outputs as alerts via connect 200 to the customer process computer for follow-up by a local expert.

L3-XX Webpage 31305 generates dynamic web pages using HTML standard implementation. The web pages are transferred to the web server in connect 200 for viewing by experts located at various company locations worldwide. A copy of the web pages is also sent to customer 100 web servers for local viewing. A set of web pages may also be captured in real-time, such that it may be transferred to a workstation and standalone laptop for offline viewing and troubleshooting. L3-XX Extent 31306 is the integration module that sends the output from L3 to databases of L2, L4, and L5 as inputs to the higher level of knowledge. This module has the knowledge of all the rest of the levels, and updates the relevant and necessary information from L3 to their respective knowledge databases.

L3-CC Model 3131 is the health assessment model for a centrifugal compressor that is capable of predicting key health assessment parameters of the equipment with the fidelity that is defined for level 3. L3-RC Model 3132 is the health assessment model for a reciprocating compressor that is capable of predicting key health assessment parameters of the equipment with the fidelity that is defined for level 3. L3-PC Model 3133 is the health assessment model for a pump that is capable of predicting key health assessment parameters of the equipment with the fidelity that is defined for level 3. L3-ST Model 3134 is the health assessment model for a steam turbine that is capable of predicting key health assessment parameters of the equipment with the fidelity that is defined for level 3. L3-GT Model 3135 is the health assessment model for a gas turbine that is capable predicting key health assessment parameters of the equipment with the fidelity that is defined for level 3. L3-SC Model 3136 is the health assessment model for a screw compressor that is capable of predicting key health parameters of the equipment with the fidelity that is defined for level 3.

Knowledge model-L3 313 provides for the deployment of the Health Assessment engineering model on real process standalones or online depending on the nature of the execution. If execution of the model is initiated from an offline application, it is running "in effect" offline and if execution of the model is online controlled by a system scheduler, it is considered to be in the online mode.

In the offline mode, the process starts, and the user runs a standalone program from connect 200. The standalone program then activates knowledge model 313 for a specified equipment model, which may include one or more of the following: L3-CC Model 3131, L3-RC Model 3132, L3-PC Model 3133, L3-ST Model 3134, L3-GT Model 3135, and/or L3-SC Model 3136. The "XX" model is then provided specification data from facility 110 and online process data from connect 200. The model processes the input and specification data and computes the performance KPI values, and the output data are returned to the user via the GUI.

In the online mode, the process starts, and the task scheduler runs an application program in the computer systems in one of the installed servers. The installed servers may include one or more of the following: connect 200 application servers, Regional RMD Centers, Global RMD Centers, and/or customer computer application servers. The standalone program then activates knowledge model 313 for a certain type of built-in equipment model, for example, one of the CC, RC, PC, ST, GT, or SC model. One of the following "XX" models is then selected: L3-CC Model 3131, L3-RC Model 3132, L3-PC Model 3133, L3-ST Model 3134, L3-GT Model 3135, and L3-SC Model 3136. The model is then provided specification data from facility 110 and online process data from connect 200. L3-XX Data Mapping 31301 then gathers specification, process constraints, and constants data from facility 110, and L3-XX Online 31302 gathers online process data from connect 200. L3-XX Model 31303 takes in data from online and offline, and computes the performance KPI values. After computation, L3-XX Output 31304 sends the output KPI data to connect 200 and customer 100, and L3-XX Webpage 31305 creates dynamic web pages, and sends the web pages to connect 200 and customer 100. L3-XX Extent 31306 updates the current L3 KPI for "XX" model as the inputs to the next level of knowledge. The process then waits for the next start signal, at which time the process may be repeated.

Figure 4E:
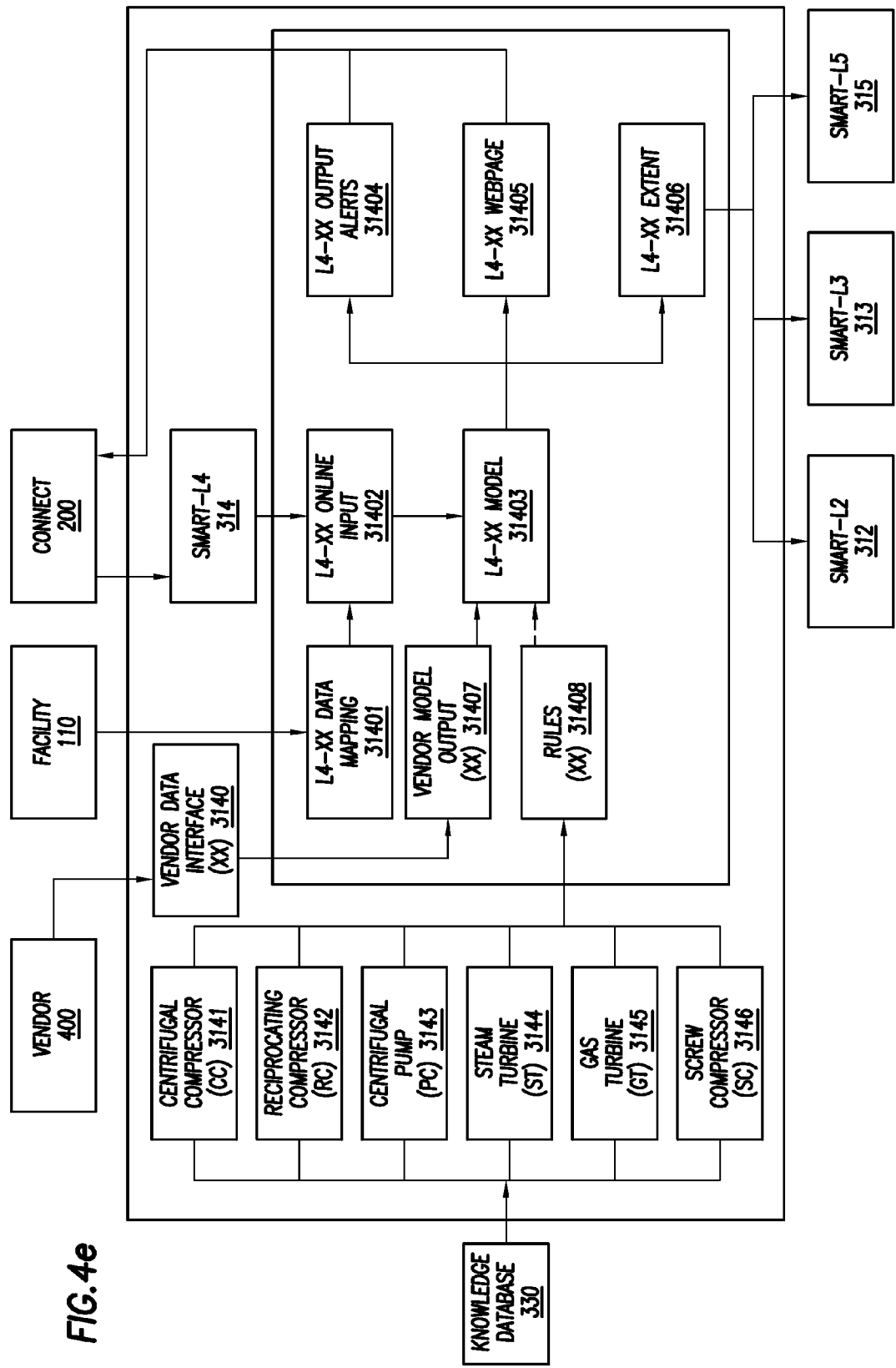
FIG. 4e is a schematic representation of an equipment advanced heath model according to embodiments of the present disclosure.

FIG. 4*e*:

Referring now to FIG. 4*e*, knowledge model-L4, the advanced health module, is configured to combine output from the vendor's own equipment model, which may be superior because it comes from the manufacturer, with the company's rules from experience accumulated from the operation of similar equipment to predict health of the equipment. The advanced health module may thus provide "advanced" knowledge, which may not otherwise be obtained from in-house expertise. The rules used to measure or assess the health of the equipment are based on collective past operating experiences from experts. Merging such advanced health equipment assessment rules with the current operating conditions tell the health condition of the equipment.

L4-XX Data Mapping 31401 defines specification, constraints, and constant data requirement and related tags that may be used to determine the health of the equipment. The data is retrieved from knowledge database 330 and/or from facility 110. L4-XX Online 31402 merges the online and offline data that is required for L4-Model 31403 to process. Data validation is carried out in this step to ensure that there is enough information for the model and the data quality is sufficient. L4-Model 31403 is the equipment advanced health assessment model. The model is derived from collective knowledge from global technical discipline experts in conjunction with the company information from years of research and development investment and operating experience to construct rotating equipment models that may accurately assess the current state of health of the equipment. L4-XX Output 31404 sends the KPI outputs as alerts via connect 200 to customer 100 for follow-up by a local expert.

L4-XX Webpage 31405 generates dynamic web pages using HTML standard implementation. The web pages are then transferred to the web server in connect 200 for viewing from experts located at various worldwide locations. A copy of the web pages is then sent to the customer's web servers for local viewing. A set of web pages is then captured in real-time, such that they may be transferred to a workstation and/or a standalone laptop for offline viewing and troubleshooting. L4-XX Extent 31406 includes the integration module that sends the output from L4 to the database of L2, L3, and L5 as inputs to another level of knowledge. This module then has the knowledge of the rest of the levels, and updates the relevant and necessary information from L4 to their respective knowledge databases.

L4-XX Vendor Model 31407 includes the outputs from the vendor model "XX". L4-XX Rules 31408 includes the health rules for company's model "XX" using the relevant data in the process that is not part of L4-XX Vendor Model 31407. L4-XX Vendor Data Interface 3140 provides the interface software that brings data from vendor 400 into connect 200. The output data is generated using the vendor's model for "XX" equipment running in the vendor's own server.

L4-CC Model 3141 is the health assessment model for centrifugal compressor that is capable to predict key health assessment parameters of the equipment with the fidelity that is defined for level 4. L4-RC Model 3142 is the health assessment model for reciprocating compressor that is capable to predict key health assessment parameters of the equipment with the fidelity that is defined for level 4. L4-PC Model 3143 is the health assessment model for pump (centrifugal) that is capable to predict key health assessment parameters of the equipment with the fidelity that is defined for level 4. L4-ST Model 3144 is the health assessment model for steam turbine that is capable to predict key health assessment parameters of the equipment with the fidelity that is defined for level 4. L4-GT Model 3145 is the health assessment model for gas turbine that is capable to predict key health assessment parameters of the equipment with the fidelity that is defined for level 4. L4-SC Model 3146 is the health assessment model for screw compressor that is capable to predict key health parameters of the equipment with the fidelity that is defined for level 4.

Knowledge model 314 includes the collaboration of the vendor's model with the company's rule sets to give the "advanced" level of the health assessment. If execution of knowledge model 314 is initiated from an offline application, it is running "in effect" offline, and if execution of the model is online, controlled by a system scheduler, it is considered to be in the online mode.

In the offline mode, the process starts, and the user runs a standalone program from connect 200. The standalone program activates knowledge model 314 for a certain type of vendor's model and equipment model, which may include one or more of the following: L4-CC Model 3141, L4-RC Model 3142, L4-PC Model 3143, L4-ST Model 3144, L4-GT Model 3145, L4-SC Model 3146. The "XX" model is then provided specification data from facility 110 and online process data from connect 200. L4-Vendor Data Interface 3140 connects the vendor's computer system to retrieve model "XX" output data, and passes the data to L4-Vendor Model Output 31407. L4-Vendor Output 31407 then sends the vendor model "XX" output to L4-Model 31403, the model processes the input and specification data and computes the performance KPI values. The output data is then returned to the user via the GUI, and the process stops.

In the online mode, the process starts, and the task scheduler runs an application program in the computer systems in one of the installed servers. The installed servers may include one or more of the following: connect 200 application servers, Regional RMD Centers, Global RMD Centers, and/or the customer's computer application servers. The standalone program then activates knowledge model 314 for a certain type of equipment model, for example one of the CC, RC, PC, ST, GT, or SC models. At least one of the following "XX" models is then selected: L4-CC Model 3141, L4-RC Model 3142, L4-PC Model 3143, L4-ST Model 3144, LA-GT Model 3145, or L4-SC Model 3146. After the model is selected, it is provided specification data from facility 110 and online process data from connect 200. L4-Vendor Data Interface 3140 connects the vendor's computer system to retrieve model "XX" output data and pass the data to L4-Vendor Model Output 31407. L4-Vendor Output 31407 then sends vendor model "XX" output to L4-Model 31403, L4-XX Data 31401 gathers specification, process constraints, and constants data from facility 100, and L4-XX Online 31402 gathers online process data from connect 200. L4-XX Rules 31408 gathers rule sets data from model "XX, L4-XX Model 31403 takes in data from online and offline, and computes the performance KPI values. L4-XX Output 31404 sends the output KPI data to connect 200 and customer. LA-XX Webpage 31405 creates dynamic web pages and sends the web pages to connect 200 and customer. L4-XX Extent 31406 then updates the current L4 KPI for the "XX" model as the inputs to the next level of knowledge. The process then waits for a signal to repeat the process.

Figure 4F:
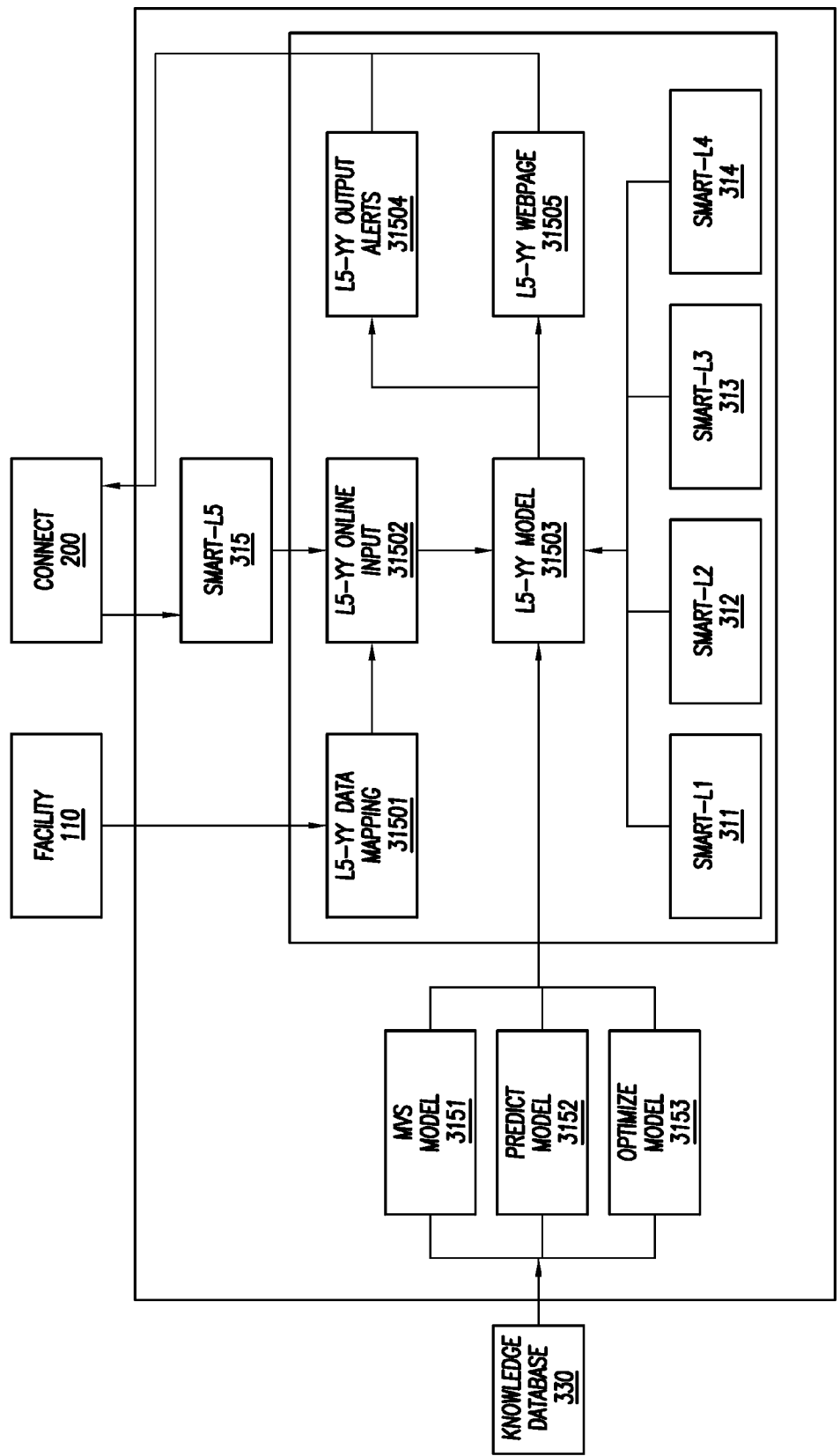
FIG. 4f is a schematic representation of a statistic model according to embodiments of the present disclosure.

FIG. 4*f*:

Referring now to FIG. 4*f*, knowledge model-L5 315 is configured to employ rules from experience accumulated from operating of similar equipment from company's global manufacturing business and statistical and mathematical modeling methodology on history data to predict key "missing" parameters in online monitoring. Each group of key parameters include modeling, and are tuned with a unique set of history data that is related to the parameters the model predicts.

L5-YY Data Mapping 31501 defines specification, constraints, and constant data requirements, as well as related tags that may be used to determine the health of the equipment. The data is retrieved from knowledge database 330 and/or from facility 110. L5-YY Online 31502 merges the online and offline data that is required for the L5-Model 31503 to process. Data validation is carried out in this step to ensure that there is enough information for the model and the data quality is sufficient.

L5-Model 31503 provides the equipment basic health assessment model. The model is derived from collective knowledge from experts in conjunction with company information from years of research and development investment and operating experience to construct rotating equipment models that may accurately assess the current state of health of the equipment. L5-YY Output 31504 sends the KPI outputs as alerts via connect 200 to the customer's process computer for follow-up by a local expert. L5-YY Webpage 31505 generates dynamic web pages using HTML standard implementation. The web pages are then transferred to the web server in connect 200 for viewing by experts located at various company locations worldwide. A copy of the web pages is then sent to the customer's web servers for local viewing. A set of web pages is then captured in real-time, such that it may be transferred to a workstation and/or a standalone laptop for offline viewing and troubleshooting.

L5-CC Model 3151 includes the health assessment model for a centrifugal compressor that is capable of predicting key health assessment parameters of the equipment with the fidelity that is defined for level 5. L5-RC Model 3152 includes the health assessment model for a reciprocating compressor that is capable of predicting key health assessment parameters of the equipment with the fidelity that is defined for level 5. L5-PC Model 3153 includes the health assessment model for a pump that is capable of optimizing key health assessment parameters of the equipment with the fidelity that is defined for level 5.

Knowledge model 315 provides the deployment of the health assessment engineering model on real process standalone or online depending on the nature of the execution. If execution of the model is initiated from an offline application, it is running "in effect" offline, and if execution of the model is online controlled by a system scheduler, it is considered to be in the online mode.

In the offline mode, the process starts, and the user runs a standalone program from connect 200. The standalone program activates knowledge model 315 for a certain type of equipment model, which may include one or more of the following: L5-MVS Model 3151, L5-Predict Model 3152, and/or L5-Optimize Model 3153. The "YY" model is gathered from specification data from facility 110 and online process data from connect 200. The model processes the input and specification data, and computes the performance KPI values. The output data is then returned to the user via the GUI, and the process stops.

In the online mode, the process starts, and the task scheduler runs an application program in the computer systems in one of the installed servers. The installed servers may include one or more of the following: connect 200 application servers, Regional RMD Centers, Global RMD Centers, and/or customer computer application servers. The standalone program then activates knowledge model 315 for a certain type of equipment model, for example, one of the CC, RC, PC, ST, GT, or SC model. One of the following "YY" models is then selected: L5-MVS Model 3151, L5-Predict Model 3152, L5-Optimize Model 3153, and the model is provided specification data from facility 110 and online process data from collect 200. L5-YY Data 31501 gathers specification, process constraints, and constants data from Facility 100, and L5-YY Online 31502 gathers online process data from connect 200. L5-YY Model 31503 receives data from online and offline, and computes the performance KPI values. L5-YY Output 31504 sends the output KPI data to connect 200 and customer. L5-YY Webpage 31505 then creates dynamic web pages and sends the web pages to connect 200 and customer 100. The process then stops, and upon another signal, the process may be repeated.

Figure 4G:
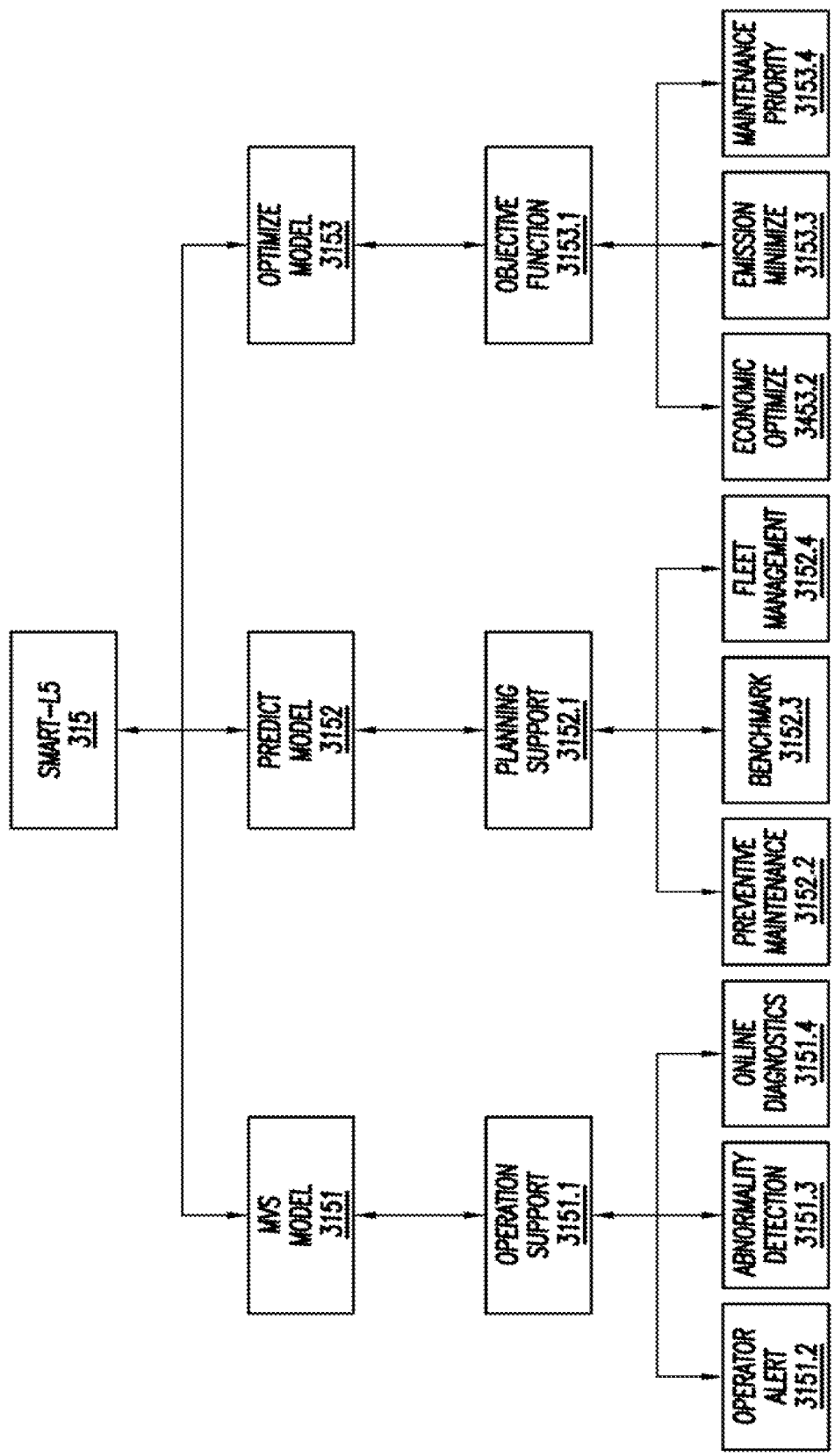
FIG. 4g is a schematic representation of a modeling, prediction, and optimization model according to embodiments of the present disclosure.

FIG. 4g:

Referring now to FIG. 4g, knowledge model-L5 315 includes the technology deployed to mimic an integrated process with mathematical tools to derive missing parameters for the process, such as performance, deviation of process data from normal conditions, and parameters that may be used to predict future events using historical data.

MVS Model 3151 uses multivariate statistical/mathematical tools to develop models to mimic the process and the equipment in operation. The modeling methodology merges the mathematic derivations from academia, the mathematics derived by the company, and company information from knowledge database 330.

Operation Support 3151.1 includes the ongoing activities, wherein a customer contacts a regional expert and/or global expert for support on current operation issues and problems. Operator Alert from L5 Knowledge model Operator Alert 3151.2 includes the ongoing activities where the regional expert and/or global expert provide(s) a visual or aural alert to the operator when an abnormality has been identified from Online Diagnostics 3151.4. Abnormality Detection from L5 Knowledge model Abnormality Detection 3151.3 includes the ongoing activities where the multivariate statistical model detects an abnormal behavior in the process operations.

Predictive Model 3152 uses a collection of mathematic tools that can relate time-based data and predict future trend. These techniques are deployed to predict the behavior of process values, either real process data or model-calculated data, in the future. The predictive modeling methodology merges mathematical tools and company information from knowledge database 330 to give the predictions. These predictions may be suitable for company planning purposes, such as for preventive maintenance and benchmarking company assets against company peer and published data from industries using similar processes and applications.

Predictive Models 3152 depends on the amount and the quality of the historical data from which the models and the tuning parameters are derived. The models are developed to review the behavior of the processes in the past and can be taught to behave in similar factions in the future if the unit is running under similar conditions. The model is built with tuning parameters to drive the model to mimic the process using historic data to predict future events. This is done as a one-time offline exercise and minor tuning may be needed from time to time.

In the offline building mode, the steps to build the model and select parameters for monitoring may include, for example, selecting appropriate mathematical and statistical tools according to the nature of the process, whether it is for simulation or prediction, composing the building blocks that mimics the process (such as equipment or conversion process), and determining key parameters to monitor (such as efficiency of the equipment or yields from the conversion units in conversion process). Additionally, the steps may include determining input data that can be used to infer the output parameters, retrieving historical data from a period of steady operation from the past, eliminating periods of disturbances (e.g., spikes) that could distort the simulation model, feeding historical data into the building blocks and converging the model with the data using the historical data as inputs and key parameters of interest as output. Additional steps may include capturing tuning parameters that allow the model to mimic the process, running the model with the tuning parameters and generating key parameters in the past and future, and studying the results to ensure that they are accurate. If the results satisfy the company's criteria, the model is ready to run in either offline or online mode.

Planning Support from L5 Knowledge model Planning Support 3152.1 includes condition based maintenance indicators provided by the regional expert and/or the global expert to the customer. Based on the predicted condition a decision can then be made on whether to plan maintenance or unit change-out. Preventive Maintenance from L5 Knowledge model Preventive Maintenance 3152.2 support includes predictions on equipment health and life based on past and current operations. The regional expert and/or the global expert provide the predictions to the customer in order to plan whether the unit would perform adequately until the next preventive maintenance round. Benchmarking from L5 Knowledge model Benchmark 3152.3 provides statistical and mathematics models to compare a company's assets against the company's portfolio of equipment in operation in the global manufacturing business, and also include relevant data available in the public domains to provide data indicating how well the company's fixed and rotating equipment is being used. Fleet Management from L5 Knowledge model Fleet Management 3152.4 provides statistical and mathematics models to manage the company's fleet of rotating equipment that are currently in operation. The models provide a better understanding of how to deploy the company's assets from a number of the company's preferred suppliers and how to leverage the company's global assets to negotiate with the suppliers for their current and future research and development efforts to better fit the company's needs.

Optimization from L5 Knowledge model Optimize Model 3153 provides optimization support including the provision of equipment maintenance recommendations based on predictions from the model. Different scenarios may be run to maximize profits, minimize costs, or schedule preventive maintenance on a fleet of equipment. Optimization may include interfacing with varied departments, such as economic departments (in one embodiment, using L5 Knowledge model Economic Optimize 3153.2) and/or scheduling departments to determine an optimal solution for a specific process. Examples of data that may be used during optimization include historical data, such as purchasing, pricing, and valuation data (e.g., the price of oil, components, labor, etc.), marketing data, trading data, governmental regulation data, environmental data, as well as utility and feed costs. Optimization thereby allows for an objective evaluation (in one embodiment, using L5 Knowledge model Objective Function 3153.1) of the economics and scheduling aspects of the industrial process, prior to implementation, such that an optimized solution for a given scenario may be determined. In certain aspects, Optimization Model 3153 allows for multiple models to be generated, such that solutions to problems, for example, determining maintenance scheduling (in one embodiment, using L5 Knowledge model Maintenance Priority 3153.4) and product volume production, may be optimized. Additionally, Optimization Model 3153 may allow for long-term predictions of, for example, equipment degradation and machinery efficiency, thereby allowing for the optimization of maintenance plans, process parameters, and emissions outputs (in one embodiment, using L5 Knowledge model Emission Minimize 3153.3).

Figure 4H:
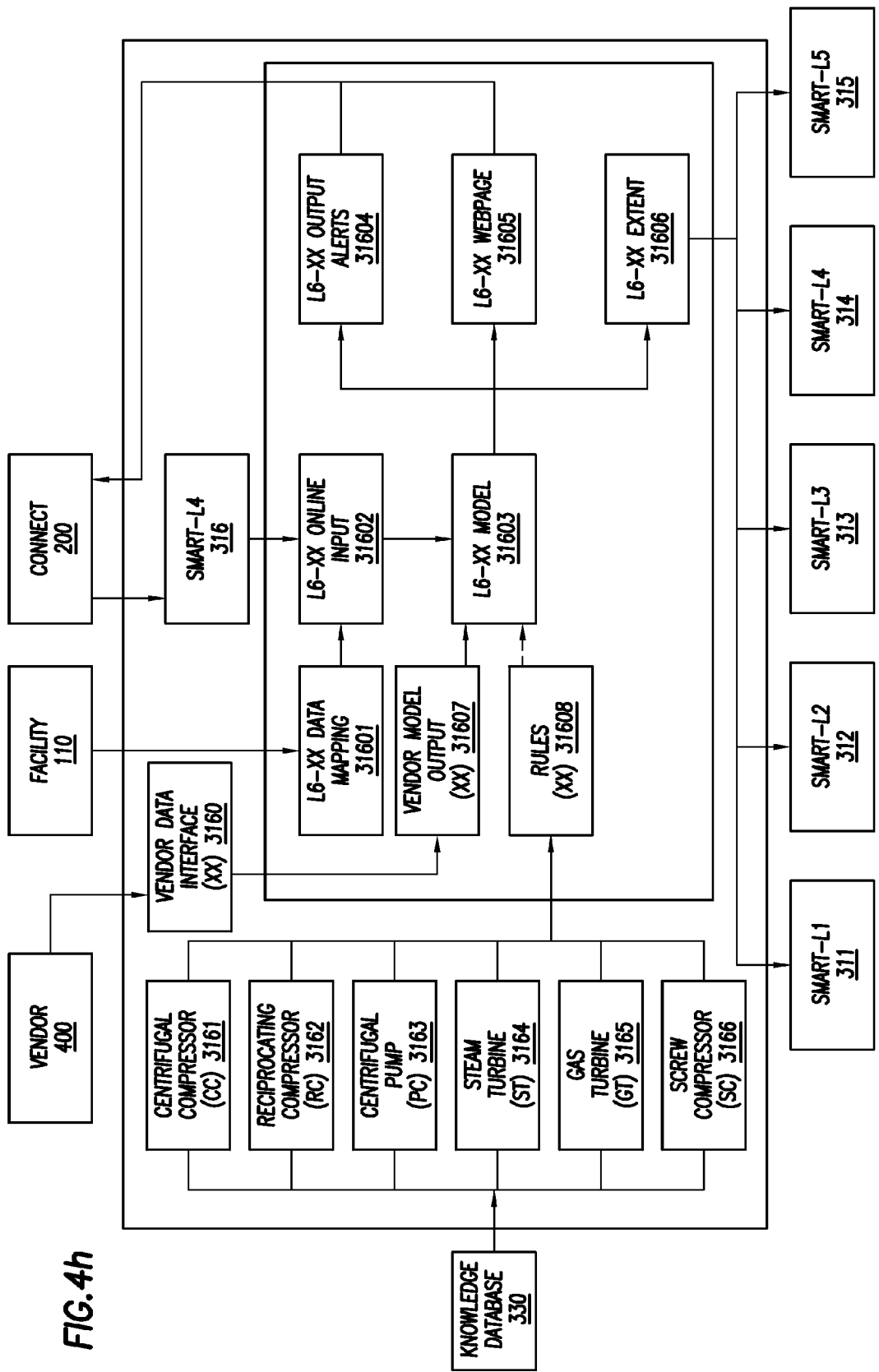
FIG. 4h is a schematic representation of a rules model according to embodiments of the present disclosure.

FIG. 4*h*:

Referring now to FIG. 4*h*, knowledge model-L6 rules 316 includes the deployment of the company's past experience on operating the rotating equipment, collected from the company's experts, to predict malfunction and take corrective actions as defined before the problem occurs. Some cases, such as the ones that deployed under knowledge model-L4, may require collaborated efforts with equipment vendors who have access to additional equipment models, sensor data, etc. By combining outputs from the vendor's own equipment model with the company's rules from experience accumulated from operating similar equipment, more accurate models of the health of equipment may be predicted. Such models may thus provide "advanced" knowledge, which is not typically available from in-house expertise.

The rules to measure or assess the health of the equipment are based on collective past operating experiences from experts. Merging the equipment assessment rules with the current operating condition provide the health condition of the equipment.

L6-XX Data Mapping 31601 defines specification, constraints, and constant data requirement and related tags that may be used to determine the health of the equipment. The data may be retrieved from knowledge database 330 and/or from facility 110. L6-XX Online 31602 merges the online and offline data that is required for the L6-Model 31603 to process. Data validation is carried out in this step to ensure that there is enough information for the model and the data quality is sufficient.

L6-Model 31603 includes the equipment rules assessment model. The model is derived from collective knowledge from experts in conjunction with company information from years of research and development investment and operating experience to construct rotating equipment models that may accurately assess the current state of health of the equipment. L6-XX Output 31604 sends the KPI outputs as alerts via connect 200 to customer 100 for follow-up by a local expert 107. L6-XX Webpage 31605 generates dynamic web pages using HTML standard implementation. The web pages are then transferred to the web server in connect 200 for viewing from experts located anywhere in the company worldwide. A copy of the web pages is sent to the customer's web servers for local viewing. A set of web pages is captured in real-time in such a way that they may be transferred to a workstation and/or a standalone laptop for offline viewing and troubleshooting. L6-XX Extent 31606 is the integration module that sends the output from L6 to the database of L1, L2, L3, L4, and L5 as inputs to the higher level of knowledge. This module has the knowledge of all the rest of the levels and updates them with the relevant and necessary information from L6 to their respective knowledge databases.

L6-XX Vendor Model 31607 provides the outputs from vendor model "XX". L6-XX Rules 31608 is the health rules for model "XX", using relevant data in processes that are not part of the L6-XX Vendor Model 31607. L6-XX Vendor Data Interface includes the interface software that brings data from vendor to connect 200. The output data is generated using the vendor's model for "XX" equipment, which runs on the vendor' server.

L6-CC Model 3161 includes the health assessment model for a centrifugal compressor that is capable of predicting key health assessment parameters of the equipment with the fidelity that is defined for level 6. L6-RC Model 3162 includes the health assessment model for a reciprocating compressor that is capable of predicting key health assessment parameters of the equipment with the fidelity that is defined for level 6. L6-PC Model 3163 includes the health assessment model for a pump that is capable of predicting key health assessment parameters of the equipment with the fidelity that is defined for level 6. L6-ST Model 3164 includes the health assessment model for a steam turbine that is capable of predicting key health assessment parameters of the equipment with the fidelity that is defined for level 6. L6-GT Model 3165 includes the health assessment model for a gas turbine that is capable of predicting key health assessment parameters of the equipment with the fidelity that is defined for level 3. L6-SC Model 3166 includes the health assessment model for a screw compressor that is capable of predicting key health parameters of the equipment with the fidelity that is defined for level 3.

Knowledge model 316 may operate with or without the collaboration of the vendor's models and with the company's own rule sets to give the "advanced" level of the health assessment. If execution of knowledge model 316 is initiated from an offline application it is running "in effect" offline, and if execution of the model is online controlled by a system scheduler, it is considered to be in the online mode.

In the offline mode, the process starts, and the user runs a standalone program from connect 200. The standalone program then activates knowledge model 316 for a certain type of vendor's model and equipment rule sets, which may include one or more of the following: L6-CC Model 3161, L6-RC Model 3162, L6-PC Model 3163, L6-ST Model 3164, L6-GT Model 3165, or L6-SC Model 3166. The "XX" model receives specification data from facility 110 and online process data from collect 200, and with vendor collaboration, L6-Vendor Data Interface 3160 connects the vendor's computer system to retrieve model "XX" output data and passes the data to L6-Vendor Model Output 31607. L6-Vendor Output 31607 sends vendor model "XX" output to L6-Model 31603, the model processes the input and specification data, and computes the performance KPI values. The output data is then returned to the user via the GUI, and the process stops.

In the online mode, the process starts, and the task scheduler runs an application program in the computer systems in one of the installed servers. The installed servers may include one of the following: connect 200 application servers, Regional RMD Centers, Global RMD Centers, and/or the customer's computer application servers. The standalone program then activates knowledge model 316 for a certain type of built-in equipment model, for example, one of the CC, RC, PC, ST, GT, or SC models. One of the following "XX" models is then selected: L6-CC Model 3161, L6-RC Model 3162, L6-PC Model 3163, L6-ST Model 3164, L6-GT Model 3165, or the L6-SC Model 3166. The selected model receives specification data from facility 110 and online process data from collect 200, and with vendor collaboration, L6-Vendor Data Interface 3160 connects to vendor 400 to retrieve model "XX" output data and passes the data to L6-Vendor Model Output 31607. L6-Vendor Output 31607 then sends vendor model "XX output to L6-Model 31603, L6-XX Data 31601 gathers specification, process constraints, and constant data from facility 100, and L6-XX Online 31602 gathers online process data from connect 200. L6-XX Rules 31608 gather rule set data from model "XX", and L6-XX Model 31603 receives data from online and offline, and computes the performance KPI values. L6-XX Output 31604 sends the output KPI data to connect 200 and customer 100. L6-XX Webpage 31605 creates dynamic web pages and sends the web pages to connect 200 and customer 100. L6-XX Extent 31606 updates the current L6 KPI for "XX" model as the inputs to the next level of knowledge, and the process pauses till another signal is received and the process is repeated.

Figure 5:
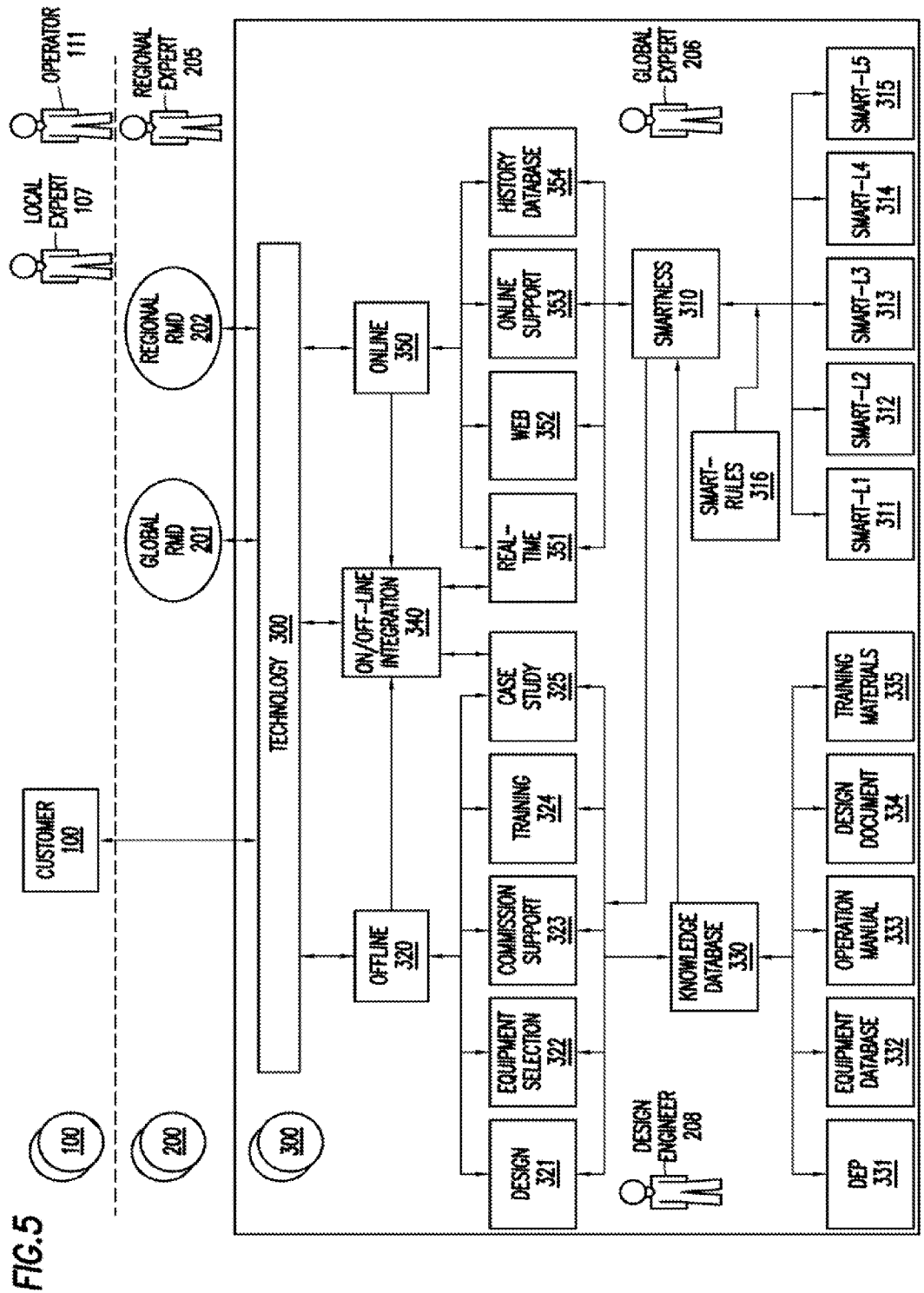
FIG. 5 is a schematic representation of a remote monitoring service according to embodiments of the present disclosure.

FIG. 5:

Referring now to FIG. 5, offline 320 runs in either a standalone environment or from a connect 200 web portal. The tools are installed locally in the facilities where the experts are working in their respective operating environment. The equipment data for the offline work can come from Regional RMD 202 and Global RMD 201, and the process data from customer 100. The offline tools are used to support design 321, equipment selection 322, commission support 323, training 324, and case studies 325.

Design 321 includes the technology that is employed to design the equipment based on customer 100 requirements, built based at least in part on knowledge database 330, and using composite knowledge module 310 engineering models, which encapsulate the requirements, and which ensure the equipment may be deployed online after the design has been adopted, and commissioned.

Equipment Selection 322 includes technology that is employed to select the equipment based on customer 100 requirements, built at least in part on knowledge database 330, and using composite knowledge model 310 engineering models. Selection criteria are applied, which are checked against the company's databank from the company's equipment and company's operating experience rather than based solely on vendors' recommendation. Using the company's own models, performance specs from company's simulations may be validated and/or challenged.

Commission Support 323 includes the technology that is employed to support the commissioning of the equipment for customer 100. Because the operability of the equipment has been incorporated since design 321, commissioning may be accomplished by combining the vendors' instructions, company engineering knowledge, and knowledge database 330. With off/online integration 340, the online monitoring model for the equipment may be employed before startup.

Training 324 includes the training of technical staff on the use of the troubleshooting tools, the interpretation of the technology support document, and operating best practices, such that the assets are used to operate the process at full potential or to a desired level.

Case Study 325 includes the deployment of offline tools to troubleshoot real life problems in operation using history data from the online system. The process involves mimicking the life process with engineering models and applying datasets that occurred in the past when problems are detected, to reproduce the situation. By selecting key parameters that may be manipulated, the values in the simulation mode may be varied to determine the response from the unit. With on/offline integration 340, the system has the ability to generate case studies to solve actual problems.

In operation, in a standalone mode, using either offline or online data, running from a standalone computer or connected to the online web portal in connect 200 from a client and running the tool kits from RMD servers. The suite of tools under knowledge database 330 in technology center 300 is accessible through composite 310. The user may thus perform activities, such as, for example, performing equipment design, performing equipment selection, performing commissioning support, giving or receiving training, and performing case studies.

Figure 6:
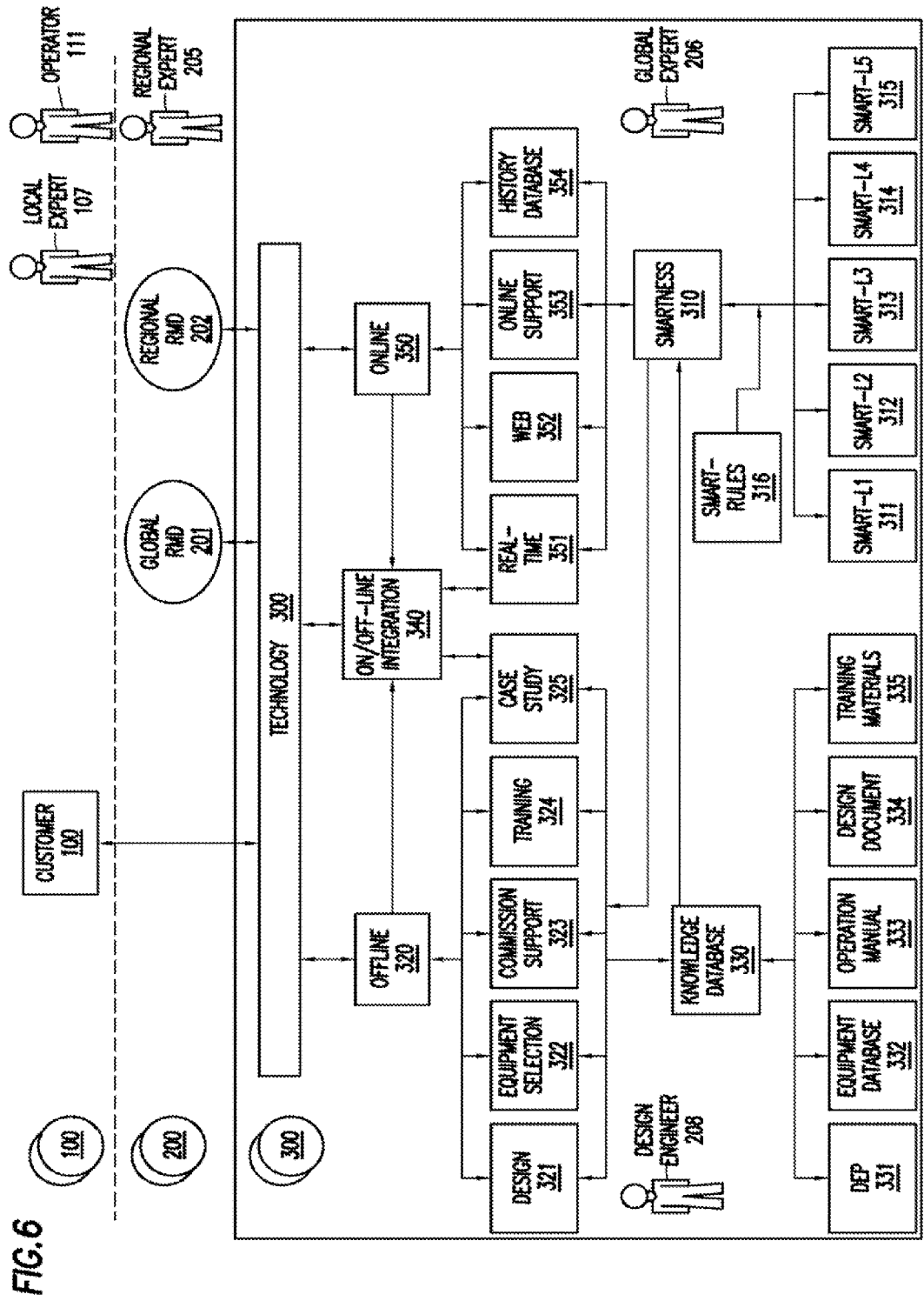
FIG. 6 is a schematic representation of a remote monitoring service according to embodiments of the present disclosure.

FIG. 6:

Referring now to FIG. 6, knowledge database 330 includes information from the company, which has been amassed, in this embodiment, since its existence. The information includes collections of technology employed to run the company's business. Such information may include hard copies, electronic form, published papers, trademarks, patents, etc.

DEP 331 documents best practices in how to operate the assets. These documents are built with the combined knowledge of the expert communities from varied technological disciplines from across the globe.

Equipment Database 332 includes the information collected from the equipment, and may include, for example, datasheets, vendors' operating and maintenance instructions, company's operating performance past and present, and the operating constraints and limits both from the vendors and from company's operating experience. Information for equipment of similar class or usage is stored for benchmarking and fleet management purposes. The database is architected with indexes and pointers for quick access from a search engine, which we built, for online equipment and data search.

Operating Manual 333 includes the manuals and operating instructions for the company's Operator 111. Operating manuals are compiled from the vendors' operating instruction and company's best practices from company's extensive experience in running equipment and units of similar class and nature. Operating manuals 333 are highly technical and specialized instruction to the company's operating personnel to ensure that we operate the company's assets with the company's best engineering and operating knowledge.

Design Document 334 includes the design documents for the facilities and equipment that are installed in the company's existing operating units. These documents provide engineering data and know-how that were deployed in the company's assets to ensure maximum return from company's investment.

Training Materials 335 include the training materials and classroom courses that are used for training of the new technical personnel or refreshment courses for existing technical support. New course materials may be compiled on new tools that are the products of research and development and improvement of the existing tools from feedback from the company's operating units.

Knowledge Database 330 may operate in either offline or online modes. In the offline mode, the information from knowledge database 330 is fed into the tool kits and applications that rely on the data and technology retrieved from the knowledge database for activities, for example: designing equipment for new and revamp processes; selecting equipment configurations for new or replacement units; supporting commissioning of new or refurbished equipment; training technical staff on using the suite of tools for local, regional, and global support; and performing case studies to solve current operating problem or de-bottlenecking of existing units.

In the online mode, the information from knowledge database 330 is fed into online applications. Online applications may provide operating support for: monitoring the utilization and availability of rotating equipment; monitoring the performance and health of the machineries; predicting the degradation of performance, which is fed into the preventive maintenance system for planning and scheduled in the turn-around repairs; providing online technical data for round-the-clock troubleshooting of problems in the operating units; and capturing performance data and abnormal events for future uses such as audit, case study, re-vamp study, improvement, and de-bottlenecking, etc.

Figure 7:
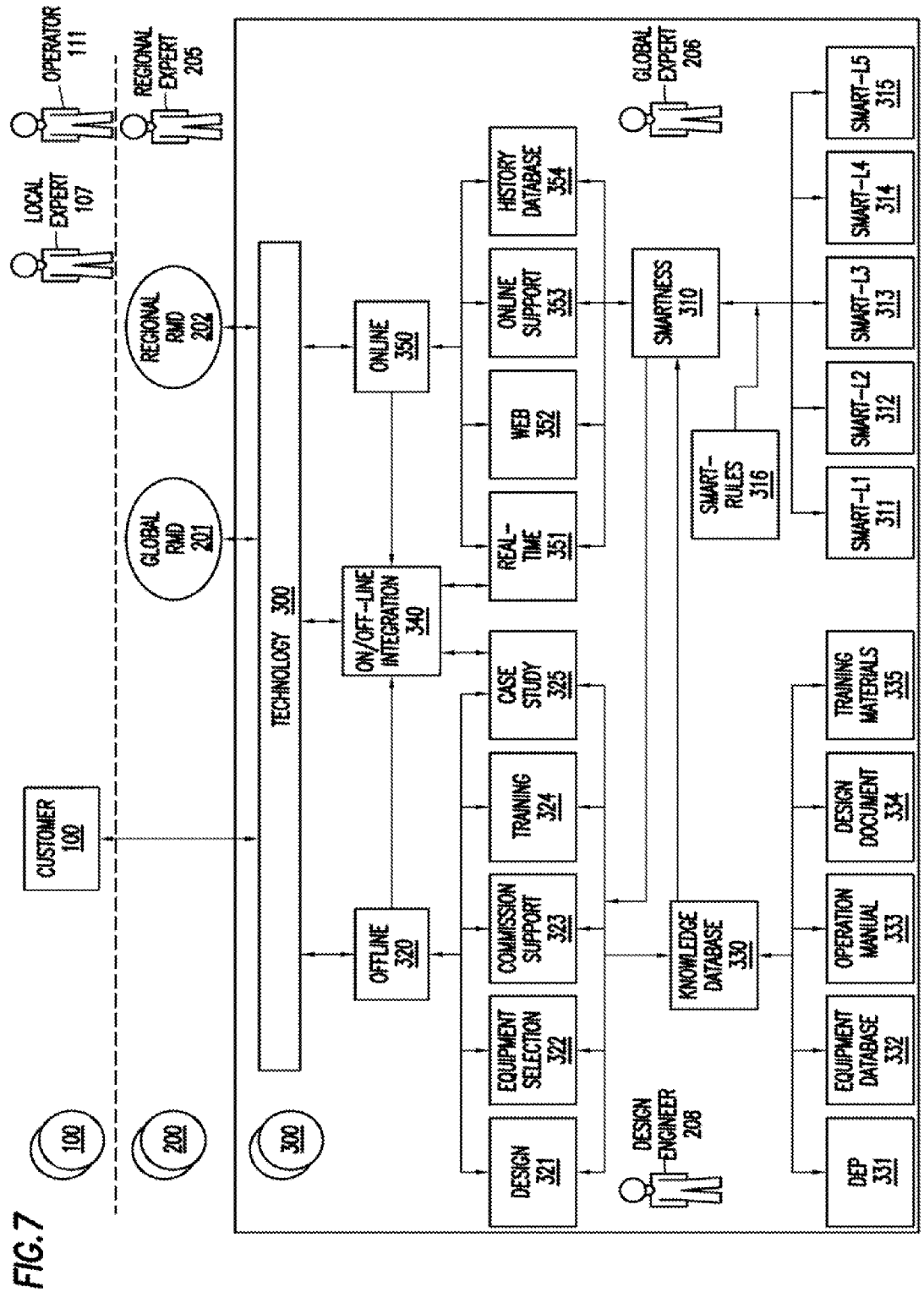
FIG. 7 is a schematic representation of a remote monitoring service according to embodiments of the present disclosure.

FIG. 7:

Referring now to FIG. 7, on/offline integrated mode 340 is integration technology of the offline and online operating environment. Technology 300 brings together offline 320 and online 350 information and exchange information between online and offline applications. A system of data exchange protocol is established to allow configuration and design data to pass to online applications immediately as the defined concept is proven in design 321 and the model has been validated in case study 325. This allows rapid deployment from design, construction, and commissioning of new applications. Technology center 300 includes functionality to allow data exchange between the offline and online systems and applications. More specifically, technology center 300 includes a model exchange configured to the technology to allow model plug-and-play before offline and online applications, self-check configured to verify the consistency of the models, specifications, and data for the deployed systems, multi-platforms configured to allow the models to deploy on many different manufacturing platforms, and rollback configured to allow rolling back of the upgrade from the previous running state.

On/offline integration 340 includes the technology that integrates the data and models between online and offline applications. The technology developed in this category allows the user to download the live data, which is used in the online applications, and perform offline case studies. Additionally, the technology allows for overriding process parameters and manipulating the equipment hardware and process specifications to study different operating scenarios without performing test runs. The simulated environment is designed to represent real process. Thus, the outputs from the offline mode runs that will cause the change of behavior of the models may be implemented to rectify process problems in real-time.

There are three modes of operations, Online 350 to offline 320, offline 320 to online 350, and offline 320 to online integrity check.

Mode 1: Online 350 to Offline 320

In this mode, offline 320 requests real-time data, current models employed in monitoring the unit, and provides constraints to the common data interface uniquely defined under the company's interchangeable format. Offline 320 also selects offline tools and applications to match models, applies corresponding data and specifications to give the user the starting point that may be used to simulate the current operating environment, and allows the user to manipulate parameters in the simulation model. The parameters for the simulation model are carefully chosen, and may be changed by the operating personnel. Offline mode 320 may also display responses to the user and/or apply simulations in succession (or in making a script). Additionally, the user can use the tools to, for example, perform case studies, review or detect current process behavior, formulate remedial actions, and give advice, with or without corrective action, to customers.

Mode 2: Offline 320 to Online 350

In this mode, offline 320 gives new parameters to online 350; gives new operating instructions to local operating support personnel; changes the model, if necessary, after upgrading to new "tuned" parameters; activates offline 320 to/from online 350 to perform integrity checks; allows the new parameters to remain in operation, and/or provide rollback to the last acceptable model and parameters; and keep an audit trail of the changes.

Mode 3: Offline 320 to Online 350 Integrity Check

In this mode, the software facilitates offline 320 and online 350 data exchange; checks the data and model structure integrity when the data and models are uploaded from offline to online or downloaded from online to offline; perform online self-checks to ensure the model and new tuning parameters are internally consistent; activates self-diagnostics algorithms to ensure the new applications will improve the operation; intercepts defects in the new module if self-diagnostics has detected malfunction or irregularities.

Figure 8:
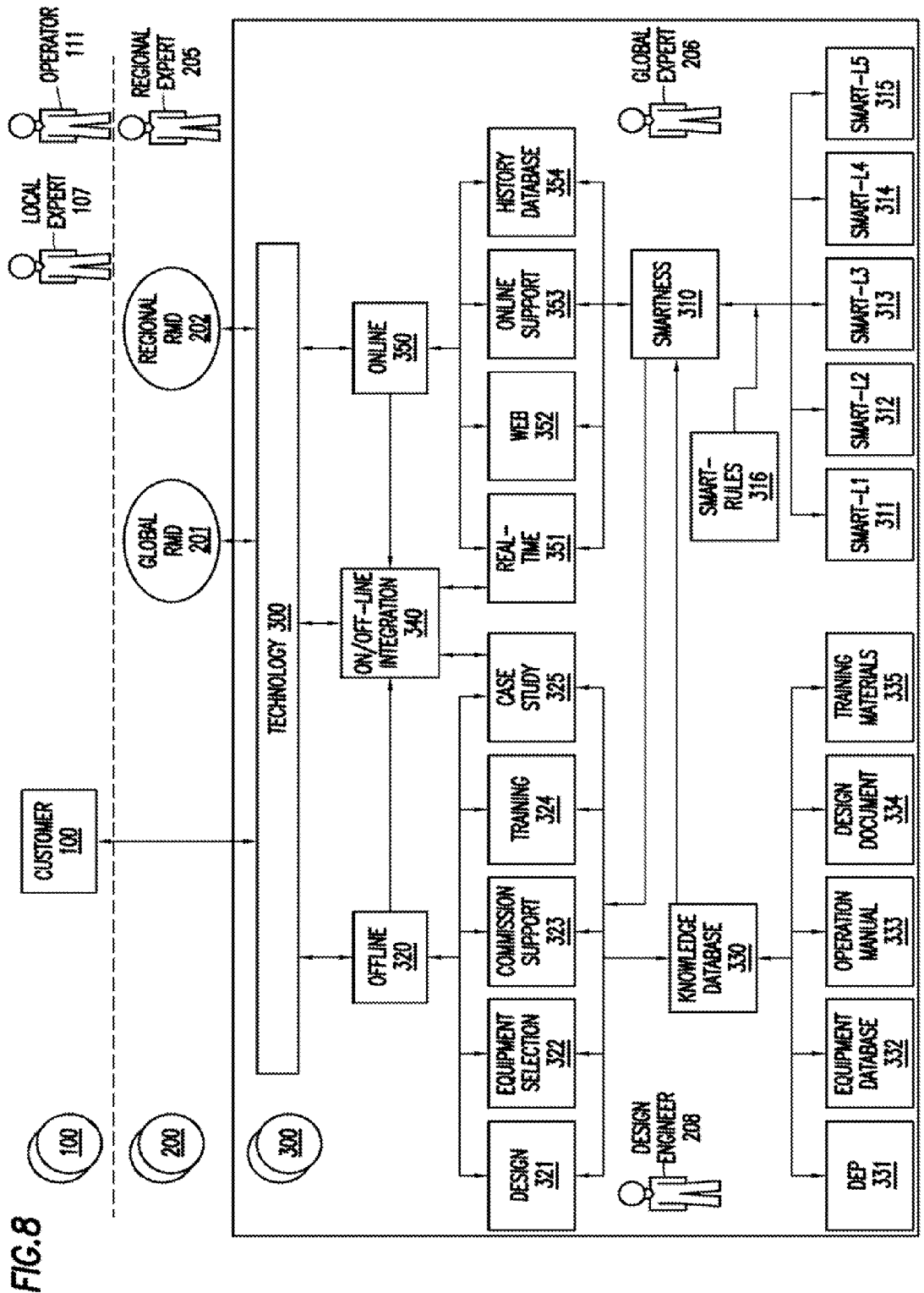
FIG. 8 is a schematic representation of a remote monitoring service according to embodiments of the present disclosure.

FIG. 8:

Referring now to FIG. 8, online 350 includes the online part of the technology, which runs continuously within this domain. Online 350 receives data from and returns results to customer 100 either directly or via Regional RMD 202, and Global RMD 201.

In operation, online 350 receives process data from customer 100 and transmits the data to real-time 351 for evaluation by engineering models. Online 350 also receives laboratory data and economic data from customer 100. Those of ordinary skill in the art will appreciate that the interval of data transmission, including laboratory data and economic data may vary according to the data required. For example, in certain embodiments, the laboratory data may update more frequently, such as several times a day, relative to economic data, which may update less frequently, such as every week or month.

Real-time 351 receives real-time process data on a fixed frequency, for example, once a minute. The data is supplied to the equipment model and rule sets to calculate KPIs. Web 352 produces online reports on the web for the KPIs and handles user requests for other type of reports and/or online and historical data 354. Online support 353 provides online monitoring and diagnostics services determined in the technology center 300 to customer 100 using the online engineering models and suite of tools. When operator 111 encounters a problem, operator 111 contacts regional expert 205, or global expert 206 for support. The experts may receive information from online support 353 to troubleshoot online problems.

History Database 354 includes collections of computer systems and data storage devices, which keep the inputs and outputs from the engineering models and rule-sets for specific time periods. The history data includes not only process data (or inputs) but also health and performance data (or outputs), which may be computed in real-time. The sophisticated engineering models are developed to allow comparison of equipment performance and benchmarking across varied business sectors. Technology center 300 operates in three modes: offline 320, online 350, and on/offline integration 340.

In the online mode, the process starts, and the task scheduler runs an application program in the computer systems in one of the installed servers. The installed servers may include one or more of the following: connect 200 application servers, Regional RMD Centers, Global RMD Centers, and/or customer computer application servers. The applications running in the application servers create operation environments that allow the multiple operations to occur contemporaneously, such as, for example, real-time 351, web reporting 352, online support 353, and history data archiving 354. Fixed data, such as specifications, constraints, and constant data are retrieved from customer 100. Additionally, online process data is retrieved from connect 200 in specified intervals, which are determined by the applications. In certain embodiments, the specified intervals may be a number of minutes, such as, for example, every minute, five minutes, or 10 minutes. Online models, which incorporate the company' information and under the composite 310 umbrella, are called to monitor the fixed and rotating assets. Knowledge from the past and research and development efforts are accessed online to evaluate current conditions and provide technical data to support troubleshooting of processes that are not operating at their desired level. Offline 320 may also be connected with online data for accessing offline case studies and equipment design changes, should such a level of support be required.

Offline 320 and online 350 modes may function as explained in detail above. On/Offline Integration 340 may provide for the integration of the collective knowledge of local, regional, and global experts, thereby allowing the company to benefit from their combined knowledge. Such collective knowledge may thereby allow for solutions to problems to be developed and reviewed by experts with general and site specific knowledge, based on past experience. During operation, experts working in offline 320 may develop ideas, run experiments, build pilot plans, and study impacts of changing process parameters. Experts working in online mode 350 may use their operating experience may then modify the designs developed by the experts working offline 320. The information developed by experts working both offline 320 and online 350 may then be shared in real-time through on/offline integration 340, thereby allowing for solutions to industrial process problems to be reviewed by experts with varied expertise. The supply of data in real-time may also allow for developed models to be reviewed and modified as the models progress. Thus, on/offline integration 340 may allow for industrial process designs to be optimized for a specific region or to solve a specific problem through the integration of experts of various expertise and real-time data transmission therebetween.

Embodiments of the present disclosure may also be used to display data from aspects of the above-described applications. For example, in certain embodiments industrial processes may be displayed for users, such as customers and operators at remote monitoring locations, such that individual components, trains, and site data may be monitored and analyzed. Such displays may include graphical user interfaces (GUI), which allow the industrial processes to be monitored, and the processes adjusted according to the analysis and optimization models described above.

Figure 9:
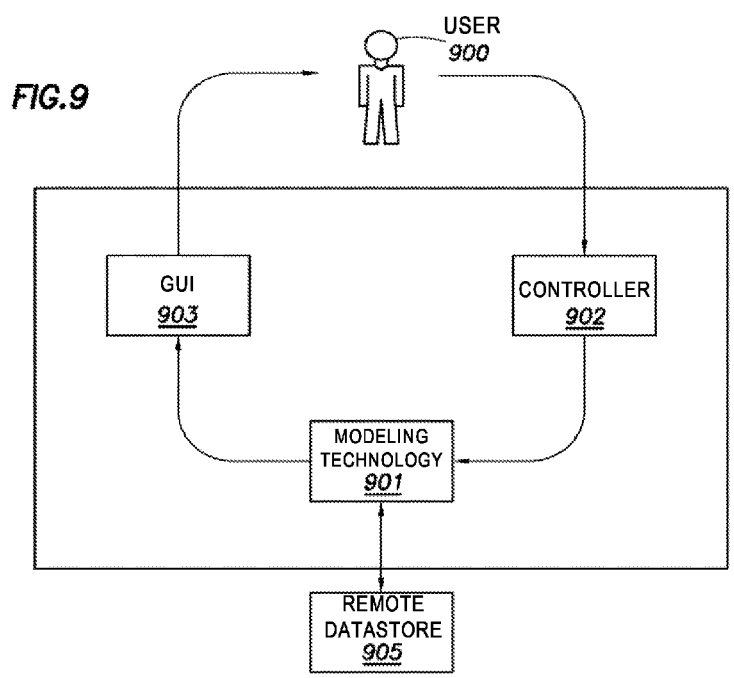
FIG. 9 is a schematic representation of a method of providing a user interface according to embodiments of the present disclosure.

FIG. 9:

Referring to FIG. 9, a method of displaying data according to embodiments of the present disclosure is shown. In this embodiment, a user 900 has access to both view and control modeling technology 901 according to the above identified methods. As illustrated, user 900 may manipulate modeling technology 901 through a controller 902. Controller 902 may include user interfaces and peripheral devices, such as, for example, keyboards, touch screens, and other input devices known in the art. Thus, user 900 may control modeling technology 901 by inputting specific data via controller 902 into modeling technology 901. After performing the requested operation, modeling technology 901 then outputs the results of the modeling, monitoring, simulations, etc. to a GUI 903, such as a screen or monitor. Depending on the specific operation requested, the output supplied to GUI 903 may include, for example, data representing a component of a monitored system, a optimized process parameter, data representing a process component, data representing a simulated process, or other data representing aspects of the monitoring and analyzing service.

Additionally, modeling technology 901 and GUI 903 may be represented remotely from one another. For example, in one embodiment, modeling technology 901 may be operatively connected to GUI 903 via satellite uplinks and/or wireless networks, thereby allowing the modeling technology 901 to be located in a first location, while the GUI 903 is located in a second location. As such, a user 900 may access modeling technology 901 that is housed in centralized remote monitoring location via a GUI 903 that is located at an industrial process location. Alternatively, a user 900 may access a GUI 903 that is integral to modeling technology 901 at a remote monitoring location. Those of ordinary skill in the art will appreciate that multiple users 900 may have access to multiple GUIs 903 and/or multiple controllers 902 at any given time. Thus, multiple user 900 may access the modeling technology 901, such as to update and/or request data, from multiple locations contemporaneously.

Modeling technology 901 may also update GUI 903 according to specified time increments. For example, in certain embodiments, modeling technology 901 may provide instructions to GUI 903 to display updated information in time-based increment, such as every minute, every 5 minutes, or every 10 minutes. In other embodiments, GUI 903 may update as requested by user 900. In such an embodiment, GUI 903 may update the display when user 900 requests additional information through controller 902. In still other embodiments, GUI 903 may be configured to update as an alert is determined by modeling technology 901. For example, if modeling technology 901 determines that a failure condition exists for the process or a component of the process being monitored, modeling technology 901 may instruct GUI 903 to update to alert user 900 of the changed condition.

In addition to allowing user 900 to interact with modeling technology 901 though GUI 903 and controller 902, modeling technology 901 may access a remote datastore 905, which operates independently of modeling technology 901. In one embodiment, remote datastore 905 may be located at a separate location from modeling technology 901. Thus, modeling technology 901 may receive and/or transmit data to and from remote datastore 905 according to defined protocols. Remote datastore 905 may include a centralized database of data previously determined in modeling, monitoring, and simulation operations. Additionally, remote datastore 905 may include data obtained from or including, for example, a knowledge database including records of proprietary company information about a specified industrial process. In still other embodiments, remote datastore 905 and/or modeling technology 901 may include databases containing data from knowledge models, such as models L1, L2, L3, L4, L5, or L6, discussed above. Thus, depending on the type of operation being performed by modeling technology 901, remote datastore 905 may have access to run status reports, obtain theoretical performance monitoring and actual performance reports, obtain health monitoring reports, obtain multi-variant statistics, and/or obtain company and vendor rules. Accordingly, modeling technology 901 may have access to any level of knowledge, whether the data is stored locally with modeling technology 901 or remotely, such as in a remote datastore 905.

Those of ordinary skill in the art will appreciate that GUI 903 may include any type of interface known in the art. For example, in certain embodiments, GUI 903 may be a Windows® operating system based interface allowing a user to interact with the data by viewing and subsequently manipulating the display through controller 902. Additionally, user 900, through a web-based application programmed in HTML or another suitable markup language, may view data supplied by modeling technology 901. Exemplary user interfaces will be discussed in greater specificity below.

Before the specific user interfaces are discussed, industrial process equipment arrangements will be discussed. Those of ordinary skill in the art will appreciate that the arrangements discussed below are illustrative of how equipment may be arranged, and does not provide an exhaustive list of every type of arrangement with which the embodiments disclosed herein may be employed.

Figure 10:
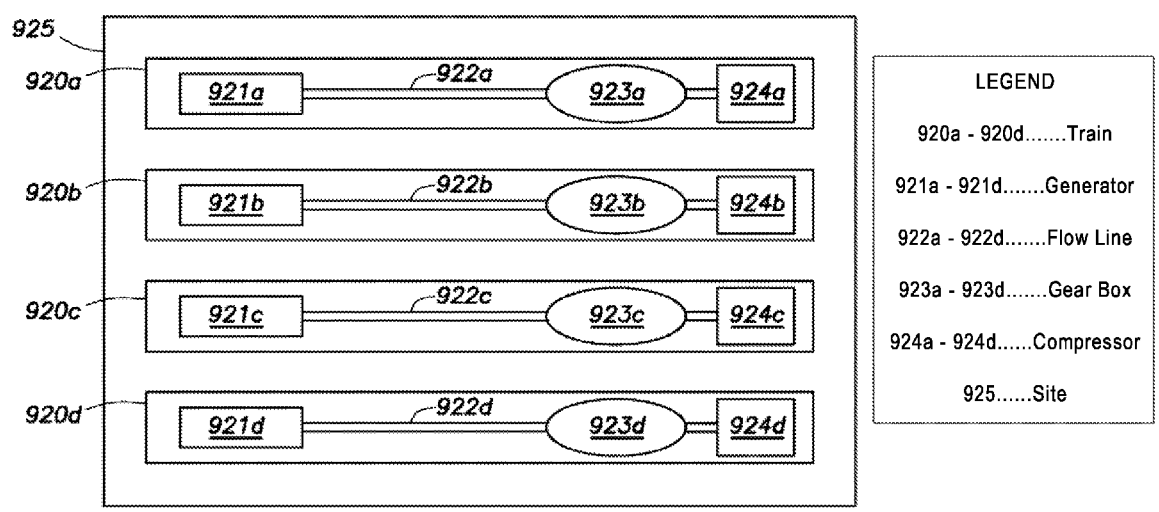
FIG. 10 is a schematic representation of trains at a site according to embodiments of the present disclosure.

FIG. 10:

Referring now to FIG. 10, a schematic layout of an industrial process according to embodiments of the present disclosure, is shown. Industrial processes typically have multiple components (i.e., bodies) providing redundant operability for a specific process. Said another way, in a given industrial process, the process may employ multiple parallel components capable of producing the same outcome and/or product. For example, in a gas generation process, the process may use multiple generators, compressors, gearboxes, pumps, etc. arranged as a series of rotating equipment bodies that are connected together. Such an arrangement is referred to in the art as a "train." Each train may be operatively connected to other trains, thereby providing redundancy in the process.

Trains may then be organized accordingly in a site, such that a single site may include one or more trains, of which each train may include one or more components. Thus, for an industrial process, multiple sites may include multiple trains, each having a number of components. Typically, each train is configured to operate independently of other trains at a site. Correspondingly, each component on the train is also configured to operate independently of other like components on other trains. However, because many sites include multiple trains, thereby providing redundancy in equipment, it is desirable to allow trains to access products and/or use redundant equipment between the plurality of trains. To further clarify a layout of components on trains within a site, FIG. 10 will be discussed in detail.

FIG. 10 illustrates an arrangement of individual components arranged in multiple trains 920a-920d. In this embodiment, each train 920a-920d includes a generator 921a-921d, a flow line 922a-922d, a gear box 923a-923d, and a compressor 924a-924d. Each train 920a-920d is capable of interacting independently of each other train 920a-920d. Thus, individual components of each train 920a-920d may operate independently of other like components. The plurality of trains 920a-920d together forms a site 925.

During operation, each component group of trains 920a-920d provides a specific function for the train. Thus, each component may be monitored during operation to determine how effectively the component is operating. For example, generator (e.g., 921a) may include a plurality of sensors disposed along the body of the generator to measure certain aspects of the components during use. In one embodiment, sensors may be disposed on generator (e.g., 921a) to determine inlet vibrations, revolutions per minute, center vibrations, and temperature. These measured properties may then be used to determine how individual generator 921a is operating. Similarly, gear box 923a may include a plurality of sensors disposed to measure properties, such as, for example, temperature and speed, while compressor (e.g., 924a) includes sensors capable of measuring temperature, speed, and flow. Those of ordinary skill in the art will appreciate that depending on the specific type of component being used, the properties measured, may vary. Thus, for certain components the properties measured may be more exhaustive than the properties measured for other components.

Furthermore, for certain components, the component itself may not be measured, but instead, a product flowing therethrough may be measured. In this embodiment flow line 922a may not be measured directly, but instead, the speed of flow therethrough, along with a temperature and/or a pressure may be measured. While the measurements may not provide an indication as to whether the individual flow line (e.g., 922a) is performing within acceptable parameters, the measurements may be used to determine how the train (e.g., 920a) or site 925 is functioning as a whole. Thus, for any given operation, a number of measurements from individual components, trains 920a-920d, or site 925 may be collected, and used for determining the operability of the process.

Additionally, each train 920a-920d in site 925 may not be capable of functioning at the same level. For example, train 920a may only be capable of functioning at 90% of the level of train 920b. Thus, each train 920a-920d may be assigned a weight in terms of a percent that may define how the individual train in functioning. Similarly, site 925 may be measured according to aggregate train values based on the output of individual trains.

For example, in one embodiment, for the site to be operating at an acceptable level, the output must be greater than 80% of total possible output (which is a maximum of 100%). Thus, if the output for the site falls below 80%, the site is not operating efficiently. Each train 920a-920d may be assigned a weight, in this embodiment 25% for each train. Thus, if each train 920a-920d is operating at 100% of its capacity, then site 925 is also operating at 100% of its capacity. However, if each train 920a-920d is operating at 80% of its capacity, then site 925 is operating at 80% of its capacity. In either scenario, site 925 is operating within acceptable limits.

However, in many industrial processes, the operating capacity of individual trains 920a-920d is not equal. For example, in one embodiment, trains 920a and 920b may operate at 100% efficiency, while trains 920c and 920d may operate at 80% efficiency. Because each train has the same assigned weight (i.e., 25% of the site), the aggregate train value for site 925 is 90%, and thus within the acceptable range. However, in an embodiment wherein trains 920a, 920b, and 920c are operating at 100% but train 920d, due to malfunction, is not operating and not producing (i.e., its output is 0%), then the aggregate train value for site 925 is 75%, and the site is not operating within an acceptable range. In such a situation, a process operator may be informed of the situation, as will be discussed in detail below.

Commonly, during industrial processes, individual components of trains 920a-920d may begin operating with less efficiency, thereby decreasing the productivity of individual trains 920a-920d, without causing the train to fail, as discussed in the last example. For example, in one embodiment, trains 920a and 920b may be operating at 80%, while trains 920c and 920d are operating at 75%, thereby resulting in a site aggregate of 77.5%, or 2.5% below site requirements. Rather than allow the process to continue operating at below acceptable efficiencies, embodiments of the present disclosure provide systems and methods for adjusting the output of individual components on individuals trains 920a-920d to bring site productivity back to within an acceptable range.

Typically, even if an operator realized that one or more of trains 920a-920d was operating out of a specified range, the operator was unable to know which component of the train was responsible for the failure, and as such, were unable to adjust aspects of other trains to compensate for the failure of an individual component of a train. However, embodiments disclosed herein may allow an operator to adjust a component of a train (e.g., 920a), or adjust the output of a train (e.g., 920a) to compensate for a problem with an individual component of another train (e.g., 920b).

In the embodiment where trains 920c and 920d were operating at 75% of capacity, thereby decreasing the aggregate output for site 925 outside of an acceptable range, one option to an operator would be to increase the net output of trains 920a and 920b. One solution may include increasing the output of train 920a or 920b to 100%, thereby resulting in an aggregate site output above 80%, which is within the acceptable range. However, another solution may include increasing the output of each of trains 920a and 920b by 5% each, thereby resulting in an aggregate output of 80% for site 925.

While these solutions may work in certain embodiments, and while embodiments disclosed herein through the monitoring of individual components and alerts issued to an operator provide for such a solution, another solution may include rerouting system resources from one of trains 920a and 920b to failing trains 920c and 920d to raise the output of the failing trains. The ability to reroute system specific resources may thereby increase the aggregate of site 925 while not increasing stress to other trains, which may be caused by increasing the amount of output from individual trains. Rerouting refers generally to supplying the output of a train to a second train, thereby allowing a train operating over capacity to make-up for a train operating under capacity. Similarly, individual components of trains may be able to supply output over capacity and thereby make-up for components of other trains operating under capacity.

Such a solution is possible, because components of each train 920a-920d are monitored individually. Just because train 920a within site 925 falls below specification does not result in a site 925 that falls out of specification, components of a system may run within an acceptable range that allows for systems resources to be rerouted to other components or trains 920a-920d.

Figure 11:
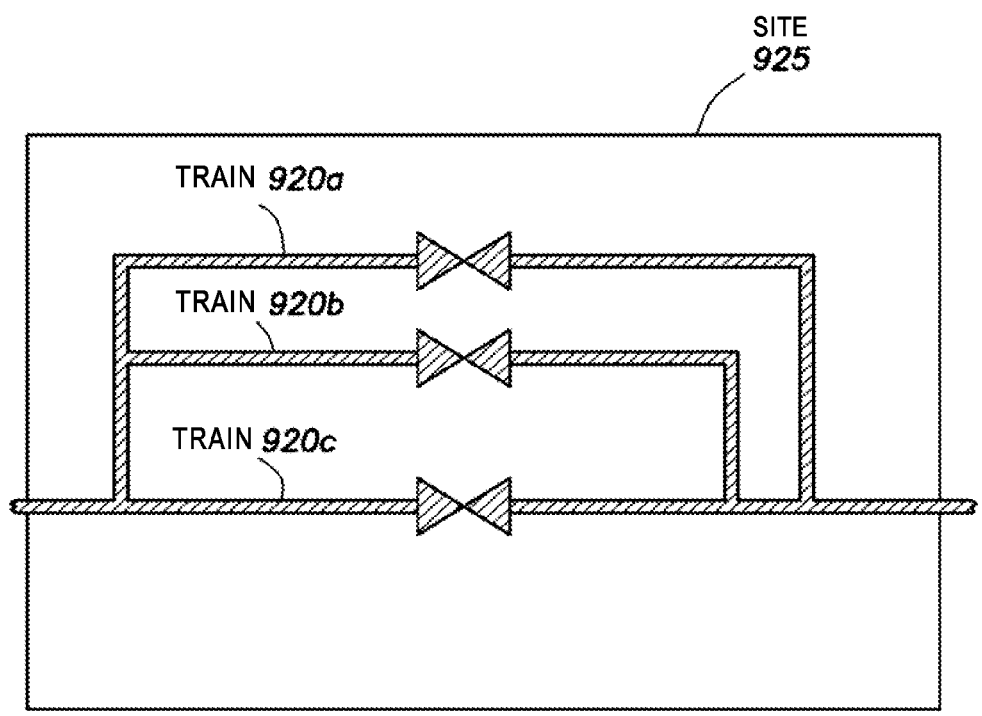
FIGS. 11 and 12 are schematic representations of trains according to embodiments of the present disclosure.

FIGS. 11 & 12:

Referring to FIG. 11, a train schematic according to embodiments of the present disclosure is shown. In this embodiment, a number of trains 920a-920c are located at a site 925. Each train 920a-920c may then be assigned a specific class, for example, in one embodiment, trains 920a, 920b, and 920c may be assigned power generation, as a class. Other classes, depending on the specific application, may include classes such as first stage compression, second stage compression, circulation pumping, drum pumping, injection pumping, etc. Furthermore, each train within the class is assigned a weight. In this embodiment, of the aggregate, trains 920a and 920c are assigned a 50% weight, while train 920b is assigned a 100% weight. The aggregate of the class required to be functional is 100%.

Figure 12:
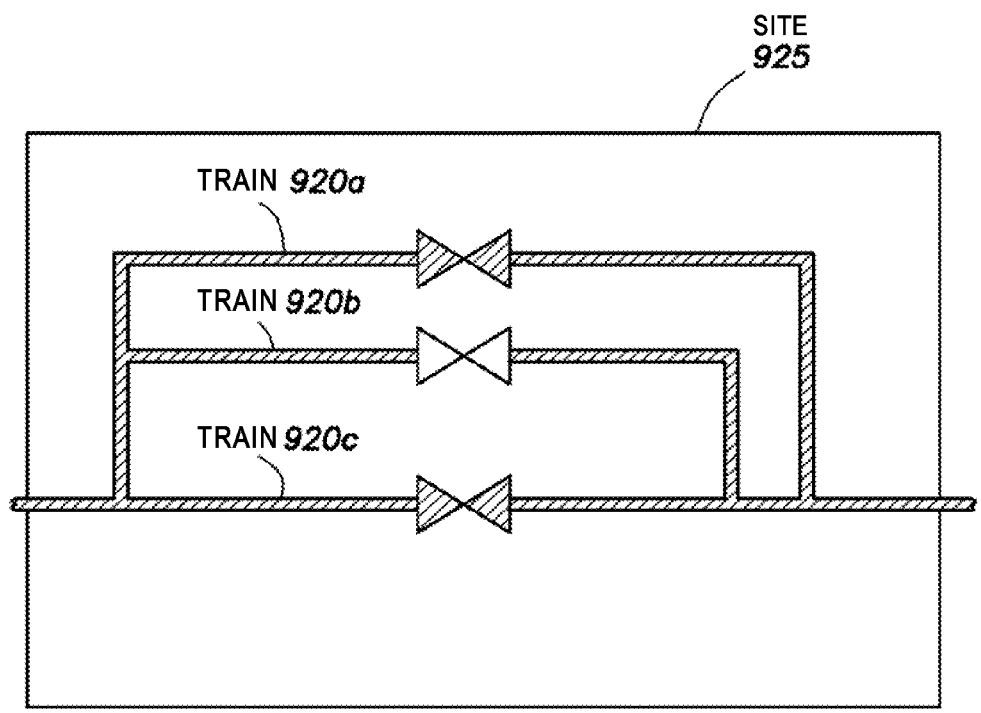

In this embodiment, trains 920a and 920c are operating at 50%, while train 920b is operating at 100%, thus, the aggregate production of the system is 200%. However, for site 925 to be operational does not require all trains 920a, 920b, and 920c to be operational. Referring briefly to FIG. 12, an alternate configuration of the train schematic of FIG. 11 according to embodiments of the present disclosure is shown. In this embodiment, train 920a and 920c are running, thereby producing an aggregate power output for the class of 100%, while train 920b is not functioning. However, because the aggregate power output for the class is 100%, power production is adequate for functionality of site 925. Alternatively, if trains 920a and 920c become dysfunctional, but train 920b is functional, site 925 would remain functional because total power output for the class is still 100%. However, if only one of trains 920a or 920c is functional, total power output would be 50%, which would not supply enough power for the class, and thus the power output class for site 925 would not be operating within specification.

Those of ordinary skill in the art will appreciate that for any given process, an operator of a remote monitoring service or a user may determine the specific requirements for individual components of the system. Thus, for a given operation, the number of classes of trains, the total number of trains, components on the trains, and the weights, both for trains and as an aggregate are defined.

Figure 13:
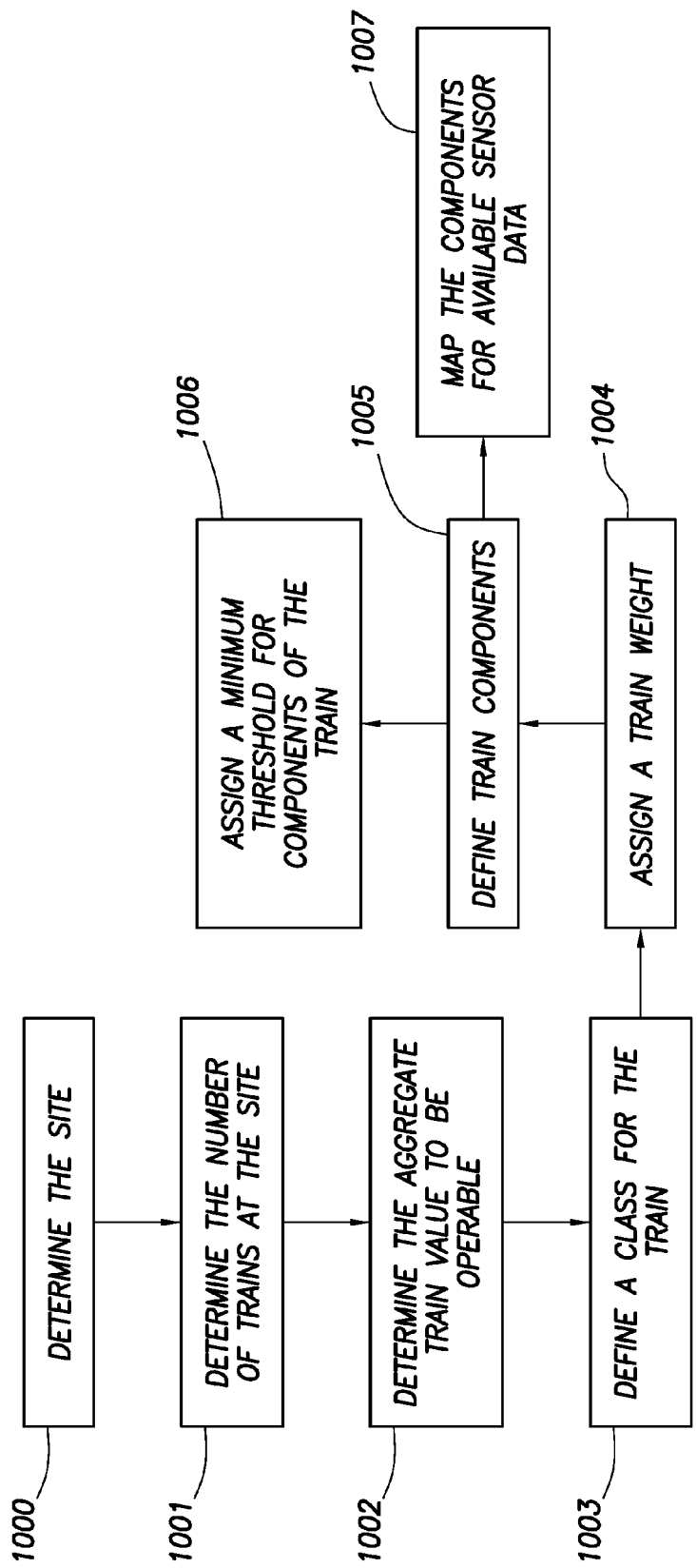
FIG. 13 is a box diagram of setting up a site according to embodiments of the present disclosure.

FIG. 13:

Referring to FIG. 13, a flow chart of setting up a site according to embodiments of the present disclosure is shown. In this embodiment, initially an operator, which may include either a customer or a user of a system described above determines 1000 a site to be integrated, and determines 1001 the number of trains at the site. The operator then determines 1002 the aggregate train value required for the site to be operated. The aggregate train value will typically be 100% functionality to indicate that the site is operating at a desired level of efficiency; however, those of ordinary skill in the art may set the aggregate train values to less than 100% for specific operations.

After determining the aggregate train value required for the site to be operational, the operator associates 1003 each train with a class. The class represents the type of product produces, for example, the product may be power generation, a certain type of compression, or a certain type of pumping. Those of ordinary skill in the art will appreciate that the class may vary according to the specific process being monitored and analyzed, and as such, depending on the specific process, classes may include any type of class found in industrial processing.

After determining the class, the operator assigns 1004 each train in the site a weight value by percentage. Thus, a site may include a number of trains that result in an aggregate train value of over 100%, assuming 100% is required for site functionality. As discussed above, in certain embodiments, the aggregate train value may be over 100%, so as to indicate that the trains have built-in redundancy. Such redundancy may result from multiple components on a train and/or from multiple trains within a class. Thus, for a certain process, a class of trains may be capable of producing an aggregate of over 100%, thereby indicating that if one or more trains and/or components within the class cease to function, the class may still produce enough of the class defined product such that the site remains operational. However, in embodiments wherein the class does not have greater than 100% possible production, if one or more components or trains within the class fail, the aggregate may fall below 100%, thereby indicating that the site, or a specific train, is no longer operational.

Each train must now be mapped to identify 1005 specific components of the train. As discussed above, each train may include multiple components that are required to produce a product of a certain class that is used by the site. Thus, by defining 1005 the components of each train, the functionality of each component may be determined and used in subsequent analysis. For each component, the sensors available to provide data about the component must be determined 1006, and the minimum operating thresholds for each component must be defined 1007. Those of ordinary skill in the art will appreciate that determining the sensors available to provide data about a specific component may include determining sensors already in place on the component, and routing data produced by the sensors to a remote monitoring service. Additionally, sensor data may include data supplied by a vendor, the customer of the service, or a third part, as explained above.

Defining 1007 the minimum operating thresholds includes determining, in terms of a percent, the output of a component required for the train to function. Thus, if a component is defined as having a minimum operating threshold of at least 70%, and if the output of the component falls below 70%, the component will be considered to be failing. If the component enters a failure mode, then the train may also be considered failing, unless redundant components within either the same train or a different train can make-up the difference.

The above-described order disclosed in FIG. 13 is illustrative in nature. Those of ordinary skill in the art will appreciate that in alternate embodiments, setting up a site may occur in a different order, such as, for example, defining specific components of the trains prior to indicating train weight and classification. Thus, various orders of setting up a system according to the embodiments disclosed herein are still within the scope of the present disclosure.

FIG. 10:

Referring back to FIG. 10, because embodiments disclosed herein allow for a class designation for each train, individual components of a first train may be used to compensate for a failure mode of a component of a second train. For example, if train 920*a* has a component failure, such as generator 921*a*, but generator 921*b* of train 920*b* is producing above failure mode, power may be rerouted from train 920*b* to train 920*a*, because trains 920*a* and 920*b* are in the same class. Thus, embodiments of the present disclosure allow for classes of trains 920 to result in inherent redundancy within the system.

Embodiments disclosed herein also provide for a user interface to allow a user to monitor the process from a remote location. The user interface provides the user with an overview of the entire process, while also allowing the user to access train data and individual component data. Thus, the user may be able to determine the functionality of the entire process, trains, and/or individual components. Because individual components may be monitored, operating parameters of the components, and thus trains, may be adjusted so as to improve the operation of the site.

Figure 14A:
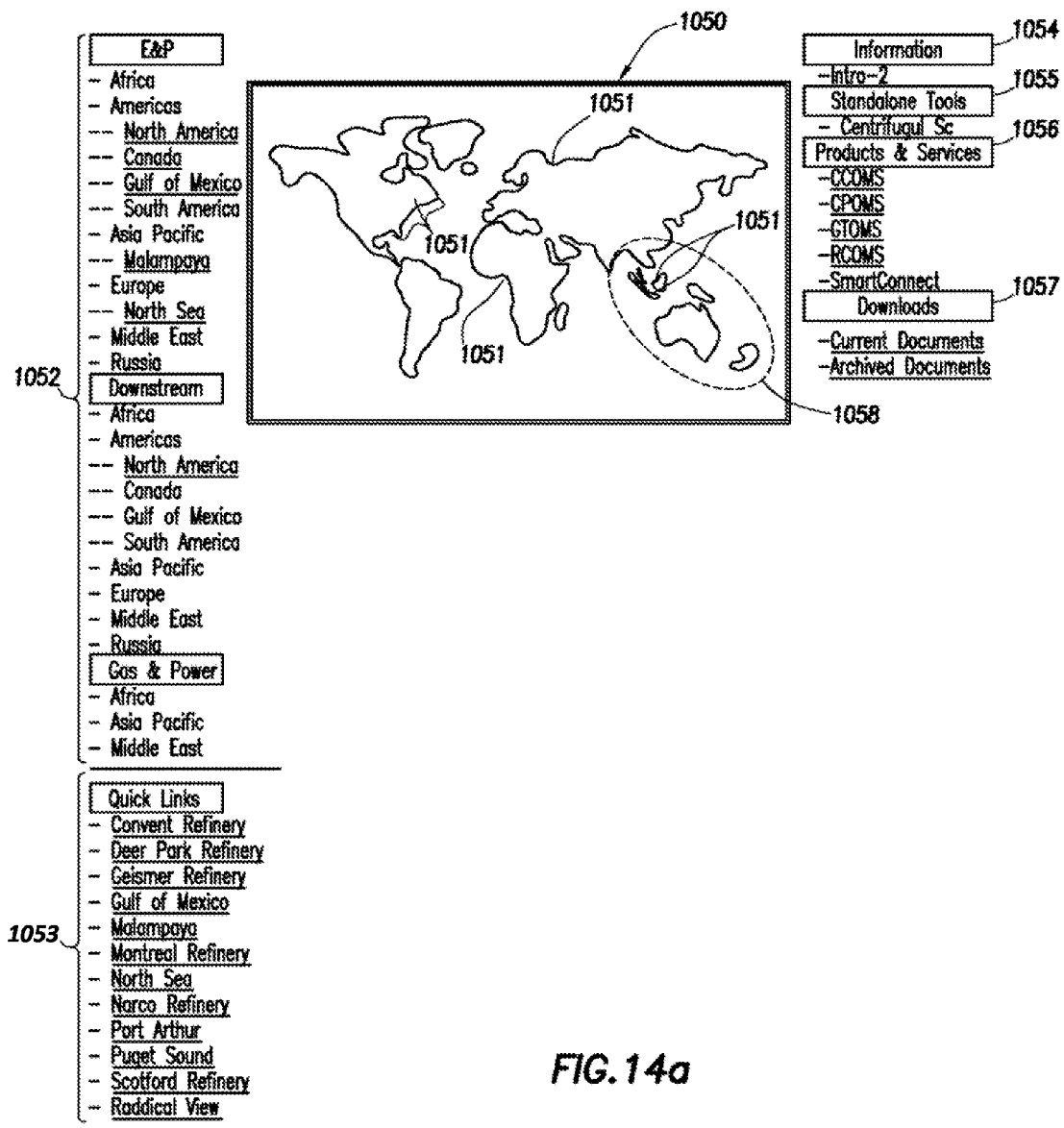

As discussed above with respect to the GUI, the user interface may use standard HTML programming, and may operate as a standalone client, or as part of a larger system. Thus, customers, users, and experts may access information through the user interface to allow individuals in various locations worldwide to monitor industrial processes. FIGS. 14*a*-14*n*, 14*k*1-14*k*3, 14*l*1-14*l*4, 14*m*1-14*m*4, and 14*n*1-14*n*4:

Referring to FIGS. 14*a*-14*d*, user interface screens according to embodiments of the present disclosure are shown. In this embodiment, FIG. 14*a* illustrates an overview screen displaying a map of the world 1050, thereby allowing for individual industrial processes to be displayed. Industrial operations may be indicated as links (designated as 1051) on the map, which may be used to access information about the specific operations. Additionally, the overview screen includes information that allows a user to access regional information through a series of regional links 1052. Regional links 1052 allow for a user to access a specific area, thereby displaying more specific information about the selected region. Overview screen also provides a user access to quick links 1053, thereby allowing the user to access specific industrial operations without using the regional links 1052.

In addition to being able to access process information, embodiments disclosed herein provide the user the ability to access other information, such as, for example, general information 1054, standalone tools 1055, products and service information 1056, and documents 1057, both current and archived. Such information may thereby allow the user to access tools necessary to analyze the data, and then take action with the information the interface provides. Those of ordinary skill in the art will appreciate that additional information may be provided through the user interface, and as such, the interface options discussed herein are illustrative of a user interface for a specific operation, not exhaustive as to all possible options.

Figure 14B:
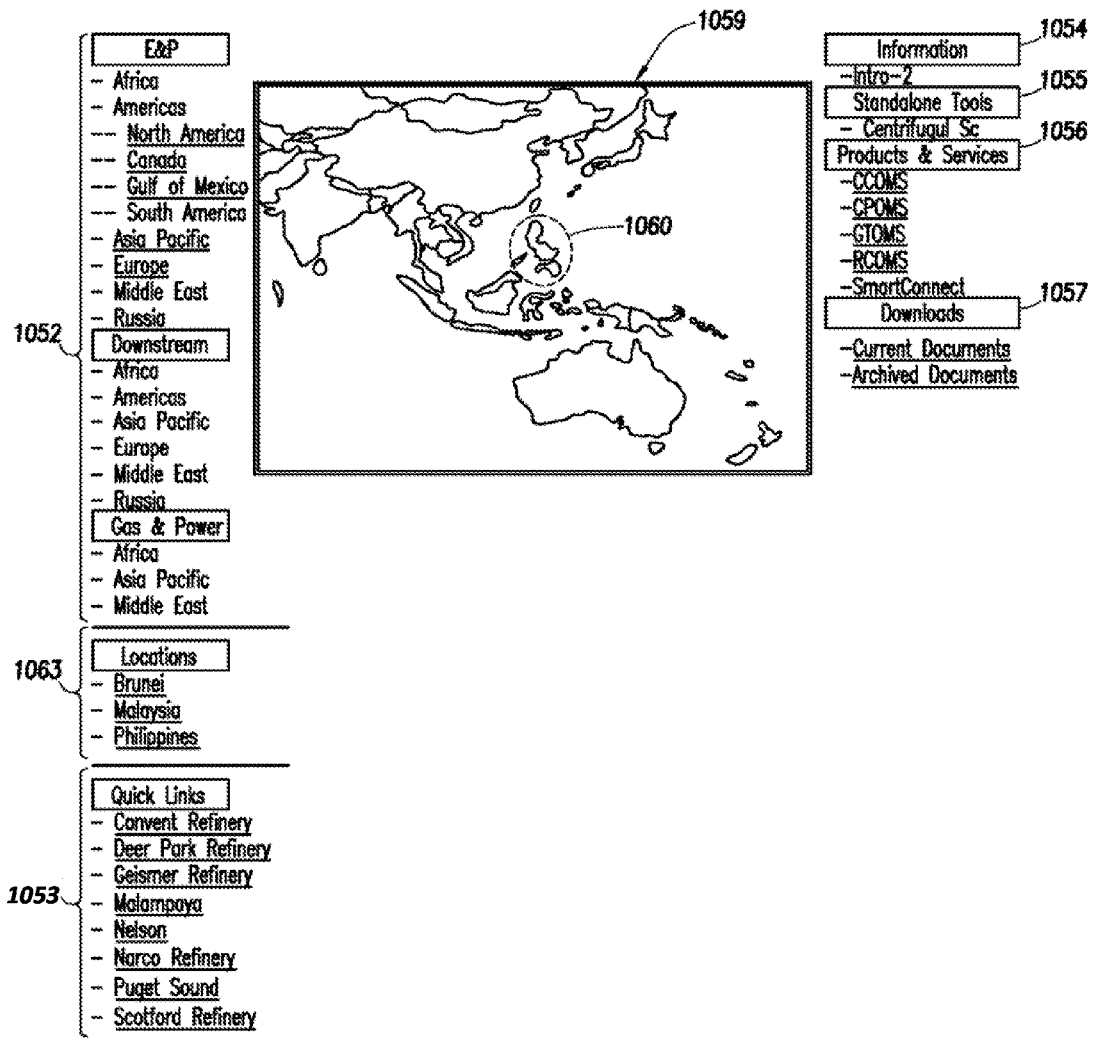

To gather more information about specific operations, the user may select a specific region, to access more in-depth information about processes in the selected region. In this embodiment, if the user selected region 1058 of map 1050, the user is provided a detail of the region, illustrated as FIG. 14*b*. FIG. 14*b* provides a user many of the same features as the overview screen, such as, for example, a series of regional links 1052, quick links 1053, information 1054, standalone tools 1055, products and services 1056, and downloads 1057. In addition to the information provided as links in the overview screen, regional screen also provides area links 1063, specific to individual areas within the region. As such, the regional screen provides the user an in-depth view of the region 1059, including color-coded links detailing a selectable area of the region 1059, as well as links 1063, which a user may select to gain more in-depth information about the region.

Figure 14C:
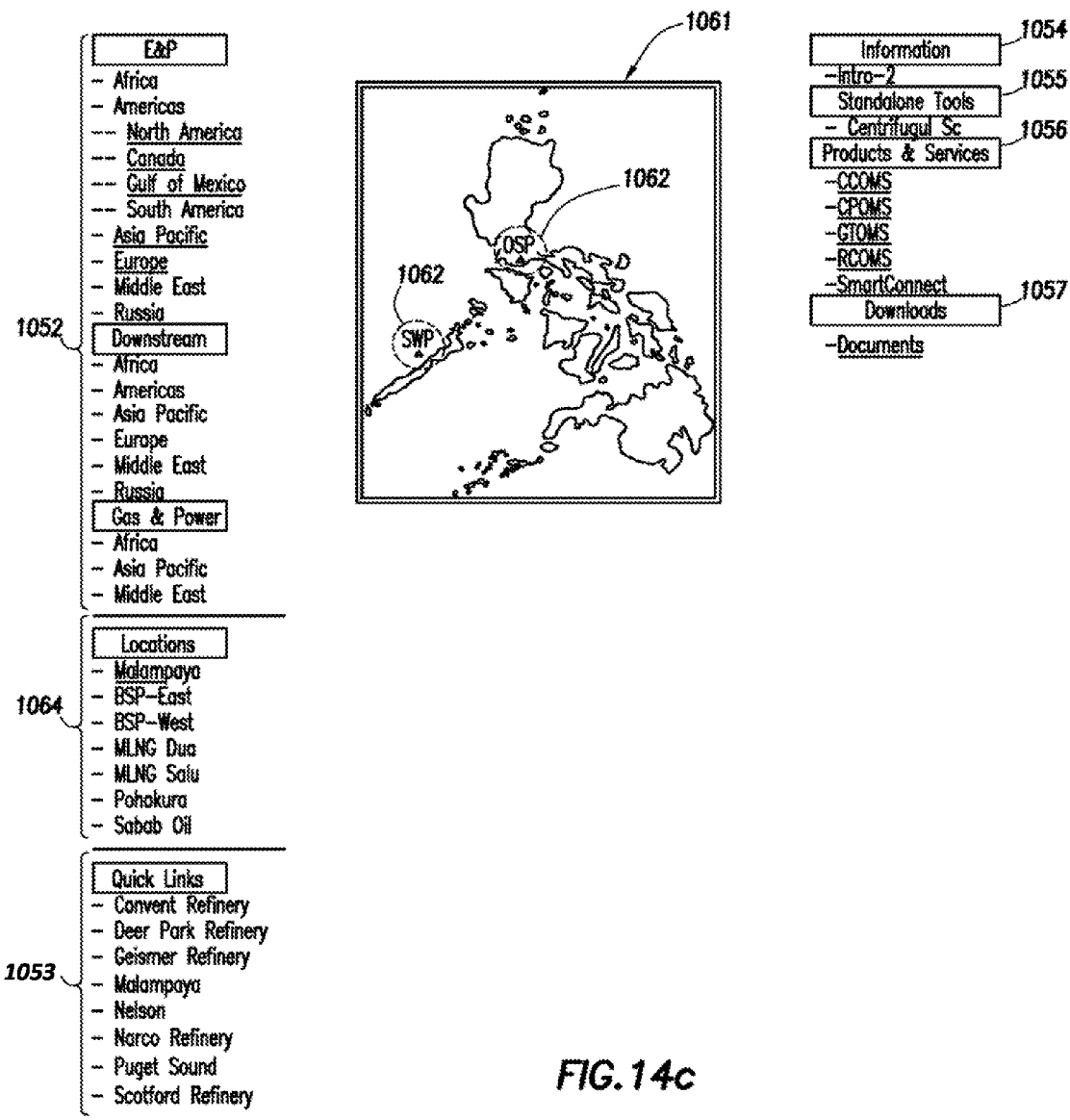

If the user selected area 1060, the user is directed to area specific information illustrated as FIG. 14*c*. FIG. 14*c* shows an in-depth map of the Philippines 1061, and shows, by name, specific processes 1062 that may be accessed through the remote monitoring service. In this embodiment, many of the same features form the overview screen and regional screen are also displayed, including, for example, a series of regional links 1052, quick links 1053, information 1054, standalone tools 1055, products and services 1056, and downloads 1057. Additionally, the area screen provides a user access to individual links for process locations 1064 within the area. Thus, a user may select a specific site my selecting the process from map 1061 and/or through links 1064.

Figure 14D:
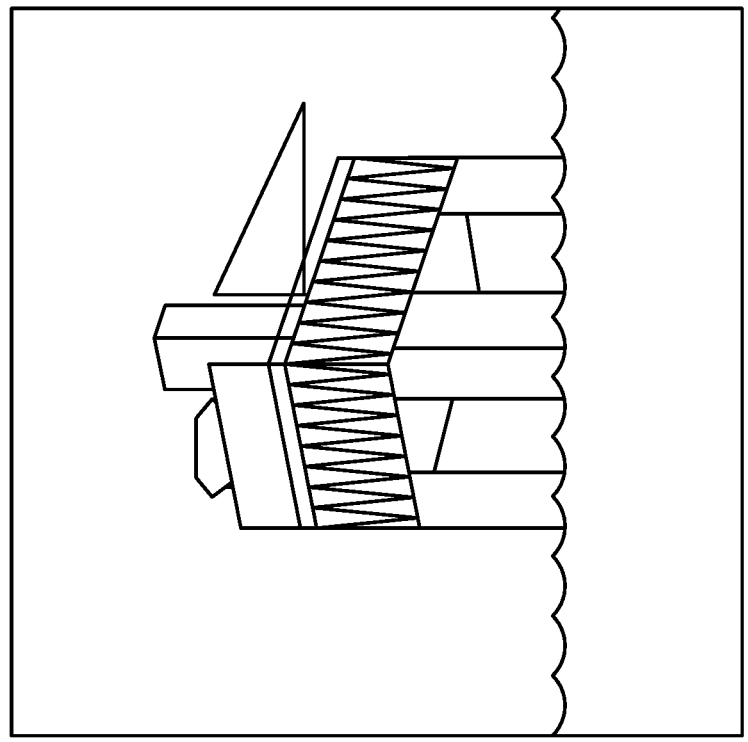

If the user selects Malampaya from links 1064, the user is directed to a site-specific screen, illustrated as FIG. 14*d*. The site screen may thereby provide the user the ability to access information about the specific site, such as, for example, an asset summary 1065, platform information 1066, gas plant information 1067, and specific site data 1068 including threshold levels, train/body information (i.e., train/component information), tag source information (i.e., sensor data), and an overview. The information provided through each of the aforementioned links will be discussed in detail below, however, those of ordinary skill in the art will appreciate that the information discussed is specific to the Malampaya site, and for other sites, additional and/or different information may also be provided. For example, in alternate embodiments, the process may include a land-based rig, information on exploration and production, downstream operations, or information on any type of industrial process known in the art.

Figure 14E:
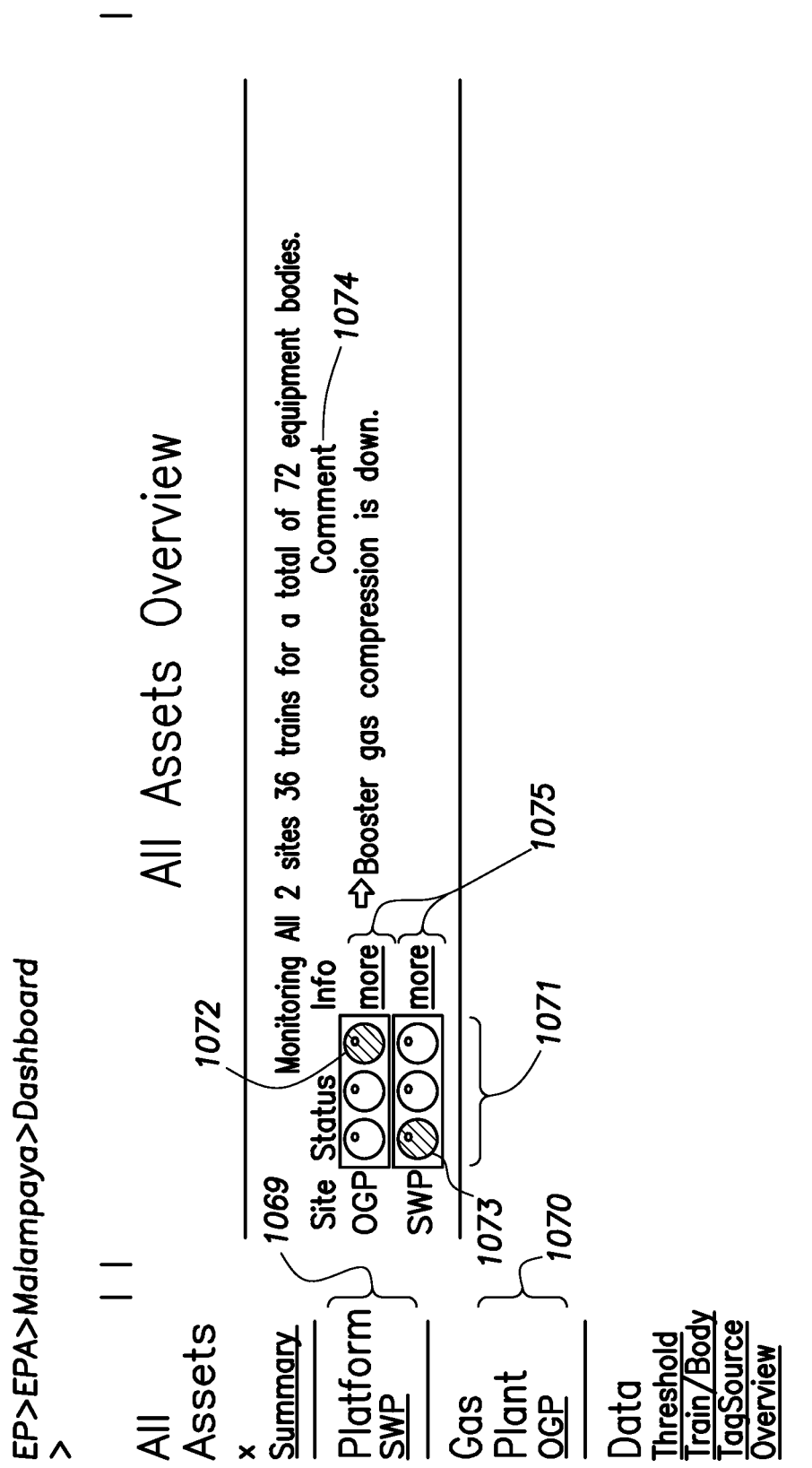

Upon selection of Asset summary 1065, a user is directed to an asset overview screen, illustrated as FIG. 14*e*. The asset overview screen provides a high-level view of the operation of all assets at the location. In this embodiment, two sites, platform SWP 1069 and gas plant OGP 1070, are being monitored. The asset screen also provides an overview of the asset, for example, as including two sites having 36 total trains and 72 total equipment bodies. The display of the two sites indicates the status of the site using a visual display, such as a stop light display 1071 in this embodiment. The visual display may thereby provide a user an indication of the status of the individual sites through visual cues, such as a red indicator 1072 for a site that is not functioning or a green indicator 1073 for a site that is functioning. For a site that is not functioning, or is experiencing a problem, the comment section 1074 provides an indication as to what the problem includes, such as, in this embodiment, notation that booster gas compression is down. To further determine the cause of a non-functioning site, or for more detailed information in general, the user may select the more button 1075 under the information tab.

Selection of the more 1075 button provides the user with a detailed listing of trains at a specific site, illustrated in FIG. 14*f*. The run status report allows the user to monitor and receive information about specific trains 1076 at a selected site 1077. Each train 1076 includes a service description, a class number, a train weight percentage, and a green and yellow percent. The class number indicates the type of class the train belongs to, which in this embodiment includes designation of four classes, each class having two pieces of equipment. As described above, each train has a train weight percent, which for each component at this site is 100%. Thus, each train must produce 100% of the required output for its designated class to be considered functioning. Additionally, run status and class status are indicated as visual representations, and a train confidence level is displayed numerically.

In this embodiment, class 1, the power generation trains 1076, as a class, are operating sufficiently to keep the site running, which is indicated by a green indicator in the class status field. However, only one of the two trains 1076 in class 1 is operating. As indicated train G-924A is operating sufficiently, as may be seen through a green run status indicator; however train G-924B is not operating sufficiently, as may be seen through a red run status indicator. Similarly, train K-862A and K-862B are operating as a class sufficiently to keep the process running, however, while train K-862A is operating at 100%, train K-862B is operating at less than 100%, as is indicated by the yellow light.

In both class 1 and 2, the trains as a class are generating sufficient output to allow the site to function; however trains 1076 in classes 3 and 4 are not operating sufficiently to keep their respective classes functioning. This outcome is indicated by all trains in classes 3 and 4 having a red run status, thereby alerting a user that there is a problem with one or more components in the classes.

To further explain train weight percent, and its effect on site train and site status, a second run status report, illustrated as FIG. 14*g*, is shown. FIG. 14*g* illustrates a site 1078 having trains 1079 divided into 11 classes. As described above, each train is designated a class number, a train weight percent, green and yellow percentages, run status and class status indicators, and a train confidence level percent. Looking initially at class 1, three trains are designated to provide air compression. In this embodiment, the train weight percent for each train within the class is 34%, and for the class to be operable, the combined output must be 65%, as indicated by the green indicator %. Class 1 is operable, as indicated by a green class status indicator 1080, even though train A-231B is not operable, as indicated by a red run status indicator 1081. To compensate for train A-231B not being operable, train A-231A is being operated at 65%, while train A-231C is being operated at 34%, thereby providing the required output of 100% (when rounding is taking into consideration). Thus, class 1 provides an example of rerouting class resources from multiple trains to produce a required output (illustrated in FIGS. 10-12), even though a specific train within the class is not functioning.

Referring back to the site screen, FIG. 14*d*, if platform information 1066 is selected, a user is directed to an exception report, illustrated by FIG. 14*h*, for the site. The exception report provides a description of the train(s) for a given site that are not functioning. In addition to providing a basic description of the service provided by the trains, the exception report indicates the run status, and a time sequence of activity divided into increments, such as a percent utilization by day, month, or in multi-month format. This overview of exceptions also allows the user to select a detailed description 1082 of a train, body, or tag.

Selection of a complete description of train(s) from the exception report provides the user with a complete report of all of the trains within the site, as illustrated in FIG. 14*i*. The complete report shows all of the trains for the site, and provides visual indication of the run status of each train. Thus, a user may view an up-to-date operating condition for each train within the site.

Selection of a complete description of the body from the exception or complete train report provides the user with a report of bodies (components) of the trains within the site, as illustrated in FIG. 14*j*. The body description report shows each train, including a run status, as well as each body within the train including a run status. The body report may then provide the user an overview of the function of individual components, such that the user may determine when component of the train is not functioning, as well as view a confidence level for each component, such that appropriate action may be taken if a component is causing a train to fail.

Selection of a complete description of the tags from either the exception or train report provides the user with a report of individual tags (sensors) on individual components of the trains within the site, as indicated in FIGS. 14*k*1, 14*k*2, and 14*k*3, as arranged in FIG. 14*k*. In addition to the information provided in the body report (FIG. 14*j*), the tag report provides the user with data imported from individual sensors on each piece of equipment in each train. The data may be received directly from the equipment, or from vendors (via a third party monitoring service), or from the customer. The user may use the data to determine whether a specific operation of a specific component is failing. For example, in one embodiment, the user may receive information indicating that the temperature of a portion of the component is out of specification. The user may then use the temperature data to determine an appropriate solution. Other sensors may provide users with additional data, such as indicators of revolutions per minute, power, amperage, flow rates, etc. Those of ordinary skill in the art will appreciate that each piece of equipment may provide different sensor data, and as such, the specific type of data generated will depend on the equipment being used.

Referring back to FIG. 14*d*, data 1068 about a specific site may selected by a user to determine specific aspects of the site, trains, bodies, or tags. Upon selection of data 1068, threshold parameters may be viewed, as illustrated in FIGS. 14*l*1, 14*l*2, 14*l*3, and 14*l*4, as arranged in FIG. 14*l*. The threshold scan data screen provides a name for the tag, a description, a status, and a series of levels, indicating a low level, a threshold level, a high level, and scan data recently received from the sensor providing the tag information. During operation, the scan data field may be populated in specified time intervals, such as every minute, five minutes, or ten minutes, as required and/or defined by the user or customer.

As illustrated by Point ID P1, the first entry on the threshold scan data screen, K-153 is operation, as indicated by a green status indicator and scan data (i.e., 464142) over the threshold (i.e., 50000). However, Point ID P2, the second entry on the threshold scan data screen is returning a negative signal, thus displaying a red status indicator, because the scan data (i.e., 61516) falls below minimum threshold (i.e., 100000). Thus, an operator may use the signal data to confirm the set points for individual threshold levels for sensors, as well as recently received scan data.

Additional data from FIG. 14*d* may be selected, including train and body tag mapping 1084, as indicated by FIGS. 14*m*1, 14*m*2, 14*m*3, and 14*m*4, as arranged in FIG. 14*m*. Mapping data provides a user with detailed description of they type of sensor that is being mapped for each component of a train. This screen also provides the user the last received value for the tag and an indication of whether the quality of the tag is sufficient. Thus, the user may determine when additional tags need to be mapped and/or whether sensors on individual components of a train are malfunctioning, and thereby providing data of insufficient quality.

Other aspects of the present disclosure provide for an overview screen showing a complete status report of all trains for the specified site, as illustrated in FIGS. 14*n*1, 14*n*2, 14*n*3, and 14*n*4, as arranged in FIG. 14*n*. The overview screen includes similar displays as discussed above, but consolidates the information for ease of viewing by the user. Data displayed may include the site name, train number, service provided by the train, class number, train weight percent, green and yellow percent, run status, train confidence level, and a class status. Thus, using the provided information, the user may determine an overall functioning of individual trains and classes, to determine whether a more details investigation into the site, train, or components is required.

Those of ordinary skill in the art will appreciate that the embodiments disclosed herein may provide users both overview and detailed information about an industrial process from a remote monitoring station. The information may be used to determine the functionality of individual components, trains, and the site in general, and thus may be used to diagnose problems occurring at the site. Additionally, the information imported into the user interface may be shared by additional aspects of the application, as discussed above, and as such, may be used by models L1-L5 to adjust aspects of the process, such as to achieve better system health and/or component, train, and site optimization.

Advantageously, embodiments of the present disclosure may allow for remote monitoring and advanced calculations regarding equipment operation and functionality for industrial processes. Additionally, the interconnectivity of the present disclosure may allow for industrial processes to be monitored from thousands of miles away, such that a central monitoring facility may oversee the operation of a plurality of industrial processes from a single location. By centralizing the monitoring, resources may be saved, and the process may function more efficiently.

Also advantageously, embodiments of the present disclosure may allow for the monitoring of individual components of an industrial process, such that when a component of a process is operating below a desired or required level, an operating parameter of the component or the system may be adjusted so as to return to component and/or system to a desired level of functionality. Such individualized monitoring may also allow for data collected during the monitoring to be collected, such that future operations may be modeled and predicted to further increase the efficiency of industrial processes.

Embodiments disclosed herein may further provide for an integrated system for collecting data, transmitting the data, and processing the data to determine optimized process parameters for a specified industrial process. For example, in certain embodiments, data may be collected from an industrial process, including the collection of data about the operating parameters from individual components of the process. The data may then be transmitted through centralized connections to a remote monitoring service, wherein the data may be analyzed to determine, for example, the operability of components of the process, the operability of the process as a whole, the health of individual components or the process as a whole, the status of individual components or the process as a whole, and/or recommended actions for operating individual components or the process as a whole.

Advantageously, embodiments of the present disclosure may allow for knowledge levels about a process to be defined, analyzed, and used to determine recommended actions for a specific process. For example, knowledge levels, including the status of the process, the performance of the process, the health of the process, and benchmark analysis of the process may be performed by individual modules within the system, and then the data generated by the individual modules may be used to train additional modules for optimizing the process.

Thus, embodiments disclosed herein may allow for an integrated approach to monitoring an industrial process that uses the data generated to optimize the performance of the industrial process.

Illustrative Embodiments

One embodiment of the invention discloses a system for monitoring an industrial process, comprising one or more sensors connected to one or more operating components of the industrial process; a remote monitoring station, comprising a computer and a database; and a connection between the one or more sensors and the remote monitoring station, wherein the remote monitoring station is at least about 100-2500 miles away from the industrial process, for example 500-1000 miles. In some embodiments, the system also includes a mechanism for sending data from the sensors to the remote monitoring station. In some embodiments, the system also includes a mechanism to transmit a solution to an operating component problem from an expert at the remote monitoring station to an operator at a location of the industrial process. In some embodiments, the remote monitoring station comprises data and history from a plurality of industrial processes at multiple different locations. In some embodiments, the system also includes a link to a manufacturer's data for the operating components.

One embodiment of the invention discloses a method for monitoring an industrial process, comprising connecting one or more sensors to one or more operating components of the industrial process; connecting the one or more sensors and a remote monitoring station; monitoring one or more operating parameters of the one or more operating components, such as pressures, temperatures, flow in, flow out, and energy consumed; comparing the one or more operating parameters with a database of known operating parameters at remote monitoring station, the known operating parameters for same or similar operating components; and adjusting operating conditions of the operating components when the one or more operating parameters exceed established parameters. In some embodiments, the method also includes comparing the one or more operating parameters with parameters from an industrial process operating at a different location. In some embodiments, the method also includes comparing the one or more operating parameters with parameters from a manufacturer's data for the operating components. In some embodiments, the method also includes solving a problem at the remote operating station, and transmitting a solution to the problem to the location of the industrial process.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

That which is claimed is:

1. A method of monitoring an industrial site, comprising:
   receiving operational data from a plurality of trains at the industrial site, wherein the plurality of trains comprise a first train and a second train, and wherein the first train and the second train are in a first service class;
   determining, based on the operational data, that an output of a component of the first train is below a minimum operating threshold of the component;
   setting a run status of the first train, based on the determination that the output is below the minimum operating threshold;
   determining, based on the operational data, that a first aggregate output of all trains in the first service class is greater than a first required output;
   setting a first class status for all trains in the first service class, based on the determination that the first aggregate output is greater than the first required output; and
   displaying the run status and the first class status on a user interface.

2. The method of claim 1, further comprising:
   determining, based on the operational data, that a second aggregate output of all trains in a second service class is less than a second required output;
   setting a second class status for all trains in the second service class, based on the determination that the second aggregate output is less than the second required output, wherein the user interface is updated to include the second class status for all trains in the second service class.

3. The method of claim 1, wherein the displaying step displays the run status and the first class status as stop light indicators.

4. The method of claim 1, wherein the first service class is one selected from a group consisting of power generation, air compression, circulation pumping, gas compression, and condensate loading.

5. The method of claim 1, further comprising, after displaying the run status and the first class status:
   determining that the component is failing; and
   taking corrective action to repair the component.

6. The method of claim 1, further comprising, prior to the receiving:
   identifying the plurality of trains at the industrial site in the first service class; and
   setting an aggregate train value for all trains in the first service class, wherein the aggregate train value is expressed as a percentage of the required output for all trains in the first class.

7. The method of claim 6, further comprising, prior to the receiving:
   identifying a plurality of components in the first train, wherein the component is one of the plurality of components;
   mapping each component in the plurality of components to at least one sensor; and
   setting a minimum operating threshold for each component in the plurality of components.

8. The method of claim 6, wherein the aggregate train value is greater than 100% of the required output.

9. The method of claim 6, wherein the aggregate train value is less than 100% of the required output.

* * * * *